(12) United States Patent
Ishii et al.

(10) Patent No.: US 8,933,988 B2
(45) Date of Patent: Jan. 13, 2015

(54) PICTURE TRANSMISSION SYSTEM AND PICTURE TRANSMISSION METHOD

(75) Inventors: Junichirou Ishii, Tokyo (JP); Masao Imai, Tokyo (JP)

(73) Assignee: NEC Corporation, Tokyo (JP)

(*) Notice: Subject to any disclaimer, the term of this patent is extended or adjusted under 35 U.S.C. 154(b) by 735 days.

(21) Appl. No.: 13/144,821

(22) PCT Filed: Jan. 21, 2010

(86) PCT No.: PCT/JP2010/050690
§ 371 (c)(1),
(2), (4) Date: Jul. 15, 2011

(87) PCT Pub. No.: WO2010/087263
PCT Pub. Date: Aug. 5, 2010

(65) Prior Publication Data
US 2011/0273536 A1 Nov. 10, 2011

(30) Foreign Application Priority Data

Jan. 28, 2009 (JP) ................. 2009-016608
Jan. 28, 2009 (JP) ................. 2009-016609
Jan. 28, 2009 (JP) ................. 2009-016610
Jan. 28, 2009 (JP) ................. 2009-016611

(51) Int. Cl.
| H04N 19/00 | (2014.01) |
| G09G 3/36 | (2006.01) |
| H04N 13/00 | (2006.01) |
| H04N 13/04 | (2006.01) |
| H04N 19/597 | (2014.01) |

(52) U.S. Cl.
CPC ......... *G09G 3/3648* (2013.01); *H04N 13/0048* (2013.01); *H04N 13/0059* (2013.01); *H04N 13/0438* (2013.01); *H04N 13/0497* (2013.01); *H04N 19/00769* (2013.01); *G09G 2320/0252* (2013.01); *G09G 2340/16* (2013.01)
USPC ........................................... 348/43

(58) Field of Classification Search
None
See application file for complete search history.

(56) References Cited

U.S. PATENT DOCUMENTS

2007/0139624 A1* 6/2007 DeCusatis et al. .............. 353/84
2007/0195408 A1* 8/2007 Divelbiss et al. ............. 359/462
(Continued)

FOREIGN PATENT DOCUMENTS

| CN | 1489380 A | 4/2004 |
| CN | 1860521 A | 11/2006 |

(Continued)

OTHER PUBLICATIONS

International Search Report for PCT/JP2010/050690 mailed May 11, 2010.

*Primary Examiner* — Jay Patel
*Assistant Examiner* — Reza Aghevli
(74) *Attorney, Agent, or Firm* — Sughrue Mion, PLLC

(57) ABSTRACT

A picture transmission system is provided that provides a solution to drops in picture quality. A multiplexing unit (11) multiplexes N pictures in display order to generate a multiplexed picture. A transmission unit (12) transmits the multiplexed picture. A frame memory (23) delays pictures in the multiplexed picture that is received by a reception unit (21) by a one-frame interval of the pictures (one subframe interval) to generate reference pictures. With each reception of a picture in the multiplexed picture by the reception unit (21), an OD arithmetic unit (25) converts the picture element value of the picture (object picture) based on the reference picture to generate an OverDrive picture. A time-division display apparatus (3) displays the OverDrive pictures.

15 Claims, 60 Drawing Sheets

(56) References Cited

U.S. PATENT DOCUMENTS

| | | |
|---|---|---|
| 2008/0001880 A1 * | 1/2008 | Ki-Min et al. .................. 345/89 |
| 2008/0259059 A1 * | 10/2008 | De Greef ...................... 345/204 |

FOREIGN PATENT DOCUMENTS

| | | | | |
|---|---|---|---|---|
| CN | 101114444 A | | 1/2008 | |
| JP | 61-87130 A | | 5/1986 | |
| JP | 61-227498 A | | 10/1986 | |
| JP | 62-191824 A | | 8/1987 | |
| JP | 63-312788 A | | 12/1988 | |
| JP | 5-78017 A | | 3/1993 | |
| JP | 6-189232 A | | 7/1994 | |
| JP | 9-163408 A | | 6/1997 | |
| JP | 9163408 | * | 6/1997 | ............. H04N 13/00 |
| JP | 2004-104368 A | | 4/2004 | |
| JP | 2004104368 A | | 4/2004 | |
| JP | WO /2006/016447 | * | 2/2006 | ............. G02F 1/133 |
| JP | 2006-195231 A | | 7/2006 | |
| JP | 2006195018 A | | 7/2006 | |
| JP | 2006227312 A | | 8/2006 | |
| JP | 2007-33522 A | | 2/2007 | |
| JP | 2007-233102 A | | 9/2007 | |
| JP | 2007-532979 A | | 11/2007 | |
| JP | WO/2008/117623 | * | 10/2008 | ............. G09G 3/36 |
| WO | 2008117623 A | | 10/2008 | |

* cited by examiner

Fig.19

| | \|\| | | | | | | | | |
|---|---|---|---|---|---|---|---|---|---|
| object picture picture element values | 255 | 254 | ... | 3 | 2 | 1 | 0 | | |
| | 255 | 255 | ... | 12 | 11 | 10 | 10 | | |
| | 255 | 255 | ... | 11 | 11 | 10 | 10 | | |
| | 254 | 255 | ... | 11 | 11 | 10 | 10 | | |
| | 254 | 254 | ... | 10 | 10 | 10 | 10 | | |
| | ... | ... | ... | ... | ... | ... | ... | | |
| | 239 | 238 | ... | 3 | 2 | 0 | 0 | | |
| | 228 | 236 | ... | 3 | 2 | 0 | 0 | | |
| | 0 | 1 | 2 | 3 | ... | 254 | 255 | | |
| | reference picture picture element values | | | | | | | | |

|  | object picture picture element values | | | | | | | | |
|---|---|---|---|---|---|---|---|---|---|
|  | 0 | 32 | 64 | 96 | 128 | 160 | 192 | 224 | 255 |
|  | 0 | 10 | 18 | 32 | — | — | — | — | — |
|  | 10 | 18 | 63 | 117 | 150 | 179 | 211 | 235 | 255 |
|  | 10 | 18 | 63 | 116 | 149 | 179 | 211 | 235 | 251 |
|  | 9 | 17 | 52 | 99 | 143 | 175 | 207 | 231 | 251 |
|  | 7 | 13 | 47 | 95 | 135 | 171 | 203 | 227 | 251 |
|  | 6 | 10 | 39 | 91 | 131 | 163 | 195 | 223 | 251 |
|  | 2 | 4 | 31 | 83 | 123 | 155 | 187 | 219 | 247 |
|  | 1 | 2 | 23 | 71 | 107 | 143 | 175 | 211 | 243 |
|  | 0 | 1 | 15 | 55 | 91 | 127 | 159 | 195 | 235 |
|  | 0 | 0 | 9 | 31 | 71 | 99 | 127 | 160 | 211 |
|  | 0 | 32 | 64 | 96 | 128 | 160 | 192 | 224 | 255 |
|  | reference picture picture element values | | | | | | | | |

~252

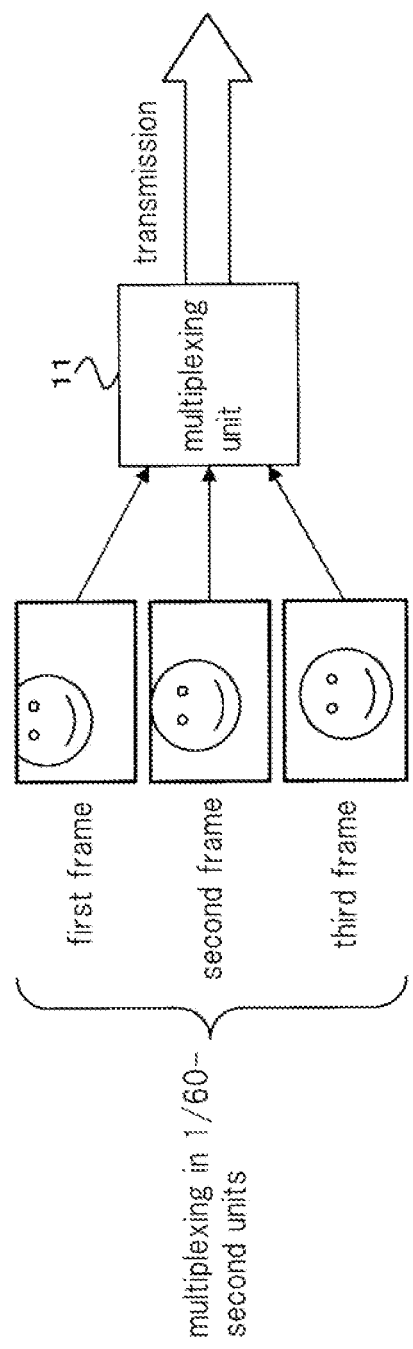

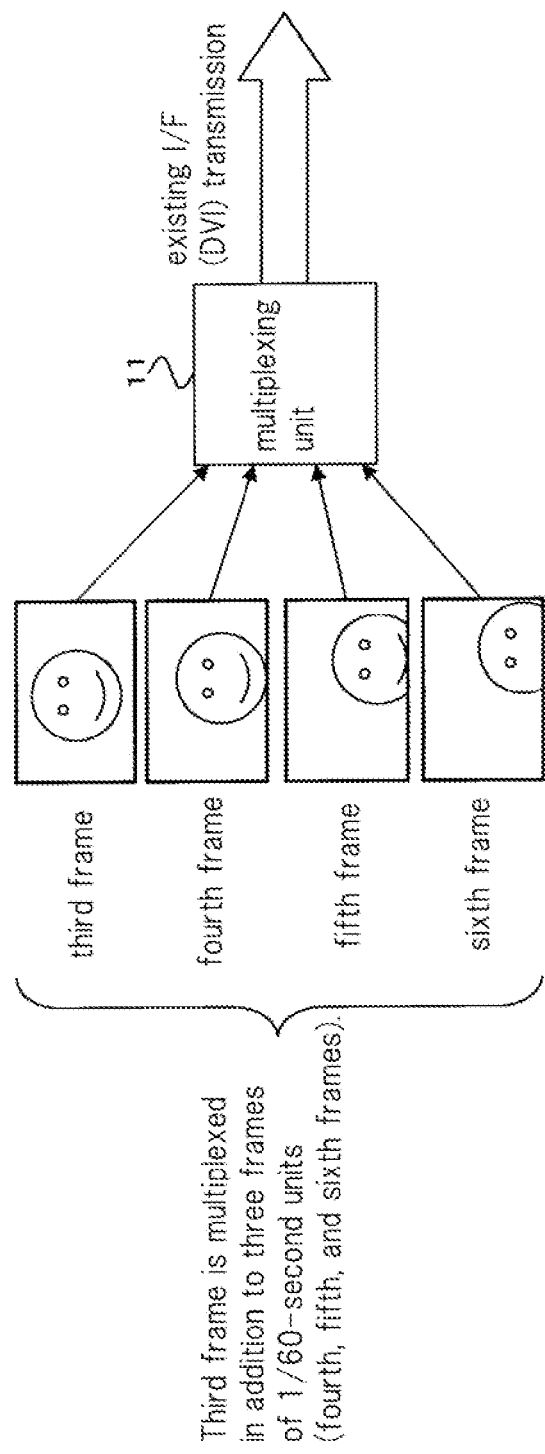

PICTURE TRANSMISSION SYSTEM AND PICTURE TRANSMISSION METHOD

TECHNICAL FIELD

The present invention relates to a picture transmission system, a picture multiplexing method, and a picture transmission method, and more particularly relates to a picture transmission system and a picture transmission method that use an existing image transmission system to transmit a plurality of pictures to a display apparatus and display the pictures.

BACKGROUND ART

In recent years, displays having not only functions for displaying two-dimensional (planar) pictures but also various additional functions are being proposed or put into practical use. Such displays include 3D displays that are capable allowing the user to perceive stereoscopic pictures. Examples of 3D displays include the time-division three-dimensional displays described in Patent Document 1, Patent Document 2, and Patent Document 3.

FIG. 1 is an explanatory view showing the principles of a time-division 3D display. In order to perceive three-dimensional pictures, the user must wear liquid crystal viewing glasses having an optical shutter function.

Time-division three-dimensional displays alternately display at high speed pictures for the left eye and pictures for the right eye that make up three-dimensional pictures. The right-eye optical shutter of the liquid crystal viewing glasses assumes a transmitting state that transmits light and the left-eye optical shutter assumes a blocked state that blocks light in synchronization with the display of pictures for the right eye. The left-eye optical shutter assumes a transmitting state and the right-eye optical shutter assumes a blocked state in synchronization with the display of left-eye pictures. In this way, pictures that differ are alternately irradiated to the user's right eye and left eye and the user perceives a three-dimensional picture.

In addition, content that is not to be divulged to other people such as secret information or private data may be also be included in the pictures displayed by the display. In the current state of ubiquitous computing in society that has come with the development of information equipment, the prevention of display content being viewed by other people even when in the presence of the general public has become an important problem.

Technology for solving this problem has the picture display apparatus described in Patent Document 4. FIG. 2 is a block diagram showing the configuration of this picture display apparatus.

In FIG. 2, picture information storage memory 202 stores in frame units picture signal 201 that is received as input based on frame signal 203. The picture signal that is stored in picture information storage memory 202 is read two times in a frame interval.

The picture signal that is read first is supplied to synthesis circuit 205 as first picture signal 204. The picture signal that is read second is subjected to a brightness and saturation conversion process by brightness/saturation conversion circuit 206 and then supplied to synthesis circuit 205 as second picture signal 207. By the alternating supply of first picture signal 204 and second picture signal 207 to picture display unit 208 by synthesis circuit 205, picture display unit 208 alternately displays pictures according to first picture signal 204 and pictures according to second picture signal 207.

Viewing glasses shutter timing generation circuit 209 generates viewing glasses shutter drive signal 210 for driving the shutter of viewing glasses 211 based on frame signal 203. Viewing glasses shutter drive signal 210 is a signal that places the shutter of viewing glasses 211 in a blocking state in the intervals in which pictures according to second picture signal 207 are displayed. By driving the shutter of viewing glasses 211 by this viewing glasses shutter drive signal 210, a person wearing viewing glasses 211 perceives pictures according to first picture signal 204.

A person not wearing viewing glasses 211 sees a gray picture in which first picture signal 204 and second picture signal 207 are merged due to the visual time quadrature effect (after-image). This gray picture is a picture that differs from the picture according to first picture signal 204. As a result, a person not wearing viewing glasses 211 is unable to perceive the pictures according to first picture signal 204.

In addition, there may be a third picture signal that differs from the first picture signal and second picture signal. The first picture signal, second picture signal, and third picture signal are displayed in order, and the shutter of viewing glasses 211 is set to the blocking state in intervals in which pictures according to each of the second picture signal and the third picture signal are displayed. In this case, a person not wearing viewing glasses 211 is able to perceive pictures according to the third picture signal. In the following description, pictures according to first picture signal 204 are referred to as private pictures, pictures according to second picture signal 207 are referred to as inverted pictures, and pictures according to the third picture signal are referred to as public pictures.

In the example shown in FIG. 2, the frequency at which sets (frames) of private pictures, inverted pictures, and public pictures are displayed must be at least 60 Hz to suppress the perception of flicker to persons wearing viewing glasses 211 and persons not wearing viewing glasses 211. Essentially, the subframe frequency at which the pictures (subframes) of each of private pictures, inverted pictures, and public pictures are displayed must be at least 180 Hz.

When the subframe frequency is less than 180 Hz, flicker is easily noticeable and the picture quality suffers. Further, the reduction of the visual time quadrature effect results in the user's perception of each of private pictures, inverted pictures, and public pictures individually. As a result, the problem arises that the private pictures become visible even to someone not wearing viewing glasses 211 and the confidentiality of the private pictures is decreased.

In the stereoscopic display described using FIG. 1, the frequency at which sets of right-eye pictures and left-eye pictures are displayed must be at least 60 Hz to suppress flicker. In addition, the subframe frequency at which pictures (subframes) of each of right-eye pictures and left-eye pictures are displayed must be 120 Hz.

In order to display subframes at this high-speed frequency, subframes are preferably transmitted at a frame frequency that is the same as the high-speed frequency when transmitting to a display from a transmission source such as a PC. However, because the upper limit of frame frequency is actually 60 Hz in image transmission systems such as the currently widespread DVI, it is not possible to transmit pictures of a higher frequency.

As a result, in order to realize a display that takes advantage of the above-described visual time quadrature effect, a new image transmission mode that can handle high-speed frame frequencies must be devised or existing channels must be set in parallel.

However, the former solution entails the problem of enormous cost for the new development of chips (transceivers and receivers) or cables of transmission sources or displays or the problem of severe limitation of use due to specialization for high-speed transmission. The latter solution entails the problem of complicated arrangement of cables. Accordingly, neither method can be considered a practical solution.

Patent Document 5 describes a technology that enables the realization of a display that takes advantage of the visual time quadrature effect by using an existing image system to transmit pictures having a high-speed subframe frequency. This technology involves the stereoscopic display by a method that differs from the stereoscopic display of the time-division mode such as shown in FIG. 1 and involves the transmission of a plurality of pictures that are planar pictures and depth pictures using an existing image transmission system. FIG. 3 is an explanatory view showing the transmission method that is used in this technology.

As shown in FIG. 3, two-dimensional pictures and depth pictures are multiplexed by multiplexing means 312 into one large picture and this multiplexed picture that has been multiplexed is transmitted using an existing image transmission standard. In this way, despite the transmission of the multiplexed picture at a frame frequency of 60 Hz, each of the pictures that have been multiplexed into the multiplexed picture are transmitted at a frame frequency equal to or greater than 60 Hz, whereby high-frequency pictures can be transmitted using an existing image transmission system.

Apart from this technology, in recent years liquid crystal display devices such as thin liquid crystal displays or liquid crystal televisions have come into practical use in place of displays or television of the conventional CRT method. In liquid crystal display devices, however, the optical transmittance characteristic response of the liquid crystal is slow with respect to changes in voltage, and the problem therefore arises that when displaying moving pictures that have rapid movement, blurred motion occurs in the displayed pictures and the picture quality suffers.

In particular, due to the high frame frequency in displays of the time-division method that takes advantage of the time quadrature effect of vision, the drop in picture quality caused by the slow response of the optical transmittance characteristic of liquid crystal becomes more prominent.

As a technology for ameliorating this drop in picture quality, a technology called OverDrive (OD) has become widely known. OverDrive is used in, for example, the liquid crystal display device described in Patent Document 6.

FIG. 4 is an explanatory view for describing OverDrive.

In OverDrive, a frame (previous frame) that has been received by tuner 402 is temporarily stored in picture memory 411. Comparison circuit 412 then compares this previous frame that has been stored in picture memory 411 with a frame (current frame) that was next received by tuner 402 for every picture element and converts the picture element value of the current frame.

More specifically, comparison circuit 412 increases the picture element value of the current frame when the picture element value of the current frame is greater than the picture element value of the previous frame, and conversely, decreases the picture element value of the current frame when the picture element value of the current frame is smaller than the picture element value of the previous frame.

For example, when the picture element value of the previous frame is 100 and the picture element value of the current frame is 150 and when the picture element value of the current frame is supplied as output without alteration, the picture cannot be displayed at the brightness that accords with the picture element value "150" because the response of the liquid crystal optical transmittance characteristic is slow. As a result, the picture element value of the current frame is converted from 150 to 180. In this way, the response of the optical transmittance characteristic of the liquid crystal becomes faster and the picture can be displayed at a brightness that accords with the picture element value of 150.

In this type of OverDrive, pictures can be displayed at the desired brightness without raising the response speed of the liquid crystal.

LITERATURE OF THE PRIOR ART

Patent Documents

Patent Document 1: Japanese Examined Patent Application Publication No. H05-78017
Patent Document 2: Japanese Unexamined Patent Application Publication No. S61-227498
Patent Document 3: Japanese Unexamined Patent Application Publication No. S61-87130
Patent Document 4: Japanese Unexamined Patent Application Publication No. S63-312788
Patent Document 5: Japanese Unexamined Patent Application Publication No. 2006-195018
Patent Document 6: Japanese Unexamined Patent Application Publication No. H06-189232

SUMMARY OF THE INVENTION

Problem to be Solved by the Invention

In a time-division liquid crystal display apparatus, picture quality decreases markedly due to the slow response of the optical transmittance characteristic of liquid crystal, and accurate compensation for the slow response of the liquid crystal optical transmittance characteristic is therefore extremely important. In order to use OverDrive to accurately compensate for this slow response, the picture element value of a picture must be compared with the picture element value that immediately precedes this picture in display order.

However, when a plurality of pictures are multiplexed into a multiplexed picture using the configuration shown in FIG. 3 and then transmitted using an existing image transmission system, the application of OverDrive to the multiplexed picture results in the following problems.

Essentially, the picture element value of the current frame is compared with the picture element value of, the preceding frame of the multiplexed picture, and the picture element value of each picture therefore cannot be compared with the picture element value of the immediately preceding picture in display order. For example, when two pictures have been multiplexed, the picture element values of each picture of the multiplexed picture are compared with the picture element value that precedes that picture by two in display order.

Accordingly, the problem arises that the slow response of the liquid crystal optical transmittance characteristic cannot be accurately compensated and the picture quality drops.

It is therefore an object of the present invention to provide a picture transmission system and picture transmission method that solve the problem of the drop in picture quality that is the above-described problem.

Means for Solving the Problem

The first picture transmission system according to the present invention is a picture transmission system that includes a picture transmission apparatus and a display apparatus, wherein the picture transmission apparatus includes multiplexing means that multiplexes N display pictures in display order, where N is an integer equal to or greater than 2, to generate a multiplexed picture; and transmission means that transmits the multiplexed picture that was generated in the multiplexing means; and the display apparatus includes reception means that receives the multiplexed picture from the picture transmission apparatus, delay means that delays, by exactly one frame interval of the display pictures the display pictures in the multiplexed picture that was received by the reception means to generate reference pictures, generation means that, with each reception of a display picture in the multiplexed picture by the reception means, converts the picture element value of the display picture based on a reference picture that was generated by the delay means to generate a corrected picture that corresponds to the display picture, and display means that has a plurality of picture elements and that scans the plurality of picture elements based on the corrected pictures that were generated by the generation means to display pictures that accord with the corrected pictures.

The second picture transmission system according to the present invention is a picture transmission system that includes a picture transmission apparatus and display apparatus, wherein the picture transmission apparatus includes multiplexing means that multiplexes N display pictures, where N is an integer equal to or greater than 2, to generate a multiplexed picture; and transmission means that transmits the multiplexed picture that was generated in the multiplexing means; and the display apparatus includes reception means that receives the multiplexed picture from the picture transmission apparatus, a memory means that stores all display pictures in the multiplexed picture that was received by the reception means; generation means that converts the picture element value of each of display picture that is stored in the memory means based on a reference picture for which display order precedes by one the display picture that is stored in the memory means to generate N corrected pictures that correspond to each of the display pictures; recording means that stores all of the corrected pictures that were generated by the generation means; and display means that has a plurality of picture elements and that scans the plurality of picture elements based on the corrected pictures that were stored by the recording means to display pictures that accord with the corrected pictures.

The third picture transmission system according to the present invention is a picture transmission system that includes a picture transmission apparatus and display apparatus, wherein the picture transmission apparatus includes multiplexing means that multiplexes N display pictures, where N is an integer equal to or greater than 2, to generate a multiplexed picture; and transmission means that transmits the multiplexed picture that was generated in the multiplexing means; and the display apparatus includes reception means that receives the multiplexed picture from the picture transmission apparatus; generation means that, with each reception by the reception means of a picture element value of a display picture in the multiplexed picture, sequentially converts the picture element value based on a reference picture that has a display order that precedes by one the display picture in the multiplexed picture that was received by the reception means to generate N corrected pictures that correspond to each of the display pictures in the multiplexed picture; recording means that stores all of the corrected pictures that were generated by the generation means; and display means that has a plurality of picture elements and that scans the plurality of picture elements based on the corrected pictures that were stored by the recording means to display pictures that accord with the corrected pictures.

The fourth picture transmission system according to the present invention is a picture transmission system that includes a picture transmission apparatus and display apparatus, wherein the picture transmission apparatus includes multiplexing means that multiplexes N display pictures where N is an integer equal to or greater than 2, and, of the N display pictures, an additional picture for which the display order precedes by one the display picture that is the earliest picture that is displayed in display order to generate a multiplexed picture; and transmission means that transmits the multiplexed picture that was generated in the multiplexing means; and the display apparatus includes reception means that receives the multiplexed picture from the picture transmission apparatus; generation means that both converts the picture element value of the first display picture in the multiplexed picture that was received by the reception means based on the additional picture and converts the picture element values of each of the display pictures that differ from the first display picture in the multiplexed picture based on reference pictures for which display order precedes by one the display pictures in the multiplexed picture to generate N corrected pictures that correspond to each of the display pictures in the multiplexed picture; a recording means that stores all of the corrected pictures that were generated by the generation means; and display means that has a plurality of picture elements and that scans the plurality of picture elements based on the corrected pictures that were stored by the recording means to display pictures that accord with the corrected pictures.

The first picture transmission method according to the present invention is a picture transmission method realized by a picture transmission system that includes a picture transmission apparatus and a display apparatus that has a plurality of picture elements; wherein the picture transmission method includes: a multiplexing step of the picture transmission apparatus multiplexing N display pictures in display order where N is an integer equal to or greater than 2 to generate a one-frame portion of multiplexed pictures; a transmission step of the picture transmission apparatus transmitting the multiplexed picture that was generated; a reception step of the display apparatus receiving the multiplexed picture from the picture transmission apparatus; a delay step of the display apparatus delaying by a one-frame interval of the display pictures the display pictures in the multiplexed picture that was received to generate reference pictures; a generation step of the display apparatus, with each reception of a display picture in the multiplexed picture, converting the picture element value of the display picture based on the reference picture that was generated to generate corrected pictures that accord with the display pictures; and a display step of the display apparatus scanning the plurality of picture elements based on the corrected pictures that were generated to display pictures that accord with the corrected pictures.

The second picture transmission method according to the present invention is a picture transmission method realized by a picture transmission system that includes a picture transmission apparatus and a display apparatus that has a plurality of picture elements; wherein the picture transmission method includes: a multiplexing step of the picture transmission apparatus multiplexing N display pictures where N is an integer equal to or greater than 2 to generate a multiplexed picture; a transmission step of the picture transmission apparatus transmitting the multiplexed picture that was generated; a reception step of the display apparatus receiving the multiplexed picture from the picture transmission apparatus; a memory step of the display apparatus storing all of the display pictures in the multiplexed picture that was received; a generation step of the display apparatus converting picture element value of each display picture that was stored based on a reference picture for which display order precedes by one the display picture that was stored to generate N corrected pictures that correspond to each of the display picture that were stored; a recording step of the display apparatus storing all of the corrected pictures that were generated; and a display step of the display apparatus scanning the plurality of picture elements based on the corrected pictures that were stored to display pictures that accord with the corrected pictures.

The third picture transmission method according to the present invention is a picture transmission method realized by a picture transmission system that includes a picture transmission apparatus and a display apparatus that has a plurality of picture elements; wherein the picture transmission method includes: a multiplexing step of the picture transmission apparatus multiplexing N display pictures where N is an integer equal to or greater than 2 to generate a multiplexed picture; a transmission step of the picture transmission apparatus transmitting the multiplexed picture that was generated; a reception step of the display apparatus receiving the multiplexed picture from the picture transmission apparatus; a generation step of the display apparatus, with each reception of a picture element value of a display picture in the multiplexed picture, converting the picture element value based on a reference picture that has a display order that precedes by one the display picture in the multiplexed picture that was received to generate N corrected pictures that correspond to each of the display pictures in the multiplexed picture; a recording step of the display apparatus storing all of the corrected pictures that were generated; and a display step of the display apparatus scanning the plurality of picture elements based on the corrected pictures that were stored to display pictures that accord with the corrected pictures.

The fourth picture transmission method according to the present invention is a picture transmission method realized by a picture transmission system that includes a picture transmission apparatus and a display apparatus that has a plurality of picture elements; wherein the picture transmission method includes: a multiplexing step of the picture transmission apparatus multiplexing N display pictures where N is an integer equal to or greater than 2 and, of the N display pictures, an additional picture for which display order precedes by one the first display picture for which display order is earliest to generate a multiplexed picture; a transmission step of the picture transmission apparatus transmitting the multiplexed picture that was generated; a reception step of the display apparatus receiving the multiplexed picture from the picture transmission apparatus; a generation step of the display apparatus both converting the picture element value of the first display picture in the multiplexed picture that was received based on the additional picture and converting the picture element value of each display picture that differs from the first display picture in the multiplexed picture based on a reference picture for which display order precedes by one the display picture that is the earliest picture that is displayed in display order to generate a multiplexed picture; a recording step of the display apparatus storing all of the corrected pictures that were generated; and a display step of the display apparatus scanning the plurality of picture elements based on the corrected pictures that were stored to display pictures that accord with the corrected pictures.

Effect of the Invention

The present invention enables suppression of drops in picture quality.

BRIEF DESCRIPTION OF THE DRAWINGS

FIG. 19 is an explanatory view showing an example of OverDrive LUT;

FIG. 20 is an explanatory view showing another example of OverDrive LUT;

FIG. 59 is an explanatory view for describing an example of the multiplexing method of a high-speed moving picture; and FIG. 60 is an explanatory view for describing another example of a multiplexing method of a high-speed moving picture.

MODE FOR CARRYING OUT THE INVENTION

Exemplary embodiments of the present invention are next described with reference to the accompanying drawings. In the following explanation, constructions having the same function are given identical reference numbers and explanation of these constructions may be omitted.

The picture transmission systems described in each of the exemplary embodiments and working examples multiplex N pictures where N is an integer equal to or greater than 2, transmit these multiplexed pictures that were multiplexed by a predetermined image transmission system, and perform time-division display of these multiplexed pictures. Here, a multiplexed picture is transmitted at a frame frequency of M Hz where M is a real number greater than 0, and each picture that is contained in a multiplexed picture is sequentially displayed at a frequency equal to or greater than a subframe rate of M×N Hz (where M is an integer equal to or greater than 1).

The N pictures that are multiplexed are pictures of N types or N frames of moving pictures (hereinbelow referred to as high-speed moving pictures) that have a frame frequency of at least the frame frequency determined by an existing image transmission system (hereinbelow referred to as existing frame frequency).

Pictures of a plurality of types may be a plurality of pictures having relevance to each other such as a plurality of pictures for causing a user to perceive a stereoscopic picture or may be a plurality of pictures having no relevancy to each other such as a plurality of pictures broadcast on each of a plurality of television channels.

The predetermined image transmission system is, for example, DVI, HDMI, DisplayPort, or analog RGB (VGA). In most existing image transmission systems, the frame frequency is 60 Hz and the frame frequency of multiplexed pictures is therefore assumed to be equal to or greater than 60 Hz (FPS). Regarding HDMI or DisplayPort, the current standards as of Jun. 19, 2008 apply up to 120 Hz.

In the following explanation, explanation is presented on the assumption that the predetermined image transmission system is DVI and the transmitted frame frequency of multiplexed pictures is 60 FPS, but the image transmission system or transmitted frame frequency are not limited to these examples and can be altered as appropriate.

Figure 1:
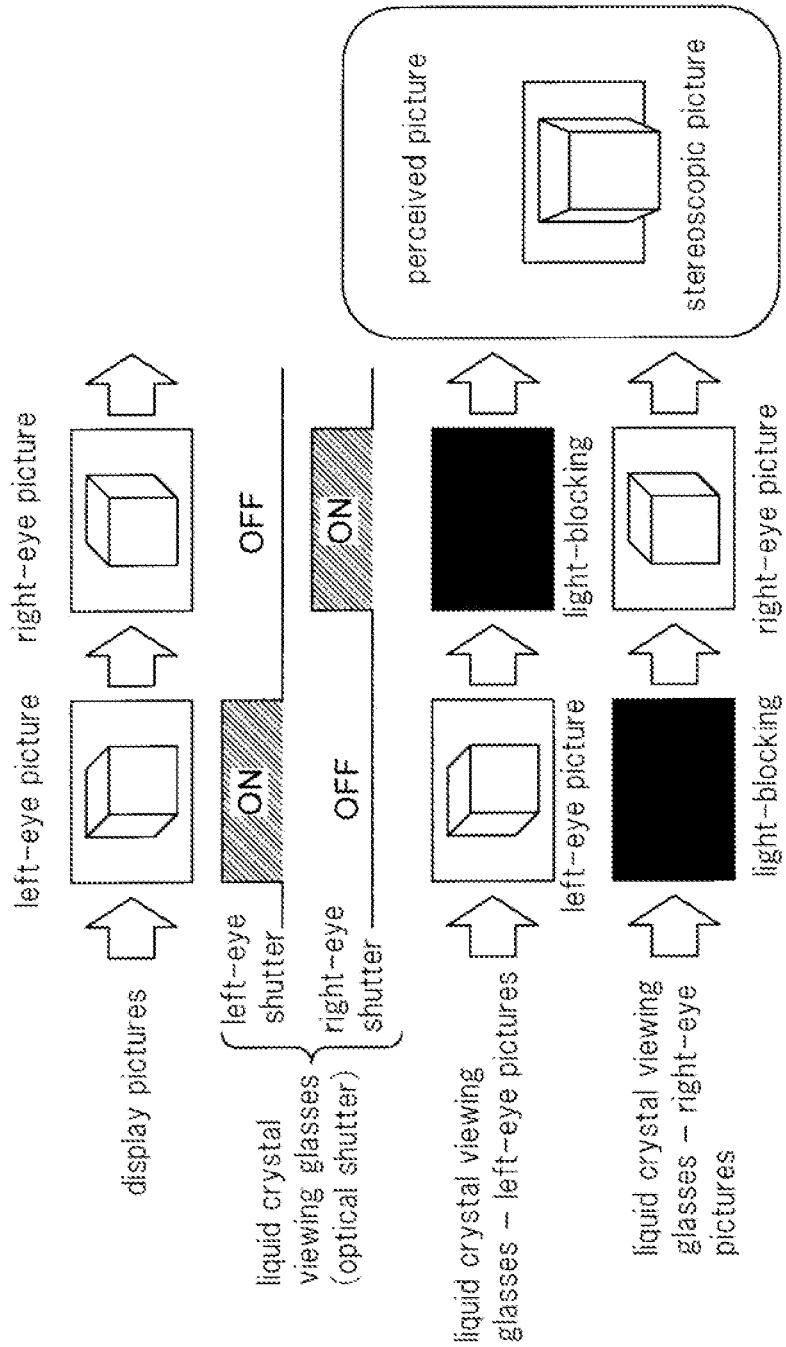
FIG. 1 is an explanatory view showing the principles of time-division stereoscopic display of the related art.
Figure 2:
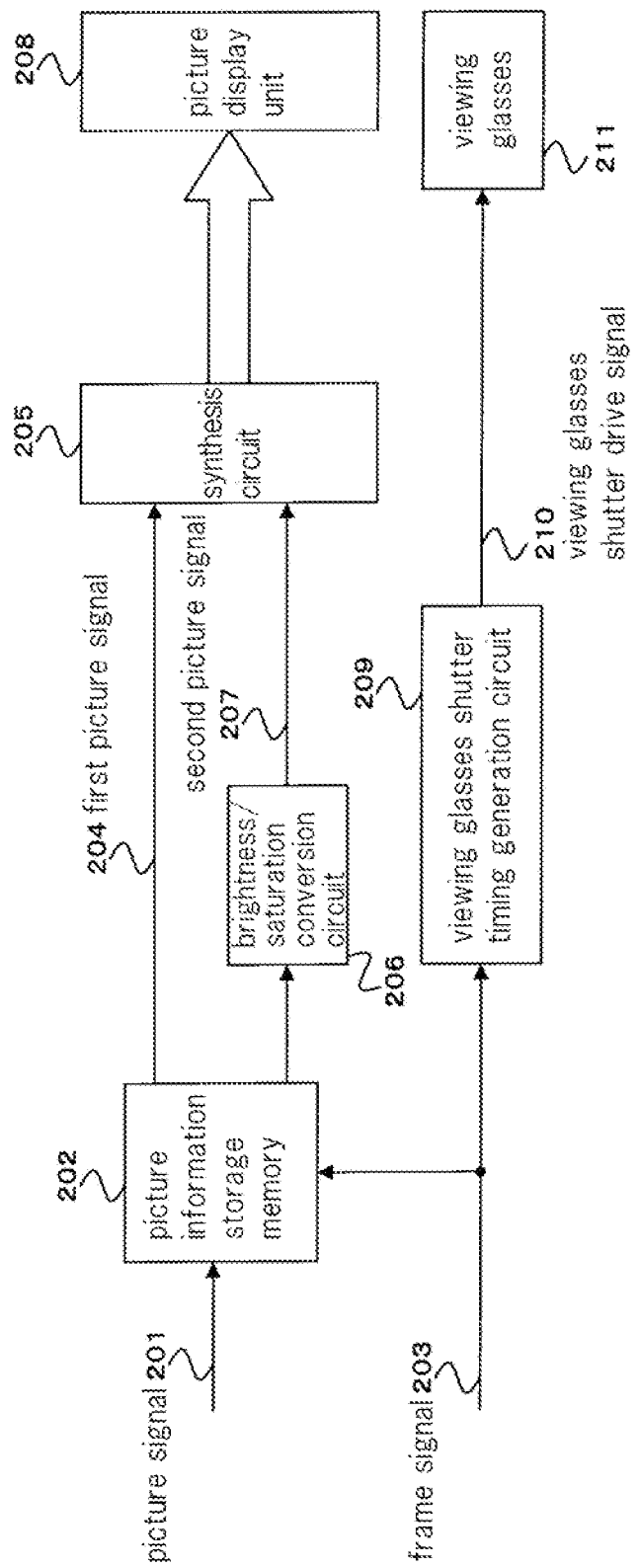
FIG. 2 is a block diagram showing the configuration of a picture processing apparatus of the related art.
Figure 3:
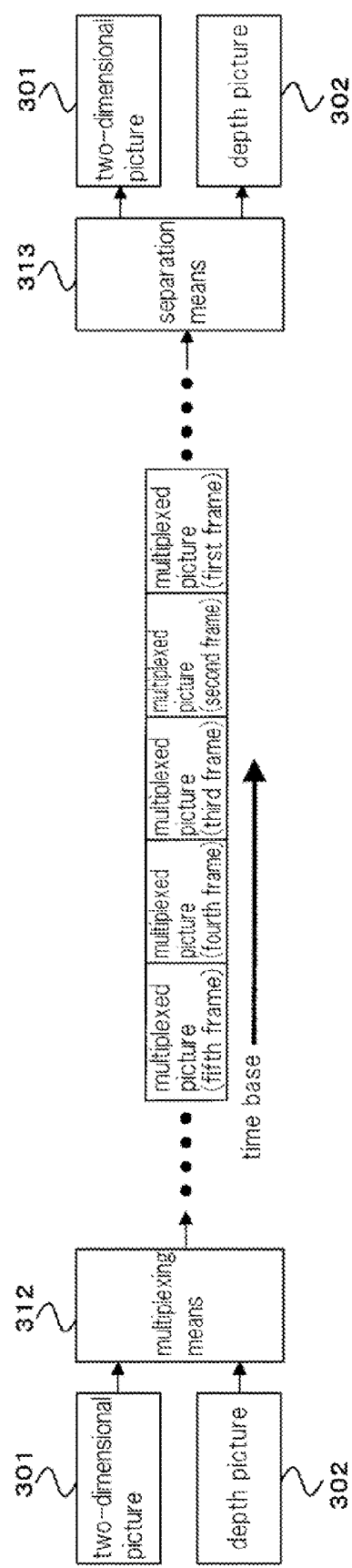
FIG. 3 is an explanatory view for describing the picture transmission method of the related art.
Figure 4:
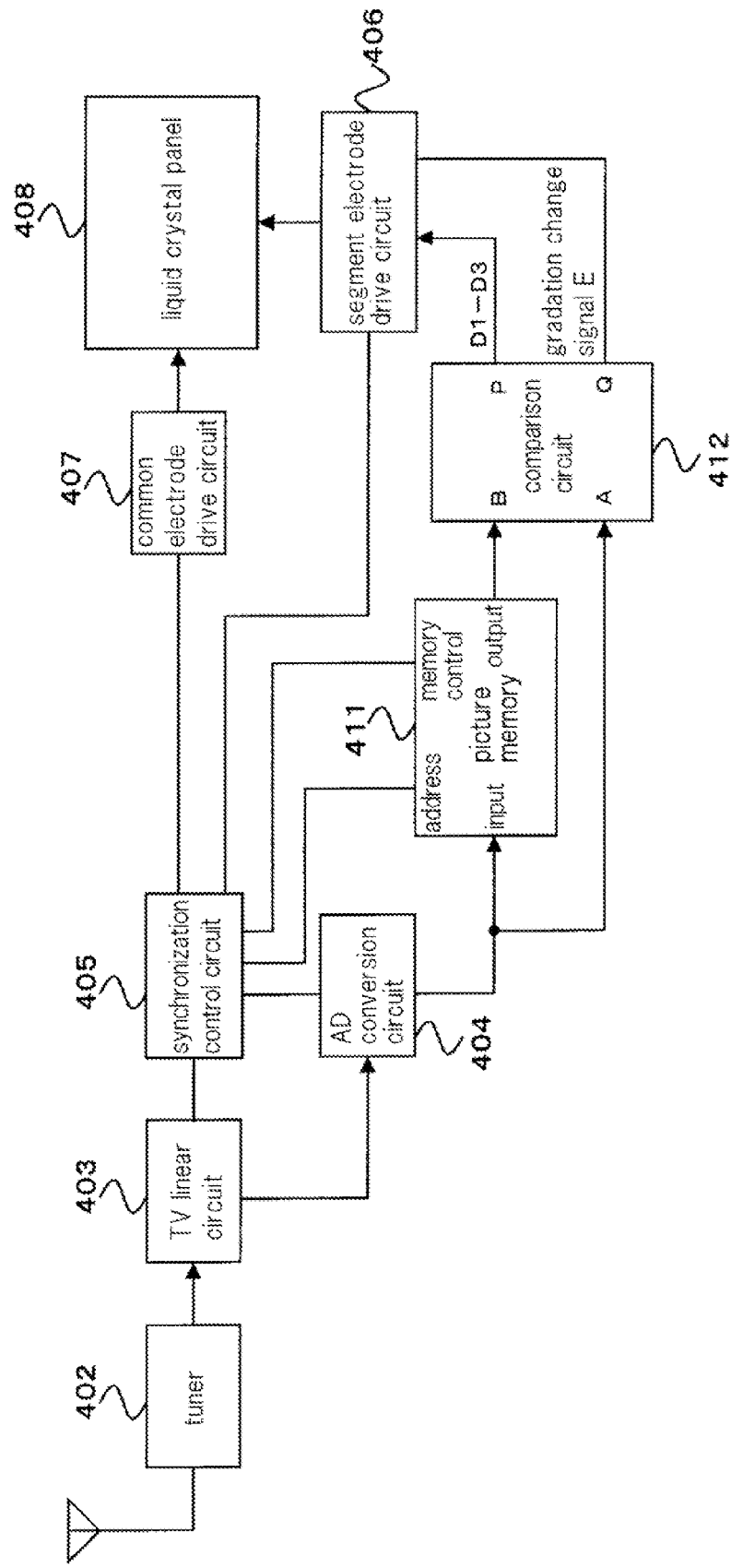
FIG. 4 is an explanatory view for describing OverDrive of the related art.
Figure 5:
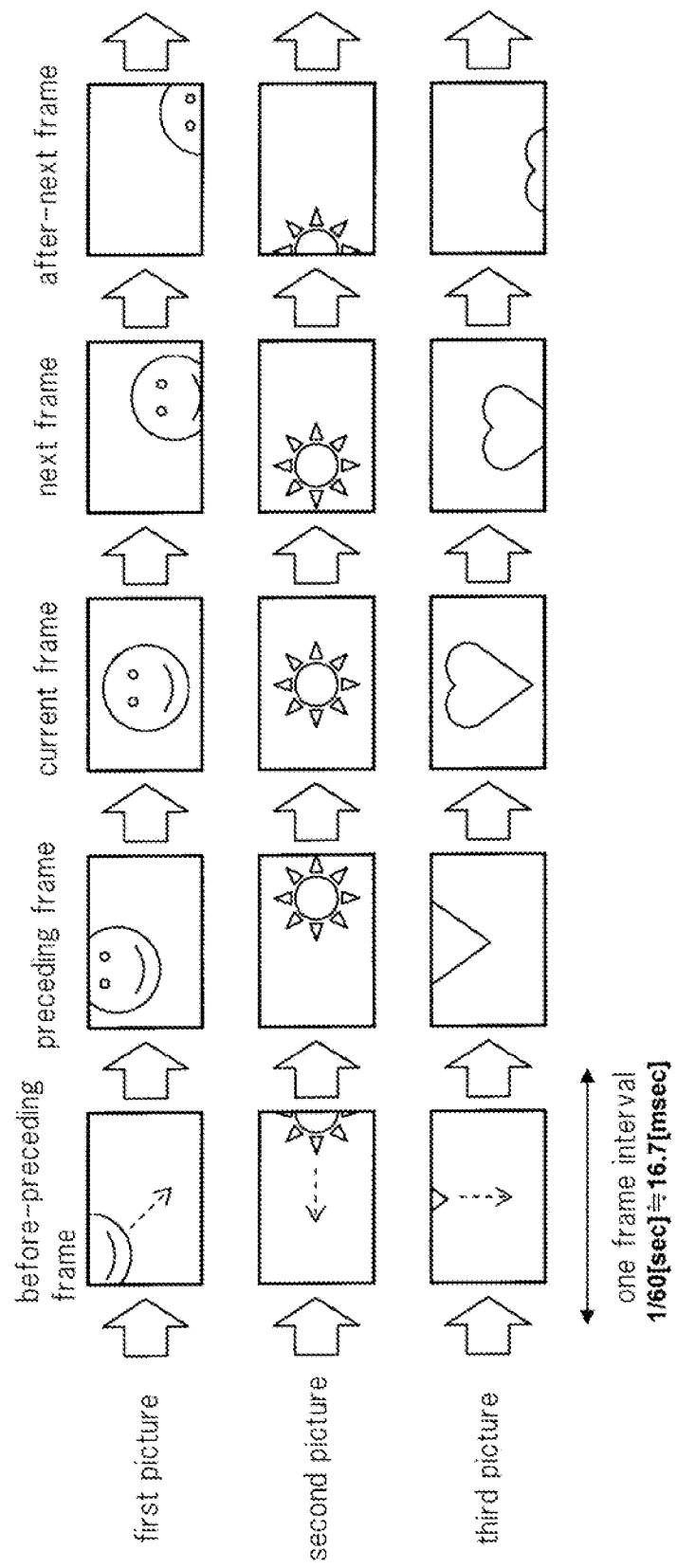
FIG. 5 is an explanatory view showing an example of pictures that are transmitted.

In the following explanation, unless subject to particular conditions, pictures that are transmitted are assumed to be multiplexed pictures in which pictures of three types composed of first pictures, second pictures, and third pictures are multiplexed as shown in FIG. 5. Each picture is assumed to be a moving picture or still picture of the same number of picture elements (specifically, 800 picture elements×600 lines).

The frames of multiplexed pictures are referred to as a "before-preceding" frame, a "preceding" frame, a "current" frame, a "next" frame, and an "after-next" frame, in the order of transmission. In addition, each picture in a multiplexed picture is abbreviated as "XY" in the case of the Yth picture of the Xth frame. For example, a picture is abbreviated as "next-2" if it is the second picture of the next frame, or "before-preceding-1" if it is the first picture of the frame before the preceding frame.

Figure 6:
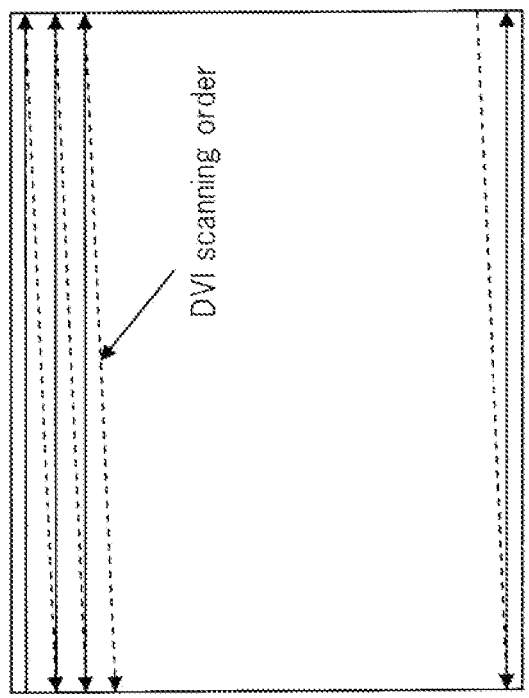
FIG. 6 is an explanatory view for describing the transmission order of picture element values of a multiplexed picture that is transmitted by the DVI standard.

In addition, if not subject to particular conditions, the data of each picture element (picture element value) of a multiplexed picture is transmitted in dot-sequential format from the top of the picture and toward to bottom as shown in FIG. 6. In addition, the data of each picture element are transmitted in a dot-sequential format from the left and toward the right in the same line.

Figure 7:
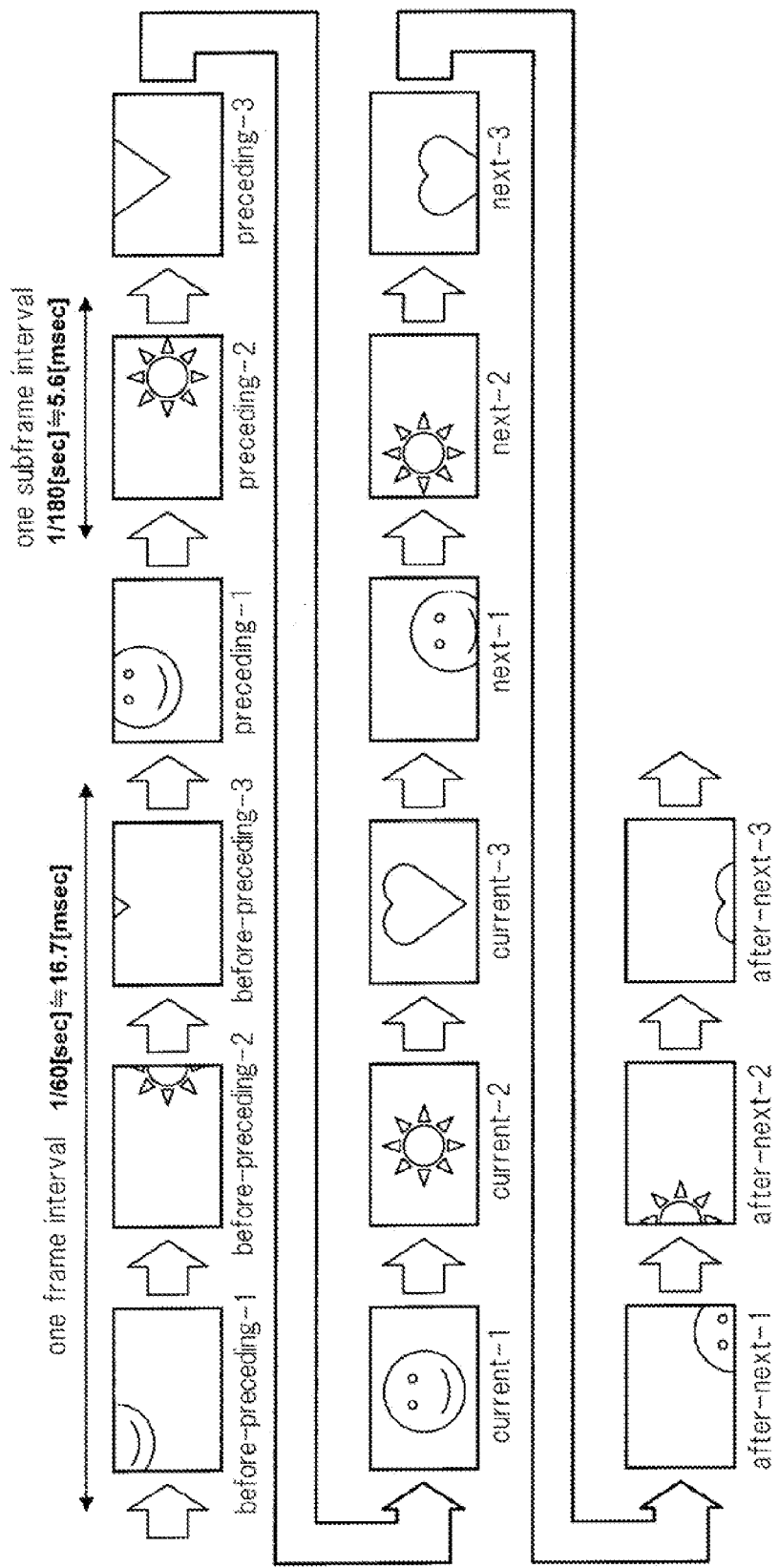
FIG. 7 is an explanatory view showing an example of the display order of subframes.

A multiplexed picture that has been transmitted is displayed in a time-division display apparatus as shown in FIG. 7. The first to third pictures in a particular frame of a multiplexed picture are displayed in a one-frame interval T ($\frac{1}{60}$ second) of the multiplexed picture. Essentially, one of the first to third pictures is displayed in a one-frame interval Ts (1/(60×3)=$\frac{1}{180}$ second) of the first to third pictures. In the following explanation, each of the pictures that are contained in a multiplexed picture is referred to as a subframe of the multiplexed picture, and the frame interval of each picture is also referred to as a subframe interval.

As shown in FIG. 7, the display order of each subframe is the order: before-preceding-1→before-preceding-2→before-preceding-3→preceding-1→preceding-2→preceding-3→current-1→current-2→current-3→next-1→next-2→next-3→after-next-1→after-next-2→after-next-3→ . . . , and the scanning order of each subframe is from the top of a picture toward the bottom.

First Exemplary Embodiment

Figure 8:
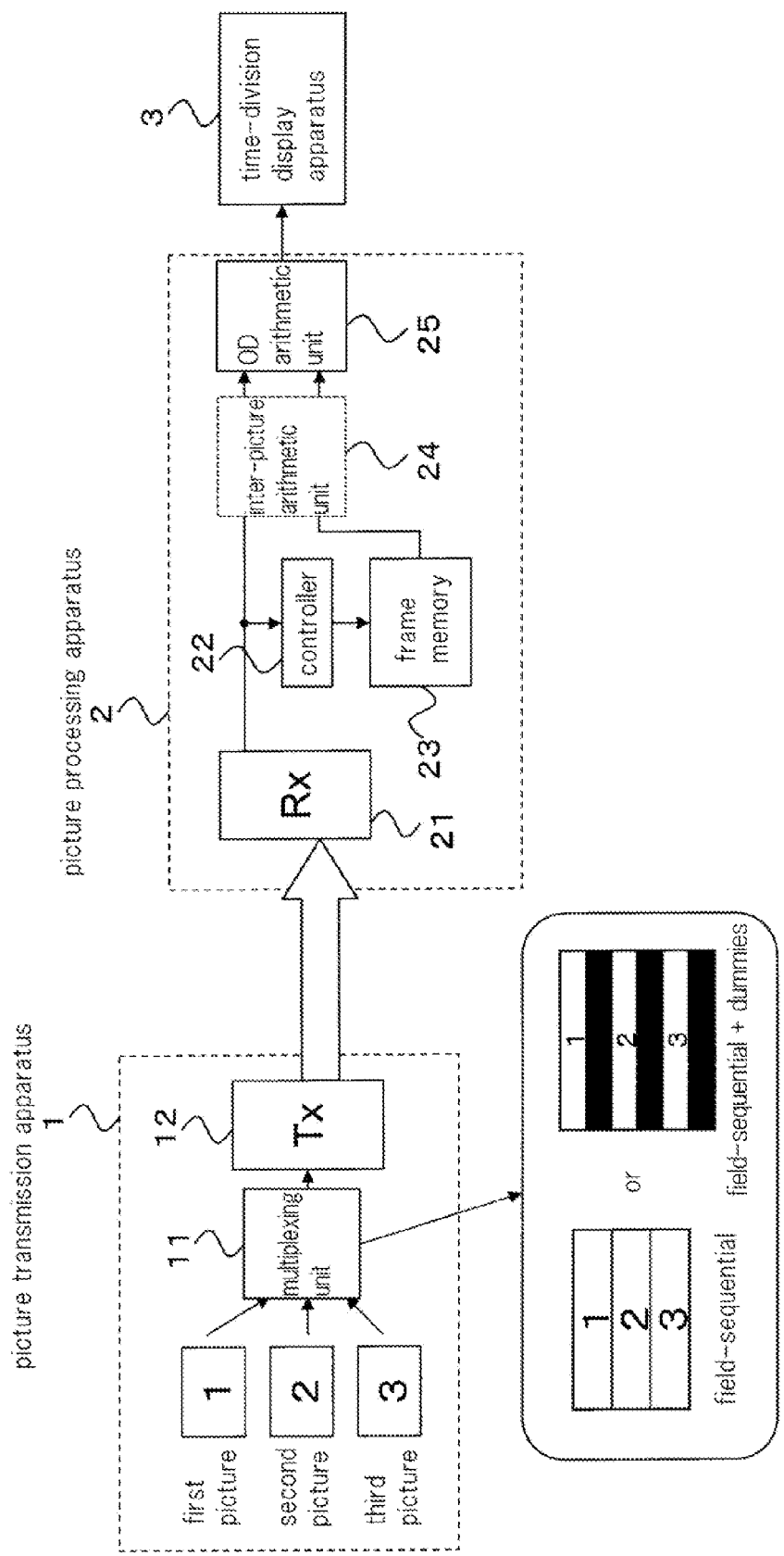
FIG. 8 is a block diagram showing the picture transmission system of the first exemplary embodiment.

FIG. 8 is a block diagram showing the picture transmission system in the first exemplary embodiment of the present invention. In FIG. 8, the picture transmission system includes picture transmission apparatus 1, picture processing apparatus 2, and time-division display apparatus 3. Picture processing apparatus 2 and time-division display apparatus 3 are examples of display apparatuses and may have separate housings or may have a shared housing.

Picture transmission apparatus 1 includes multiplexing unit 11 and transmission unit (transceiver Tx) 12.

Pictures of three types (first pictures, second pictures, and third pictures) are applied as input to multiplexing unit 11, and multiplexing unit 11 multiplexes these pictures of three types in display order to generate a multiplexed picture of a one-frame portion. In the present exemplary embodiment, multiplexing unit 11 is assumed to multiplex the pictures of three types in field-sequential format.

Transmission unit 12 transmits the multiplexed picture that was generated in multiplexing unit 11 to picture processing apparatus 2 by the DVI standard.

Picture processing apparatus 2 includes reception unit (receiver Rx) 21, controller 22, frame memory 23, and OverDrive (OD) arithmetic unit 25. Picture processing apparatus 2 may further be provided with inter-picture arithmetic unit 24.

Reception unit 21 receives the multiplexed picture from picture transmission apparatus 1.

Controller 22 progressively stores each picture in the multiplexed picture that was received by reception unit 21 in frame memory 23 in the order received by reception unit 21.

Frame memory 23 is one example of the delay means. Frame memory 23 has a memory capacity that can store one picture in the multiplexed picture that was received by reception unit 21 and delays the multiplexed picture by exactly one subframe interval. In other words, frame memory 23 can be comprehended as a FIFO (First-In First-Out) circuit that delays a multiplexed picture by exactly a one-subframe interval.

OD arithmetic unit 25 is one example of the generation means. With each reception of a picture in a multiplexed picture by reception unit 21, OD arithmetic unit 25 subjects the picture to an OverDrive operation and generates an OverDrive (OD) picture that corresponds to the picture. The OD picture is one example of the corrected picture.

The OverDrive operation is an operation of converting the picture element values of a picture based on a reference picture that has a display order that immediately precedes the picture. At this time, the picture element value following conversion is a value such that gradations that correspond to the picture element value before conversion are correctly displayed.

In the present exemplary embodiment, a picture that is delayed in frame memory 23 is the reference picture that has a display order that immediately precedes the picture for which the picture element value is converted (hereinbelow also referred to as the object picture). Accordingly, frame memory 23 delays the picture to generate a reference picture.

Inter-picture arithmetic unit 24 is one example of the picture processing means. By carrying out a reciprocal operation of the picture that was received by reception unit 21 and the reference picture that is supplied from frame memory 23, inter-picture arithmetic unit 24 subjects the picture that was received by reception unit 21 to a picture process according to the reference picture. A more detailed explanation of inter-picture arithmetic unit 24 will be described later.

Time-division display apparatus 3 is one example of the display means. Time-division display apparatus 3 includes a plurality of picture elements, and each time OD arithmetic unit 25 generates an OD picture, time-division display apparatus 3 scans the plurality of picture elements based on the OD picture to display a picture that accords with the OD picture.

Operation of the Picture Transmission System

Figure 9:
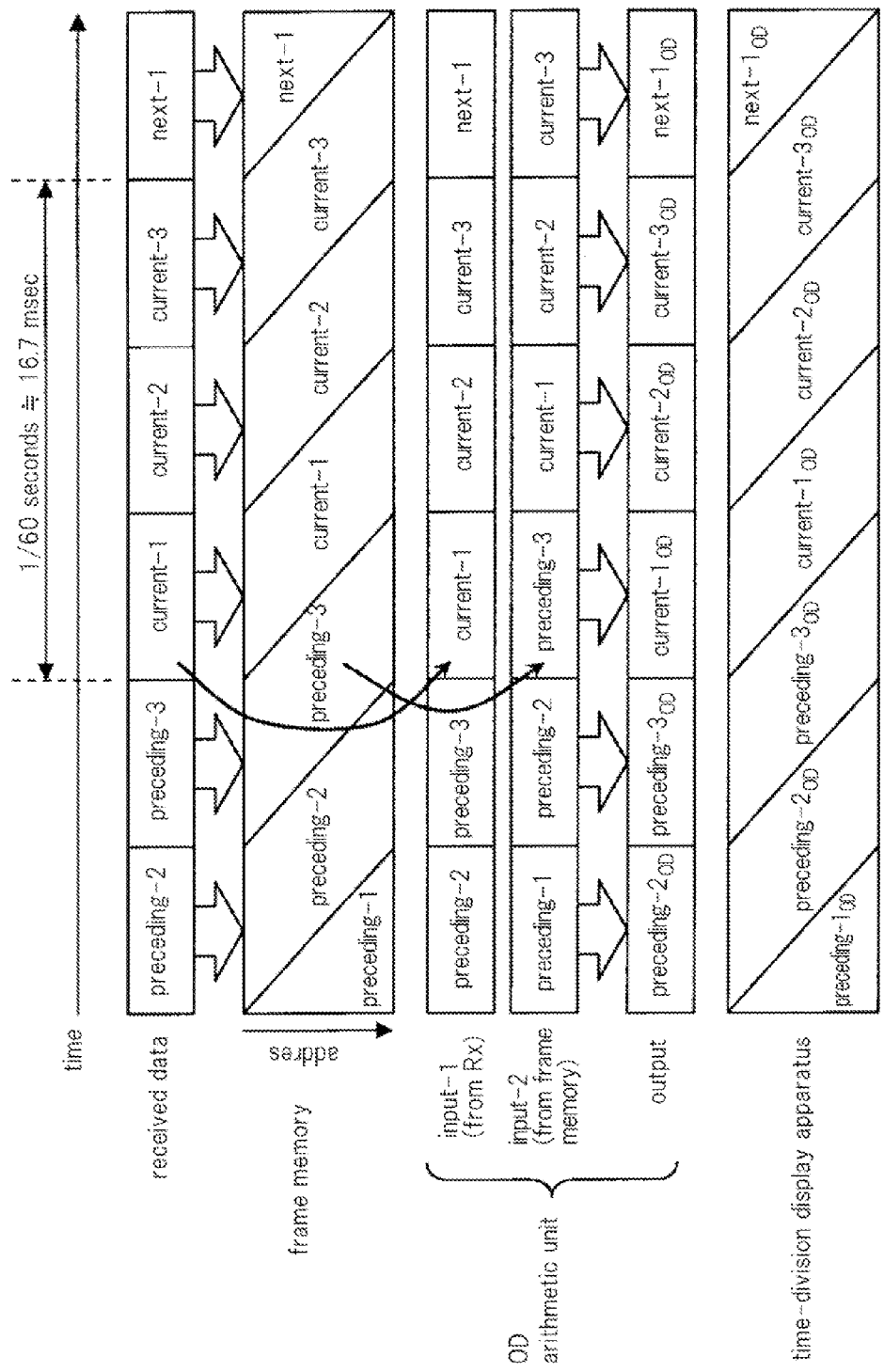
FIG. 9 is a timing chart for describing an example of the operation of the picture transmission system of the first exemplary embodiment.

FIG. 9 is a timing chart for describing an example of the operation of the picture transmission system.

When multiplexing unit 11 generates a multiplexed picture in picture transmission apparatus 1, multiplexing unit 11 transmits the multiplexed picture to transmission unit 12. Transmission unit 12, upon receiving the multiplexed picture, transmits the multiplexed picture to reception unit 21 of picture processing apparatus 2 by the DVI standard.

Reception unit 21, with each reception of the data (picture element values) in a multiplexed picture, supplies the received data to controller 22 and OD arithmetic unit 25.

Controller 22, upon receiving the header data of a subframe (hereinbelow assumed to be current-1) of the multiplexed picture from reception unit 21, sets the write address of frame memory 23 in the header. Controller 22 then writes the data of current-1 to frame memory 23 while shifting the write address. When the multiplexed picture switches from current-1 to current-2 and the writing of current 1 is completed, controller 22 returns the write address to the header and proceeds to write current-2 to frame memory 23 as with current-1. In this way, controller 22 writes each subframe of the multiplexed picture to frame memory 23.

OD arithmetic unit 25 receives the picture from reception unit 21 as an object picture, and further, reads a picture from frame memory 23 as the reference picture. OD arithmetic unit 25 converts the object picture based on the reference picture to generate an OD picture and supplies the OD picture to time-division display apparatus 3.

For example, when the picture received by reception unit 21 is current-1, frame memory 23 stores as the reference picture preceding-3 that has a display order that immediately precedes current-1. As a result, OD arithmetic unit 25 reads this preceding-3 and converts the picture element values of current-1 based on this preceding-3. More specifically, OD arithmetic unit 25 generates current-1 OD by calculating the picture element value of the OD picture of current-1 (current-1 OD) for each picture element position of current-1 based on the picture element value of current-1 at that picture element position and the picture element value of preceding-3 of that picture element position, and supplies this current-1 OD as output.

With each reception of an OD picture from OD arithmetic unit 25, time-division display apparatus 3 proceeds to display the OD picture in the field-sequential format.

Multiplexing Method: Field-Sequential Format

Figure 10:
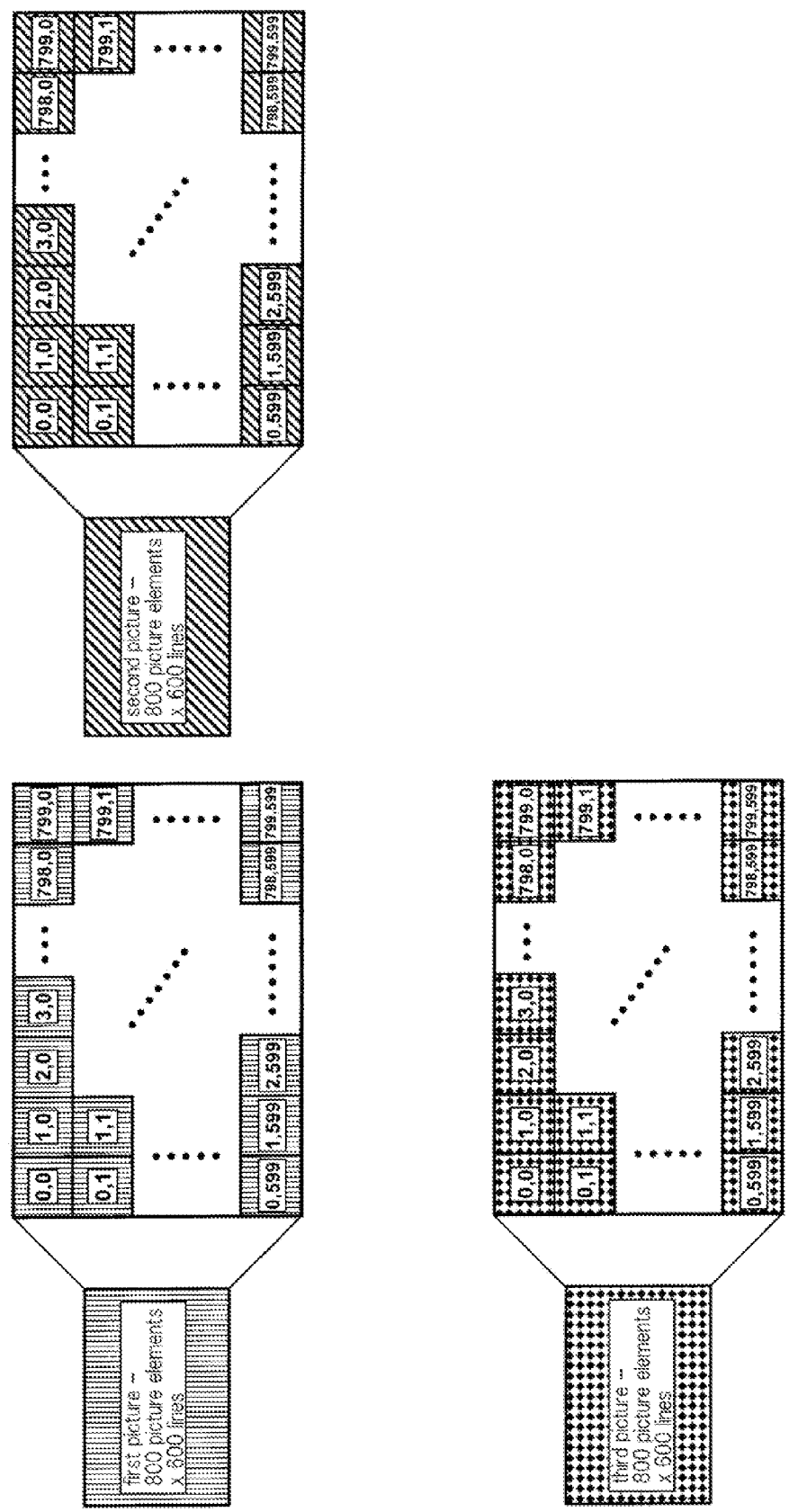
FIG. 10 is an explanatory view showing the coordinates of first to third pictures.

In the present exemplary embodiment, multiplexing unit 11 spatially multiplexes the first picture to the third picture in a one-frame portion of a multiplexed picture (800 picture elements×1800 lines). Multiplexing unit 11 may be constituted by hardware such as LSI or FPGA, or may be realized by storing software in memory and then by causing a computer to read and execute the stored software. In each of the first picture to third picture, the upper left coordinate of each picture is assumed to be (0, 0), and the lower right coordinate of each picture is assumed to be (799, 599), as shown in FIG. 10.

Multiplexing unit 11 multiplexes in field-sequential format the first picture to third picture that are subframes contained in the same frame in the display order and scanning order.

Figure 11:
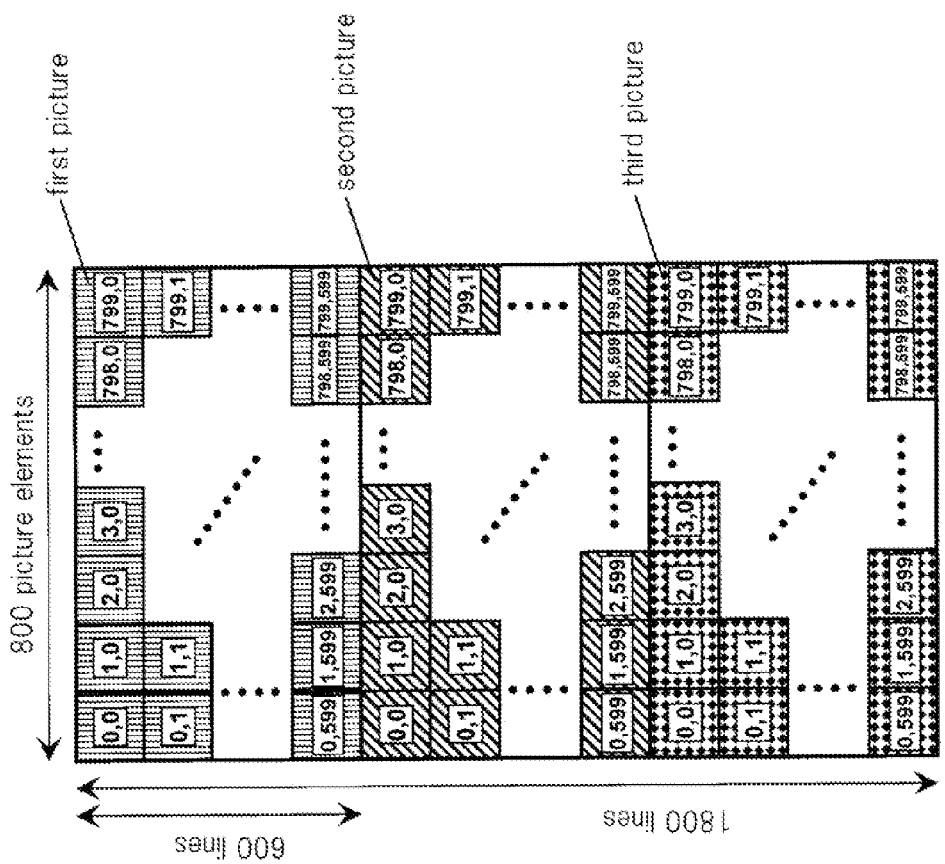
FIG. 11 is an explanatory view for describing an example of the field-sequential multiplexing method.

For example, when pictures are displayed in the order of first picture→second picture→third picture→ . . . in time-division display apparatus 3 and each picture element is scanned from the top and toward the bottom, the multiplexed picture is multiplexed from the top in the order of first picture, second picture, and third picture as shown in FIG. 11.

When the display order is unchanged with first picture→second picture→third picture→ . . . but each picture element is scanned from the bottom and toward the top in time-division display apparatus 3, each of the first to third pictures in the multiplexed picture is multiplexed from the top in the order of first picture, second picture, and third picture in a state in which the pictures are turned upside down. Similarly, when each picture element is skip-scanned, each of the first to third pictures is arranged to interlace.

Figure 12:
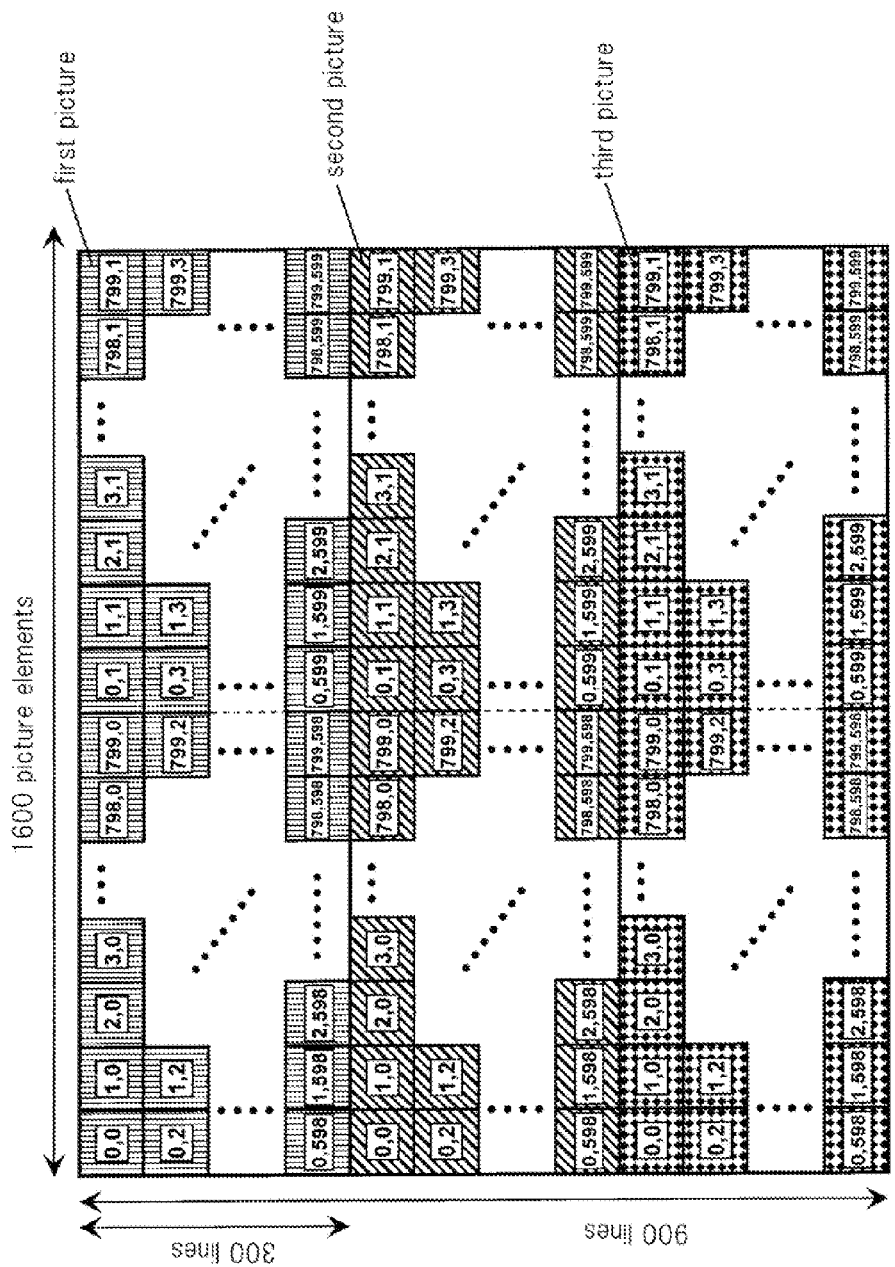
FIG. 12 is an explanatory view for describing another example of the field-sequential multiplexing method.

In this way, the first to third pictures can be transmitted in conformance with the display order and scanning order in time-division display apparatus 3. When each of the first to third pictures are multiplexed in the field-sequential format in this way, it is important that each of the first to third pictures be multiplexed and transmitted in the display order and scanning order of time-division display apparatus 3. Because the display order and scanning order of time-division display apparatus 3 should be the same as the transmission order of DVI, multiplexing unit 11 may multiplex each of the first to third pictures in, instead of the picture of 800 picture elements×1800 lines as shown in FIG. 11, a picture of 1600 picture elements×900 lines as shown in FIG. 12. The transmission order of each picture in FIG. 12 is the same as the transmission order in FIG. 11.

Time-Division Display Apparatus

Figures 13A, 13B:
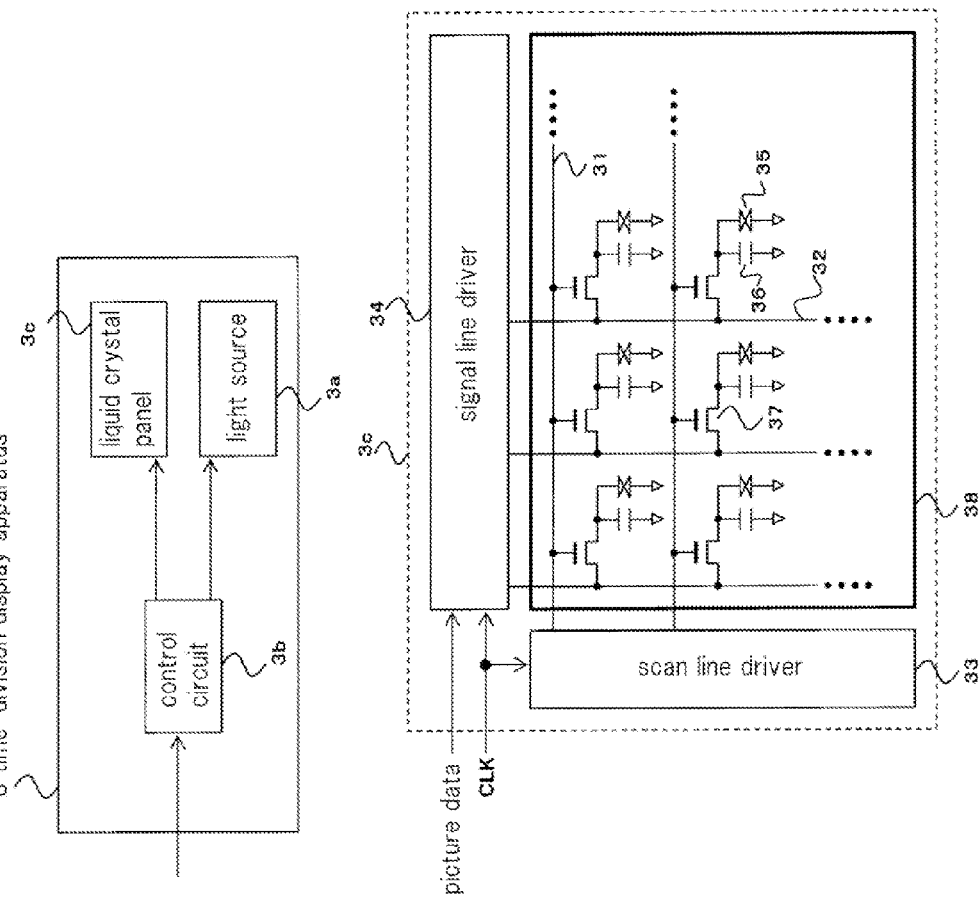
FIG. 13A is a block diagram showing an example of the configuration of a time-division display apparatus.
FIG. 13B is a block diagram showing an example of the configuration of a liquid crystal panel.

FIG. 13A is a block diagram showing an example of the configuration of time-division display apparatus 3. In FIG. 13A, time-division display apparatus 3 includes light source 3a, control circuit 3b, and liquid crystal panel 3c that includes a plurality of picture elements.

Light source 3a is, for example, an LED, and irradiates the plurality of picture elements of liquid crystal panel 3c.

Control circuit 3b, upon receiving an OD picture from picture processing apparatus 2, supplies this OD picture to liquid crystal panel 3c. In addition, control circuit 3b switches between lighting and extinguishing light source 3a.

FIG. 13B is a block diagram showing an example of the configuration of liquid crystal panel 3c.

In FIG. 13B, liquid crystal panel 3c includes: a plurality of scan lines 31 and a plurality of signal lines 32 that intersect each other, scan line driver 33 that controls signals that are applied as input to scan lines 31, signal line driver 34 that controls signals applied as input to signal lines 32, and a plurality of picture elements 35 provided in matrix form at each intersection of scan lines 31 and signal lines 32.

Liquid crystal panel 3c further includes a plurality of storage capacitors 36 and a plurality of thin-film transistors (TFT) 37 that have a switching function corresponding to each picture element 35. Picture elements 35 and storage capacitors 36 are connected in parallel, and TFT 37 are interposed between the intersections and picture elements 35. In addition, picture elements 35 have a configuration in which liquid crystal is sandwiched between a plurality of electrodes. The region of time-division display apparatus 3 that includes scan lines 31, signal lines 32, picture elements 35, storage capacitors 36, and thin-film transistors (TFT) 37 is assumed to be effective display area 38. Effective display area 38 is the area in which pictures are displayed.

Scan line driver 33 is one example of the scan line drive means. Scan line driver 33 selects scan lines 31 in a predetermined order and, by applying a scan voltage to scan lines 31 in the selected order, scans scan lines 31 and switches TFT 37 ON and OFF.

Signal line driver 34 is one example of the signal line drive means. Signal line driver 34 applies a gradation voltage to signal lines 32 according to the OD picture that was received from control circuit 3b. In this way, when TFT 37 is ON, the gradation voltage that accords with that picture is applied to storage capacitor 36 and picture element 35. Storage capacitors 36 hold the gradation voltage for a set time. The optical transmittance of the liquid crystal of picture element 35 changes according to the gradation voltage and a picture is displayed by the passage of light from light source 3a through the liquid crystal of this optical transmittance.

Scan line driver 33 is assumed to progressively scan the scan lines one line at a time from the top of the screen and toward the bottom. However, scan line driver 33 may scan the scan lines from the bottom of the screen and toward the top, or may scan while skipping every other line. Signal line driver 34 should supply a gradation voltage that accords with the picture to signal lines 32 in the order selected by scan line driver 33.

In this way, time-division display apparatus 3 is able to display a picture that accords with the OD picture. Time-division display apparatus 3 displays each OD picture that corresponds to each of the first to third pictures one time in each frame interval ($\frac{1}{60} \approx 16.7$ milliseconds).

Figure 14:
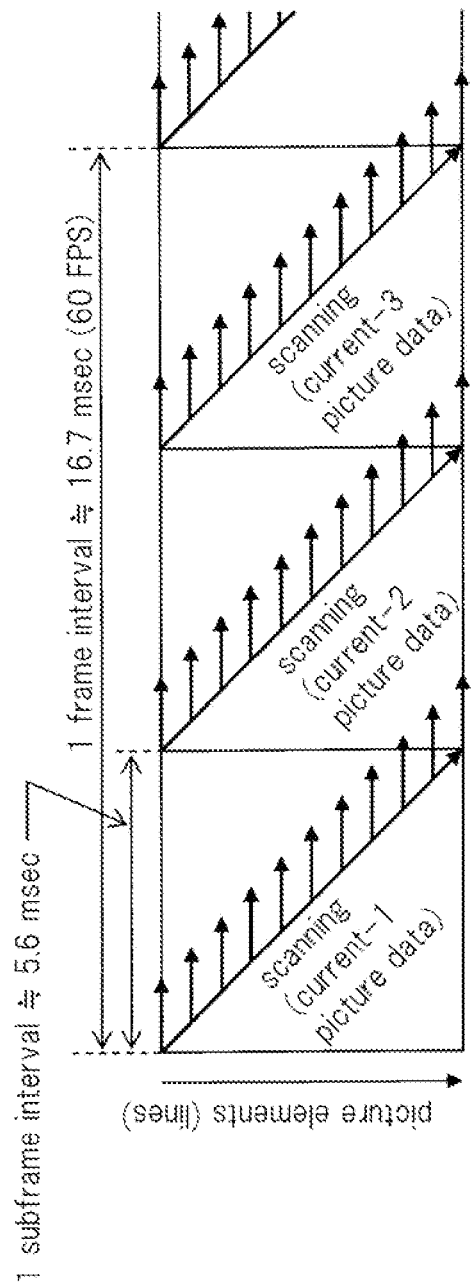
FIG. 14 is a timing chart for describing an example of the operation of a time-division display apparatus.

FIG. 14 is a timing chart for describing an example of the operation of one frame interval in time-division display apparatus 3 shown in FIG. 13A.

In FIG. 14, control circuit 3b constantly lights light source 3a. In addition, the scanning interval of each OD picture by scan line driver 33 of liquid crystal panel 3c is a subframe interval Ts that is equivalent to one-third of a one-frame interval (5.6 msec). Accordingly, a picture is always being displayed.

In FIG. 14, the order of displaying pictures is assumed to be the order: first picture→second picture→third picture, but other orders are also possible. However, when the order of displaying pictures in each frame is changed, the subframe frequency at which subframes are displayed may become smaller than 60 FPS even at a frame frequency of 60 FPS and flicker may become perceptible to the human eye. As a result, pictures are preferably displayed in the same order in all frames. Accordingly, multiplexing unit 11 preferably multiplexes pictures in the same order in all frames. However, this limitation does not apply when the frame frequency is high and all subframe frequencies can be kept to at least 60 FPS despite changes in order. According to the circumstances described above, a multiplexed picture is time-divided into each of the first to third pictures and displayed.

Figure 15:
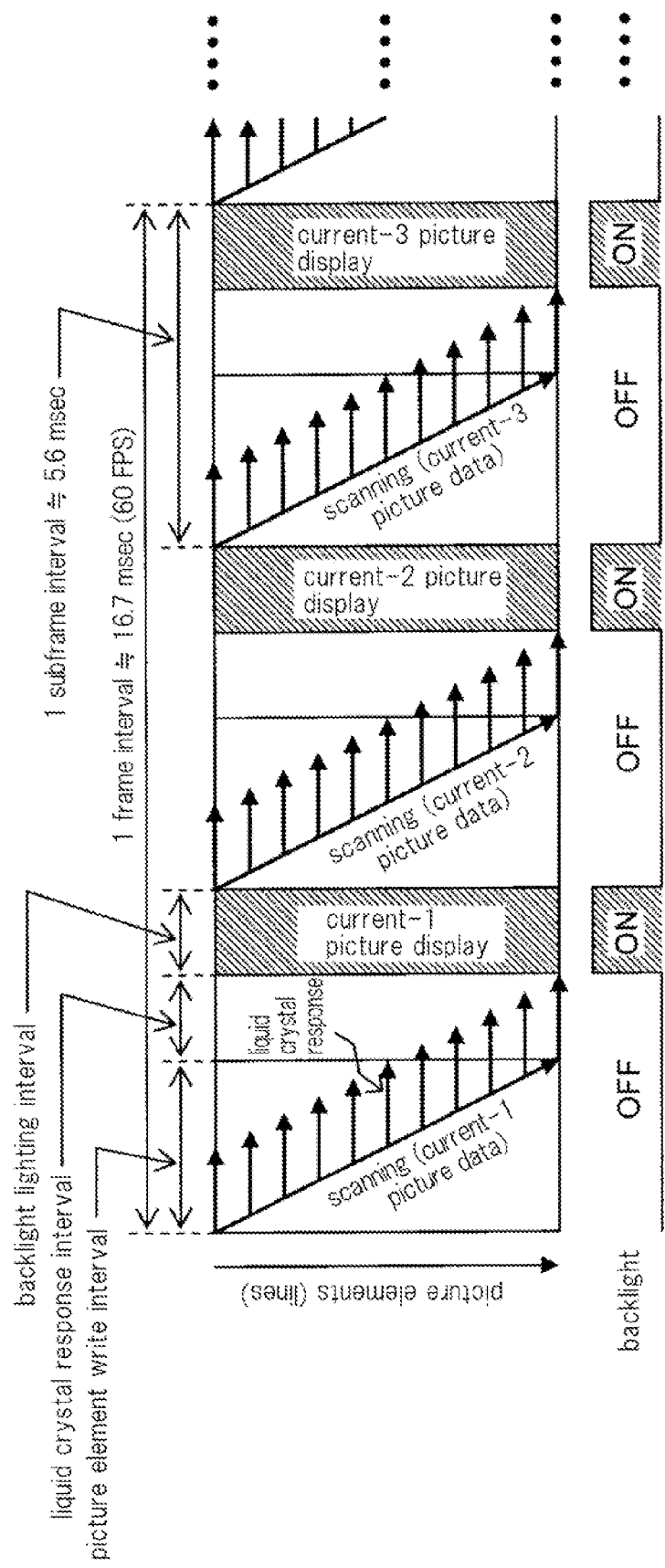
FIG. 15 is a timing chart for describing another example of the operation of a time-division display apparatus.

FIG. 15 is a timing chart for describing another example of the operation of one frame interval in time-division display apparatus 3 shown in FIG. 13A.

In FIG. 15, control circuit 3b of time-division display apparatus 3 both causes scan line driver 33 and signal line driver to scan each OD picture in a predetermined interval that is shorter than a one-frame interval (one subframe interval) Ts of the OD picture and extinguishes light source 3a in the predetermined interval. Control circuit 3b then lights light source 3a in intervals other than the predetermined interval. In this way, time-division display apparatus 3 scans an OD picture in an interval that is shorter than a subframe interval, and then, after the optical transmittance of the liquid crystal of each picture element 35 responds, implements backlight blinking drive that lights up the backlight. If K is assumed to be a real number that is greater than 1, the scan interval of each OD picture can be represented by Ts/K.

Because a picture is always being displayed in the example of FIG. 14, a phenomenon (crosstalk) may occur in which, when any one of the first to third pictures is selected by the ON/OFF switching over time of an optical shutter (to be described hereinbelow) to make pictures visible to the user, a picture other than the selected picture may become visible to the user. In the drive method of FIG. 15, on the other hand, there is time from the display of a particular picture until the display of the next picture, whereby the occurrence of crosstalk can be suppressed. In addition, compared to the drive method of FIG. 14, the drive method of FIG. 15 is closer to the drive method of an impulse type display apparatus such as a CRT display, and as a result, a clear image free of motion blur can be provided when displaying moving pictures with extreme movement.

However, although picture quality is improved in the backlight blinking drive described using FIG. 15, effective display area 38 must be scanned at a scanning speed that is twice that of the construction of FIG. 14.

Scan lines 31 or signal lines 32 are formed of a conductor constituted by an alloy of, for example, chrome (Cr) or aluminum (Al), but because the signal line length with respect to the signal line width is extremely long, these result in load composed of the resistance component and capacitance component when viewed from scan line driver 33 or signal line driver 34. In addition, picture elements 35, the resistance component of TFT 37, and storage capacitors 36 become the load of scan line driver 33 or signal line driver 34. Accordingly, the problem arises that as the scanning speed increases, scan line driver 33 or signal line driver 34 becomes unable to drive these loads, resulting in such problems as a drop in picture quality.

Figure 16:
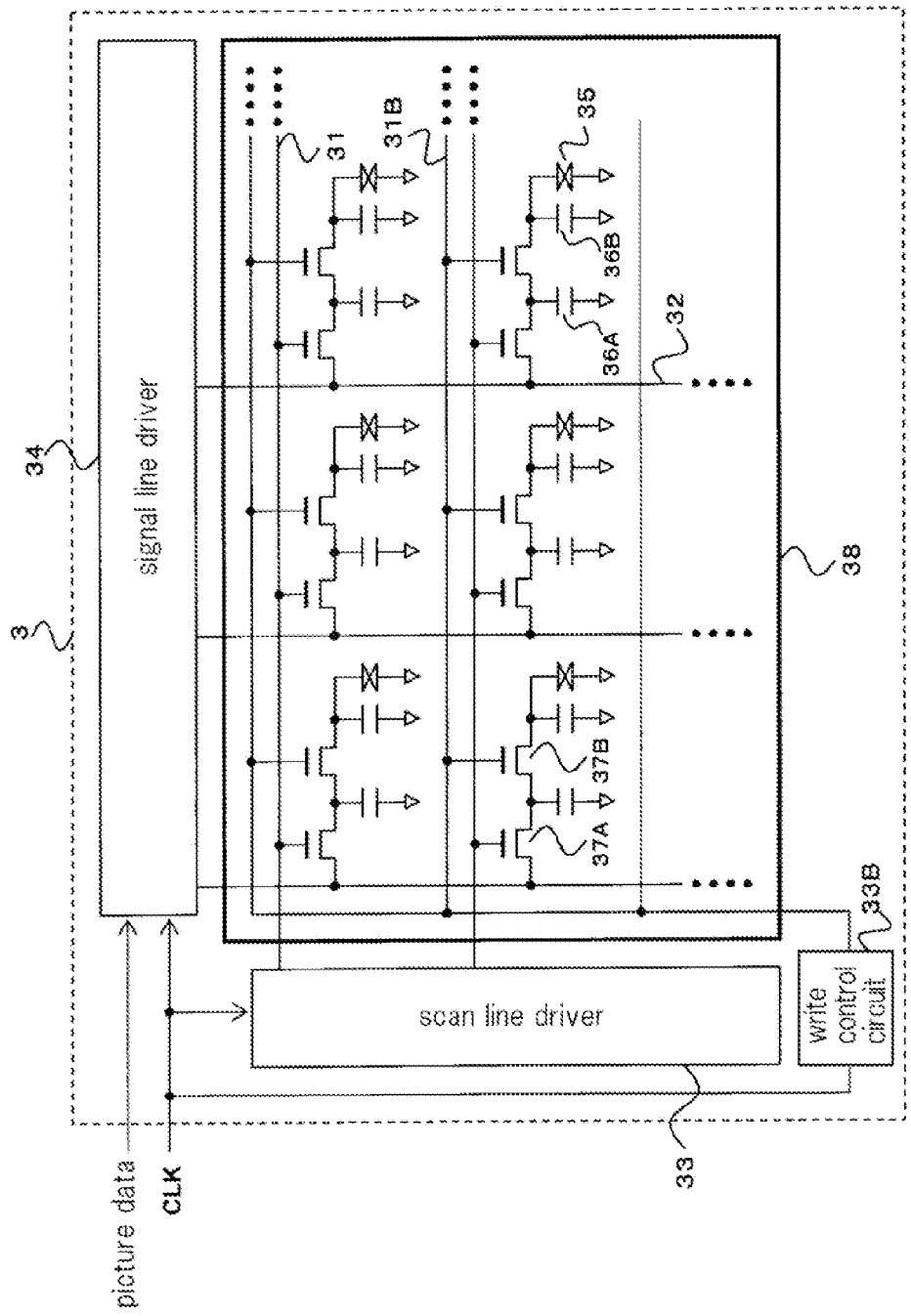
FIG. 16 is a block diagram showing another example of a time-division display apparatus.

FIG. 16 is a block diagram showing the construction of time-division display apparatus 3 that is capable of solving this problem by implementing backlight blinking drive without raising the scanning speed.

Time-division display apparatus 3 that is shown in FIG. 16 differs from the construction shown in FIG. 13 in that there are two TFT (TFT 37A and 37B) corresponding to each picture element 35, in that there are two storage capacitors (storage capacitors 36A and 36B), and in that write control circuit 33B is further provided.

Storage capacitor 36A is one example of a capacitor element and holds the gradation voltage for picture element 35 that corresponds to its own storage capacitance. Storage capacitor 36B has a function that is equivalent to that of storage capacitor 36 of FIG. 13.

TFT 37A is interposed between the intersection of scan line 31 and signal line 32 and storage capacitor 36A. TFT 37B is one example of a switch and is interposed between storage capacitor 36A and picture element 35.

Scan line driver 33 scans scan lines 31 and performs ON/OFF switching of TFT 37A.

Write control circuit 33B performs ON/OFF switching of TFT 37B. More specifically, write control circuit 33B implements substantially simultaneous ON/OFF switching of all TFT 37B. Write control circuit 33B may be incorporated in scan line driver 33 or signal line driver 34.

Figure 17:
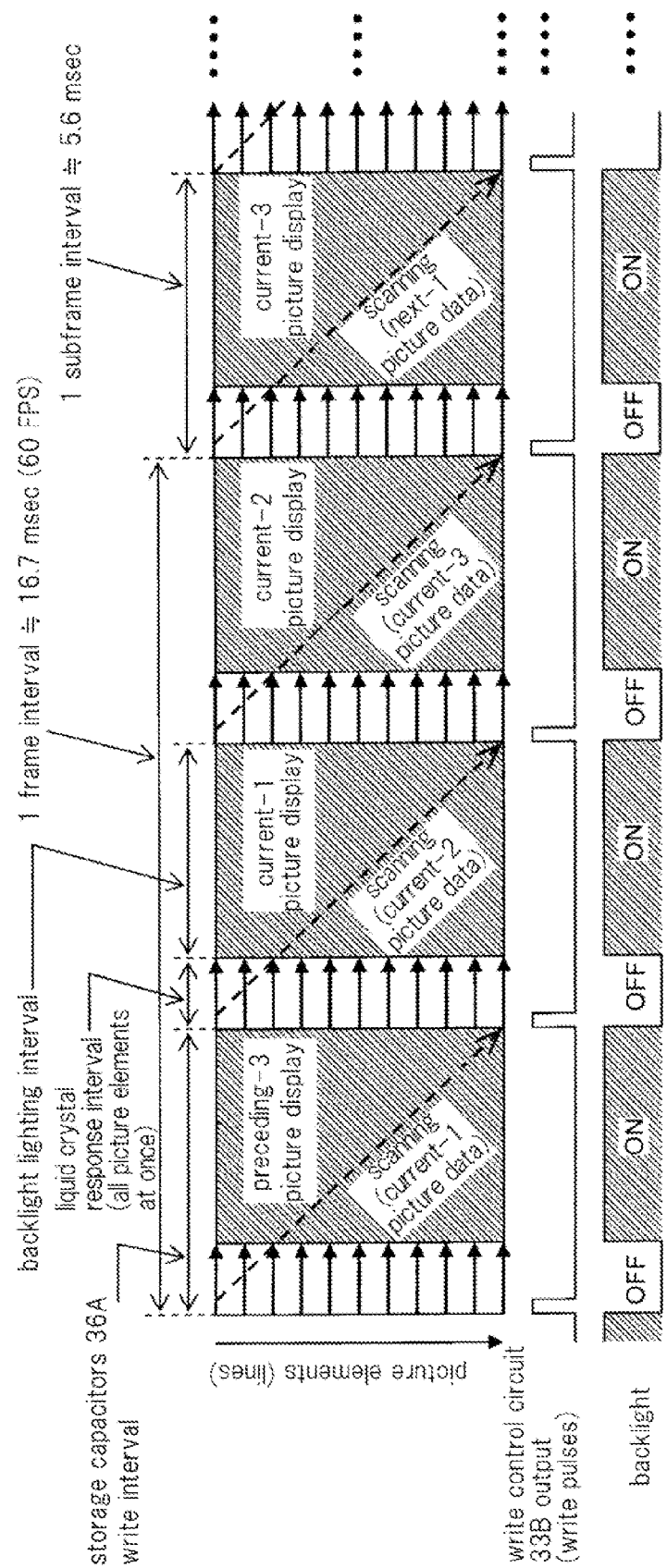
FIG. 17 is a timing chart for describing another example of the operation of a time-division display apparatus.

FIG. 17 is a timing chart for describing an example of the operation of a one-frame interval in time-division display apparatus 3 shown in FIG. 16.

Scan line driver 33 scans scan lines 31 and implements ON/OFF switching of TFT 37A. Signal line driver 34 applies gradation voltages that accord with the picture received from picture processing apparatus 2 to signal lines 32, whereby the gradation voltages that accord with the picture accumulate in storage capacitor 36A when TFT 37A are ON.

Scan line driver 33 supplies a scanning voltage to all scan lines 31, and when scanning of an entire picture is completed, write control circuit 33B turns ON all TFT 37B substantially simultaneously, whereby the gradation voltages that have accumulated in storage capacitor 36A are applied to picture element 35 and the entire screen changes to a new picture. Immediately afterward, write control circuit 33B turns OFF all TFT 37B, and scan line driver 33 and signal line driver 34 proceed to scan (write) the next picture data.

Control circuit 3b lights light source 3a from the time the gradation voltages are applied to picture elements 35 and the optical transmittance of the liquid crystal of picture elements 35 respond until TFT 37B turns ON. In this way, the picture preceding the picture that is being scanned is always displayed in time-division display apparatus 3. This scanning interval can be made longer than the case shown in FIG. 15, and can be made identical to one subframe interval (5.6 msec). Accordingly, backlight blinking drive can be realized without raising the scanning speed. In addition, because the lighting interval of light source 3c can be made longer than the case of FIG. 15, the brightness of the picture can be improved. Still further, when selection of a picture is not implemented by an optical shutter, the backlight may be always lighted.

When gradation voltages are written to all picture elements in write control circuit 33B, the voltages that are applied to picture elements 35 are determined by the capacitance coupling of storage capacitors 36A and storage capacitors 36B. When the gradation voltages of the preceding picture remain in storage capacitors 36B at this time, these residual voltages may cause the voltages that are applied to the picture element to diverge from the desired voltages. In order to suppress this voltage divergence, reset TFT may be further provided for resetting the voltage that is applied to each picture element 35 to a predetermined value (for example, the GND level).

When the reset TFT are turned ON immediately before voltages are written to all picture elements 35 and all picture elements 35 are reset all at once, the residual voltages are cancelled, whereby the desired voltages can be reliably written to all picture elements 35. The display picture quality can thus be improved.

OverDrive Operation

Figure 18:
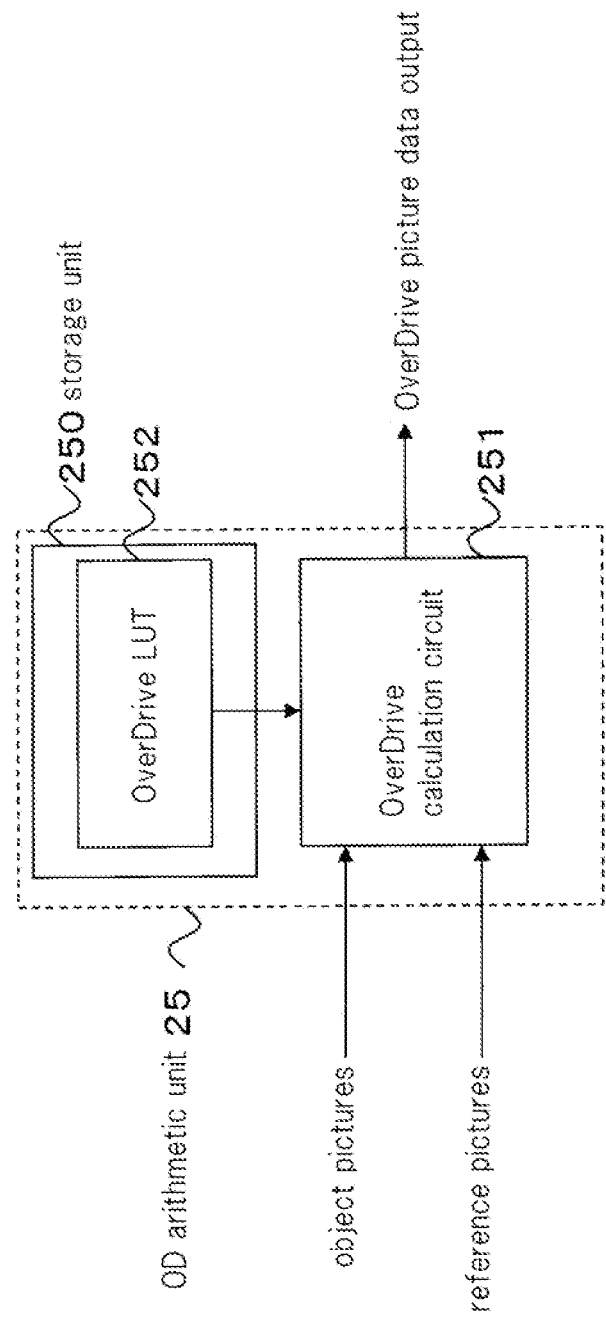
FIG. 18 is a block diagram showing an example of the configuration of an OverDrive arithmetic unit (OD arithmetic unit)

FIG. 18 is a block diagram showing an example of the configuration of OD arithmetic unit 25. In FIG. 18, OD arithmetic unit 25 includes storage unit 250 and OverDrive calculation circuit 251.

Storage unit 250 is, for example, ROM or RAM, and stores OverDrive Lookup Table (LUT) 252. OverDrive LUT 252 indicates the correspondence relation between the picture element values of OD pictures and combinations of the picture element values of object pictures and picture element values of reference pictures.

FIG. 19 is an explanatory view showing an example of OverDrive LUT 252. In FIG. 19, the picture element value of each picture element is assumed to be of eight bits.

In FIG. 19, OverDrive LUT 252 shows the correspondence relation between the picture element values of OD pictures and all combinations of the picture element values of object pictures and the picture element values of reference pictures. More specifically, the picture element values of OD pictures that correspond to combinations of the picture element values of object pictures and the picture element values of reference pictures are arranged in matrix form. For example, when the picture element value of an object picture is 1 and the picture element value of a reference picture is 3, the picture element value of the OD picture is 10.

OverDrive calculation circuit 251 refers to OverDrive LUT 252 to convert the picture element value of an object picture. More specifically, OverDrive calculation circuit 251 examines the picture element value of the object picture and the picture element value of the reference picture and converts the picture element value of the object picture to a picture element value of the OD picture that corresponds to the combination of the examined picture element values in OverDrive LUT 252.

Further, OverDrive LUT 252 need not be a matrix of 256 ($2^8$)×256 ($2^8$) having all combinations, as shown in FIG. 19. For example, OverDrive LUT 252 may indicate the correspondence relation between the picture element values of OD pictures and predetermined combinations among all combinations of the picture element values of object pictures and the picture element values of reference pictures, as shown in FIG. 20. In FIG. 20, OverDrive LUT 252 is an 8×8 matrix that indicates sets of picture element values for every 32 gradations.

In this case, if the combination of the picture element value of an object picture that has been received as input and the picture element value of a reference picture that has been received as input is in OverDrive LUT 252, OverDrive calculation circuit 251 selects the picture element value of the OD picture that corresponds to the combination.

On the other hand, if the combination of the picture element value of an object picture that is received as input and the picture element value of a reference picture that is received as input (hereinbelow also referred to as the input combination) is not in OverDrive LUT 252, OverDrive calculation circuit 251 calculates the picture element value of the OD picture based on that combination and a predetermined combination in OverDrive LUT 252.

For example, OverDrive calculation circuit 251 carries out linear interpolation based on, among predetermined combinations, the two adjacent combinations that are adjacent to the input combination and thus calculates the picture element value of the OD picture.

For example, when the picture element value of the object picture is 103 and the picture element value of the reference picture is 208, OverDrive calculation circuit 251 carries out linear interpolation based on the picture element values (71, 107, 55, 91) that correspond to the four combinations ((picture element value of object picture, picture element value of reference picture)=(96, 192), (128, 192), (96, 224), (128, 224)) indicated by the rounded-corner square of FIG. 20, and calculates the picture element value of the OD picture.

OverDrive calculation circuit 251 converts the picture element value of the object picture to the picture element value that was selected or calculated.

Dummy-Added Multiplexing Method

When time-division display apparatus 3 scans in a time that is shorter than a one-subframe interval in cases in which there is horizontal-vertical blanking in the scanning of time-division display apparatus 3 or when backlight blinking drive is carried out as shown in FIG. 15, dummy pictures that correspond to the blanking intervals may be inserted into the multiplexed picture.

Figure 21:
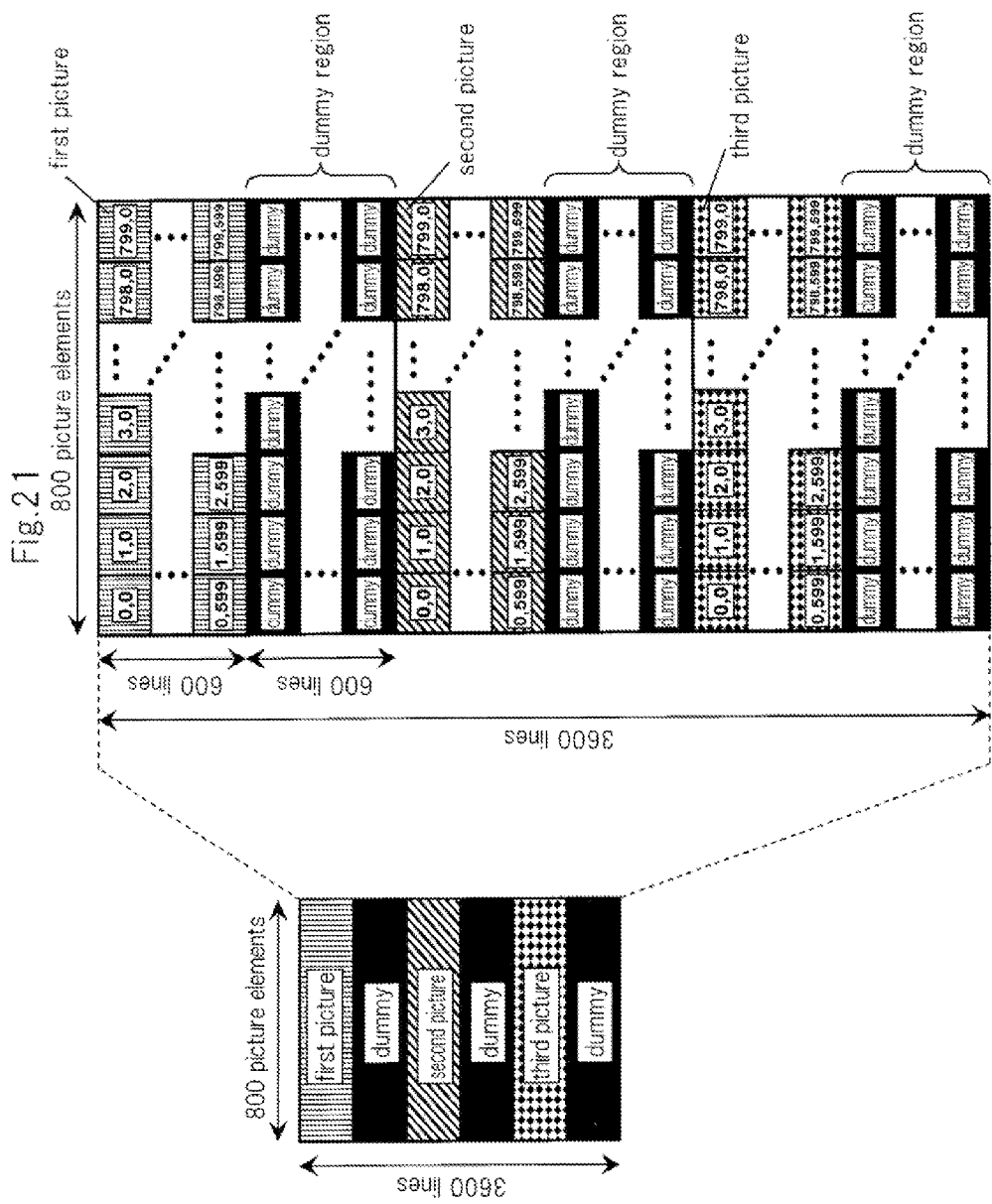
FIG. 21 is an explanatory view showing a multiplexed picture into which dummy pictures have been inserted.

FIG. 21 is an explanatory view showing a multiplexed picture in which dummy pictures have been inserted. The scanning interval in time-division display 3 is assumed to be an interval that is one-half of one subframe.

As shown in FIG. 21, multiplexing unit 11 multiplexes in field-sequential format dummy pictures that correspond to non-scanning intervals (such as a liquid crystal response interval and backlight lighting interval) for each of the first to third pictures, and multiplexes the picture in which these dummy pictures were multiplexed in field-sequential format. In this way, dummy pictures are inserted between the first picture and second picture, between the second picture and third picture, and under the third picture.

When the subframe interval is set to Ts and the scanning interval of OD pictures in time-division display apparatus 3 is T/K, the number of picture elements of the dummy pictures is K−1 times the number of picture elements of each of first to third pictures. K is a real number greater than 1.

In the following description, K is assumed to be 2. In other words, the display interval of an OD picture is T/2, and the number of picture elements of a dummy picture is the same as the number of picture elements of each of the first to third pictures (800 picture elements×600 lines). Accordingly, the multiplexed picture in which dummy pictures are added is twice the size of the multiplexed picture shown in FIG. 11, i.e., a picture of 800 picture elements×3600 lines.

When the multiplexed picture increases in size in this way in the single link mode as defined by the DVI standard, the transmission band may become inadequate and prevent the transmission of the multiplexed picture. In such cases, the multiplexed picture can be transmitted by using cables, transceivers, and receivers that conform to the dual link mode defined by the DVI standard. In comparatively new image transmission standards such as HDMI or DisplayPort, a broader transmission band than DVI is secured, whereby a larger multiplexed picture can be transmitted.

Figure 22:
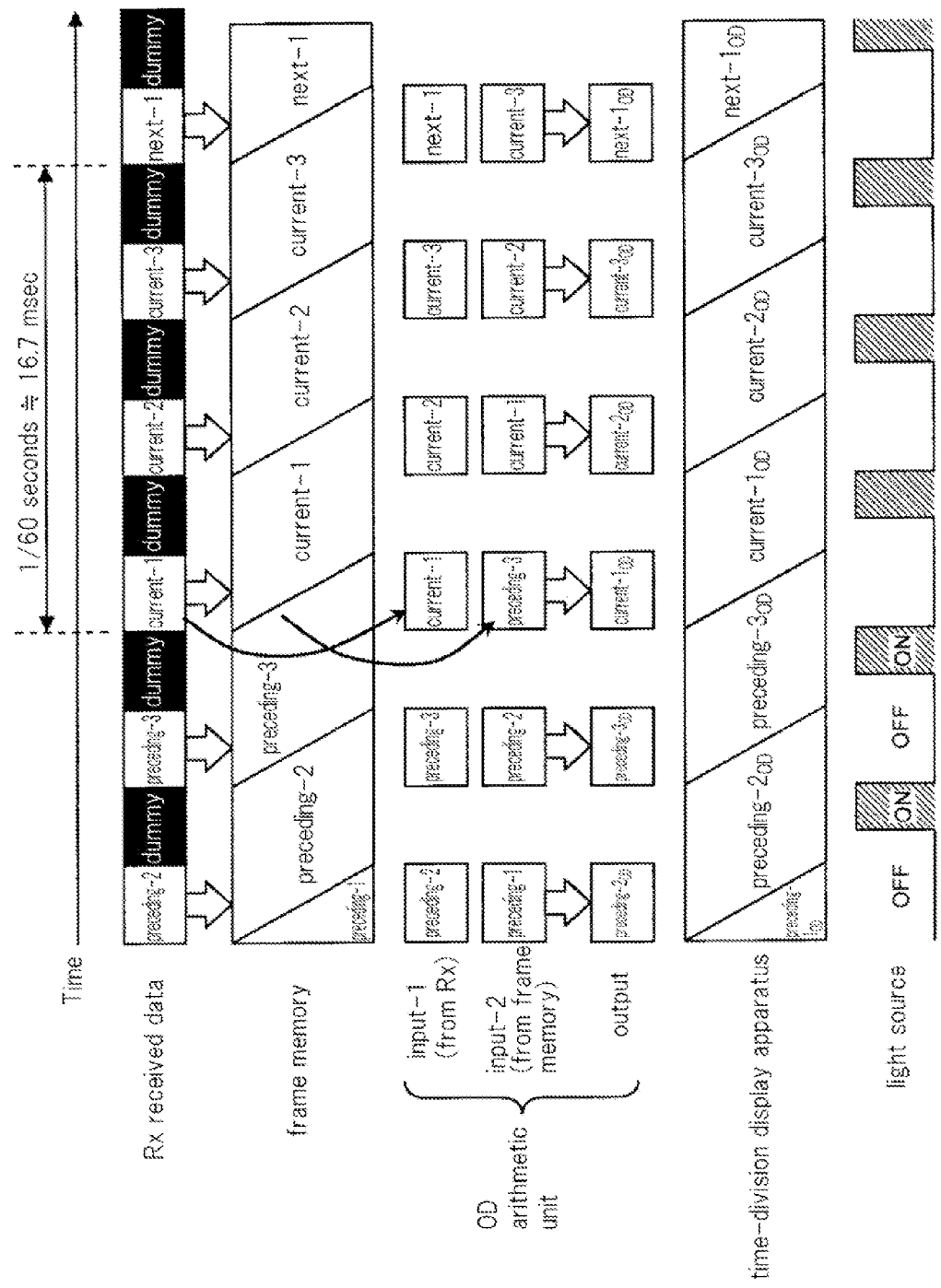
FIG. 22 is a timing chart for describing another example of the operation of the picture transmission system of the first exemplary embodiment.

FIG. 22 is a timing chart for describing an example of the operation of the picture transmission system in a case in which the multiplexed picture shown in FIG. 21 is transmitted.

With each reception of data (picture element values) in a multiplexed picture, reception unit 21 supplies these received data to controller 22 and OD arithmetic unit 25.

Controller 22, upon receiving the header data of a subframe of a multiplexed picture (hereinbelow assumed to be current-1) from reception unit 21, sets the write address of frame memory 23 in the header. Controller 22 then sequentially writes the data of current-1 to frame memory 23. When controller 22 writes the last data of current-1, it discards all of the subsequent dummy pictures. When the multiplexed picture switches from current-1 to current-2, controller 22 returns the write address to the header of and sequentially writes current-2 to frame memory 23 as with current-1.

Dummy pictures are thus all discarded, whereby the amount of memory of frame memory 23 is the same as for a case in which there are no dummy pictures. In other words, the amount of memory of frame memory 23 may be of a size that allows storage of one of first to third pictures, or in other words, may be ⅙ the size of a multiplexed picture.

OD arithmetic unit 25 receives a picture from reception unit 21 or reads a picture from frame memory 23. OD arithmetic unit 25 carries out an OverDrive operation on the picture element value of the picture that was received from reception unit 21 based on a picture read from frame memory 23 to generate an OD picture and supplies this OD picture to time-division display apparatus 3.

At this time, the speed at which OD arithmetic unit 25 reads a picture from frame memory 23 must be made the same as the scanning speed of time-division display apparatus 3, and this is faster than the case of FIG. 9. More specifically, when the scanning interval of an OD picture is Ts/K, the speed of reading this picture is a multiple K (two times when the multiplexed picture is the case of FIG. 21) of a case in which the scanning interval of an OD picture is Ts.

Time-division display apparatus 3 receives the data of the current-1 OD, scans in an interval that is one half of one subframe interval, and lights the backlight after waiting for the liquid crystal response.

The effect is next described.

In the present exemplary embodiment, multiplexing unit 11 multiplexes N pictures in the order of display to generate a multiplexed picture. Transmission unit 12 transmits this multiplexed picture. Frame memory 23 delays, by exactly one frame interval of the pictures (one subframe interval), the pictures in the multiplexed picture that was received by reception unit 21 and generates reference pictures. With each reception of a picture in the multiplexed picture by reception unit 21, OD arithmetic unit 25 converts the picture element value of the picture (the object picture) based on the reference picture to generate an OverDrive picture. Time-division display apparatus 3 displays the OverDrive picture. In addition, because the multiplexed picture is multiplexed in the order of display, the reference pictures have display order that precedes by one the object pictures.

As a result, the picture element values of object pictures in a multiplexed picture are converted based on the reference pictures that immediately precede the object pictures in display order. Accordingly, the picture element values of the object pictures can be accurately converted and the picture quality of the object pictures can be improved.

In addition, in the present exemplary embodiment, multiplexing unit 11 multiplexes pictures in display order in a field-sequential format. When time-division display apparatus 3 takes one subframe interval as Ts, the scanning interval of an OverDrive picture is Ts.

In this case, the transmission speed of each picture and the scanning speed of the OverDrive picture that corresponds to that picture are identical, obviating the need for components such as a frame memory to adjust the scanning speed. A reduction of costs can therefore be achieved.

In the present exemplary embodiment, moreover, multiplexing unit 11 multiplexes in each picture in field-sequential format dummy pictures of a number that is a multiple of K−1 of the number of picture elements of the picture, where K is taken as a real number greater than 1, and multiplexes in field-sequential format the display pictures in which these dummy pictures have been multiplexed. Time-division display apparatus 3 takes the OverDrive picture scanning interval as Ts/K.

In this case, backlight blinking drive can be realized without raising the scanning speed.

In addition, in the present exemplary embodiment, storage unit 250 in OD arithmetic unit 25 stores OverDrive LUT 252 that indicates the correspondence relation between the picture element values of OD pictures and combinations of the picture element values of object pictures and the picture element values of reference pictures. OverDrive calculation circuit 251 of OD arithmetic unit 25 refers to OverDrive LUT 252 that is stored in storage unit 250 to convert the picture element values of object pictures.

In this case, the picture element values of object pictures can be converted easily and accurately.

In the present exemplary embodiment, moreover, OverDrive LUT 252 indicates the correspondence relation between the picture element values of OD pictures and all combinations of the picture element values of object pictures and the picture element values of reference pictures. OverDrive calculation circuit 251 converts the picture element values of object pictures to the picture element values of the OD pictures that correspond to combinations of all the picture element values of object pictures and picture element values of reference pictures in OverDrive LUT 252.

In this case, the amount of calculation for finding the picture element values of OD pictures can be reduced.

In the present exemplary embodiment, OverDrive LUT 252 indicates the correspondence relation between the picture element values of OD pictures and predetermined combinations of the picture element values of object pictures and the picture element values of reference pictures. When the combination of the picture element value of an object picture that has been received as input and the picture element value of a reference picture that has been received as input is in OverDrive LUT 252, OverDrive calculation circuit 251 converts the picture element value of the object picture to the picture element value of the OD picture that corresponds to the combination. On the other hand, when the combination of the picture element value of an object picture that is received as input and the picture element value of a reference picture that is received as input is not in OverDrive LUT 252, OverDrive calculation circuit 251 calculates the picture element value of the OD picture based on this combination and predetermined combinations and converts the picture element value of the object picture to the picture element value that was calculated.

In this case, the amount of memory for storing OverDrive LUT 252 can be reduced.

Second Exemplary Embodiment

Figure 23:
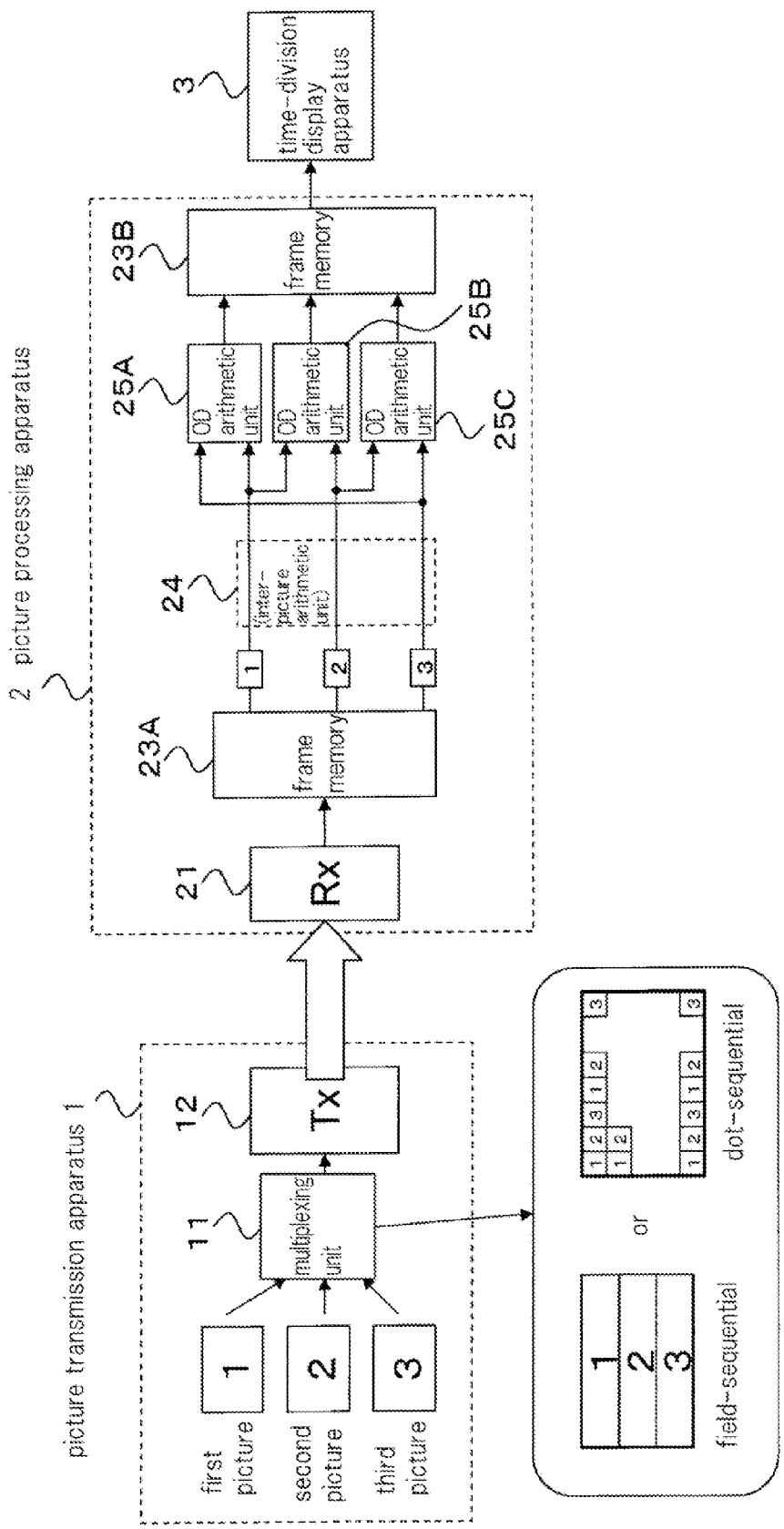
FIG. 23 is a block diagram showing the picture transmission system in the second exemplary embodiment.

FIG. 23 is a block diagram showing the picture transmission system in the second exemplary embodiment of the present invention. In FIG. 23, the picture transmission system includes picture transmission apparatus 1, picture processing apparatus 2, and time-division display apparatus 3.

Picture transmission apparatus 1 has the same configuration as shown in FIG. 8. Multiplexing unit 11 of picture transmission apparatus 1 multiplexes pictures of three types in field-sequential format in the first exemplary embodiment, but in the present exemplary embodiment, multiplexing unit 11 multiplexes pictures of three types in field-sequential format or dot-sequential format.

Picture processing apparatus 2 includes reception unit 21, input-side frame memory 23A, output-side frame memory 23B, and OD arithmetic unit that includes OD arithmetic units 25A-25C. In addition, picture processing apparatus 2 may be further provided with inter-picture arithmetic unit 24.

Frame memory 23A is one example of the memory means. Frame memory 23A stores all of first to third pictures in a multiplexed picture that is received by reception unit 21. In other words, in contrast to frame memory 23 of FIG. 8, frame memory 23A requires a memory capacity that can store three pictures.

The arithmetic units convert the picture element values of each of the first to third pictures in frame memory 23 based on the reference pictures that are stored in frame memory 23 and for which the display order precedes by one that of the pictures to generate three OD pictures that correspond to each of the first to third pictures. The arithmetic units are one example of the generation means.

In this case, preceding-3, which is the picture having a display order that precedes the picture order of the first picture (assumed to be current-1) by one, is not stored in frame memory 23, and the arithmetic unit therefore uses current-3 as the reference picture to convert the picture element value of current-1.

Each of OD arithmetic units 25A-25C has a one-to-one correspondence to one of the first to third pictures in the multiplexed picture and converts the picture element value of the corresponding picture. In the following explanation, it is assumed that OD arithmetic unit 25A corresponds to the first picture, OD arithmetic unit 25B corresponds to the second picture, and OD arithmetic unit 25C corresponds to the third picture.

Frame memory 23B is one example of the recording means. Frame memory 23B stores all three OD pictures that were generated from the pictures in the same multiplexed picture by the arithmetic units. Accordingly, frame memory 23B must have a memory capacity that is capable of storing three pictures.

Time-division display apparatus 3 has the same configuration as shown in FIG. 13 or FIG. 16. Time-division display apparatus 3 progressively displays the three pictures that were stored in frame memory 23B on effective display area 38 in the display order.

Multiplexing Method: Dot-Sequential

The method of multiplexing pictures by dot-sequential is next described.

Figure 24:
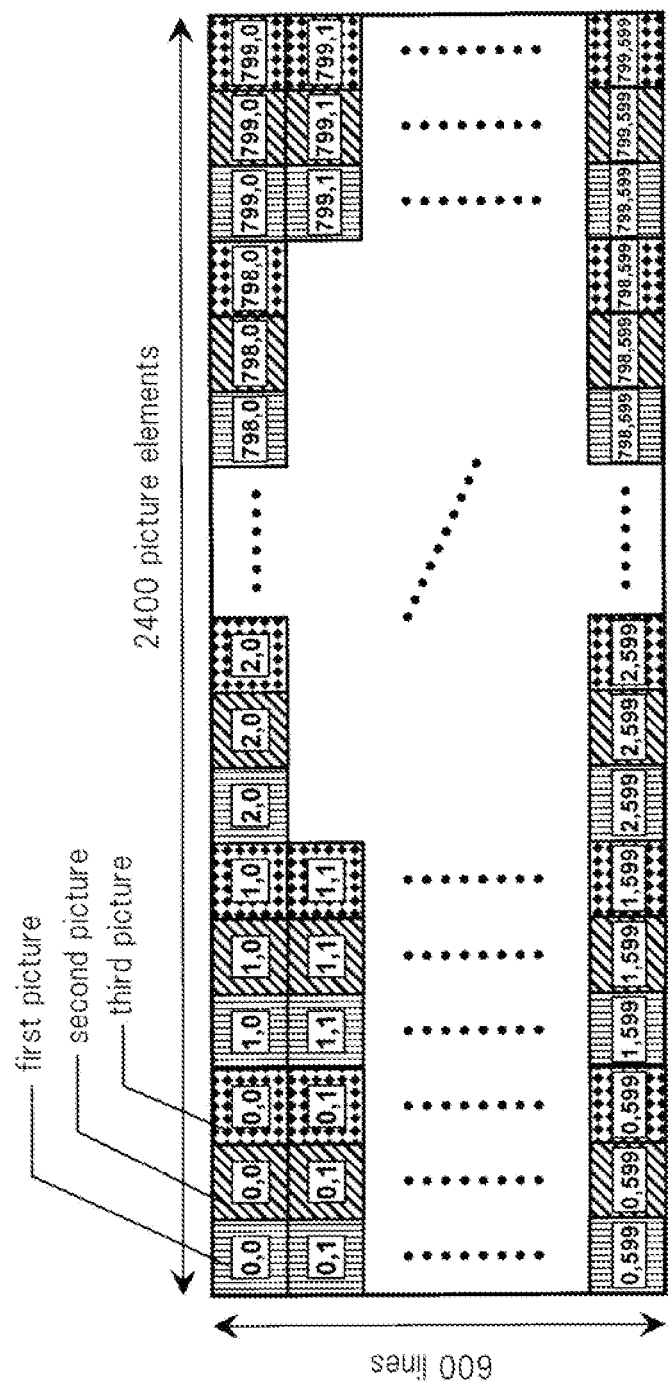
FIG. 24 is an explanatory view for describing an example of the dot-sequential multiplexing method.

Multiplexing unit 11 multiplexes first to third pictures into a multiplexed picture (2400 picture elements×600 lines) such as shown in FIG. 24. More specifically, multiplexing unit 11 multiplexes first to third pictures in a dot-sequential format in which the picture element values of the same position of each of the first to third pictures are arranged in a series.

In FIG. 24, multiplexing is carried out in the order of the first picture, second picture, and third picture at each picture element, but in the dot-sequential format, in contrast to the field-sequential format, pictures need not be multiplexed in the display order. In a multiplexing method according to the dot-sequential format, it is important that the picture element values of the same position of the first to third pictures be transmitted at substantially the same time. Accordingly, in the present exemplary embodiment, pictures need not necessarily be multiplexed in the dot-sequential format, and multiplexing need only be carried out such that the picture element values of the same position of the first to third pictures are transmitted at times that are proximate to a certain degree. However, when a large time divergence occurs for the picture element values of the same position, the memory capacity of the memory for adjusting the order in picture processing apparatus 2 increases in size.

Figure 25:
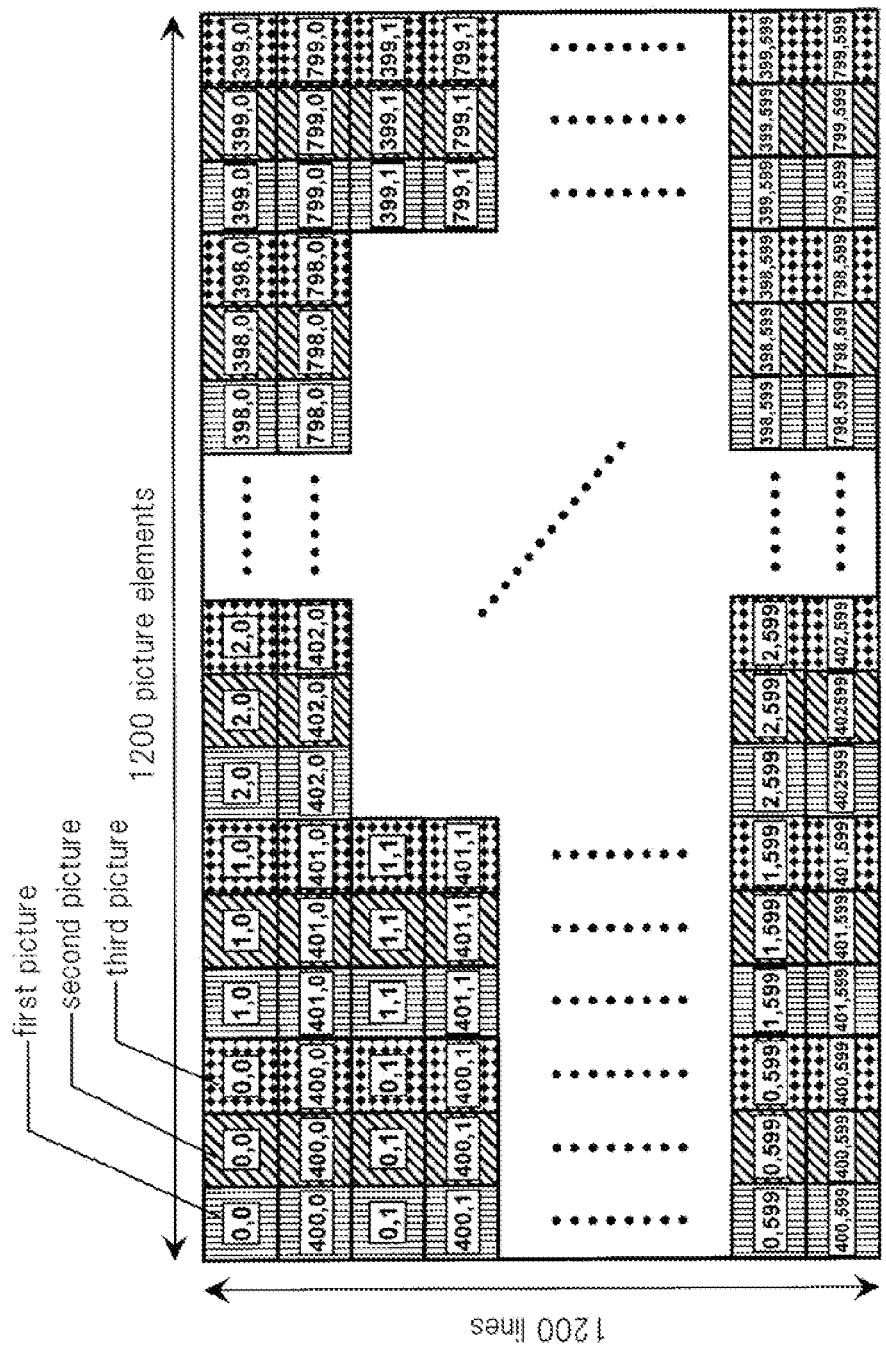
FIG. 25 is an explanatory view for describing another example of the dot-sequential multiplexing method.

In addition, the size of a multiplexed picture can be adjusted within a range in which the transmission order does not change, similar to the case of field-sequential format. In other words, multiplexing unit 11 may multiplex the first to third pictures into a multiplexed picture of 1200 picture elements×1200 lines as shown in FIG. 25.

Operation of the Picture Transmission System: Field-Sequential

Figure 26:
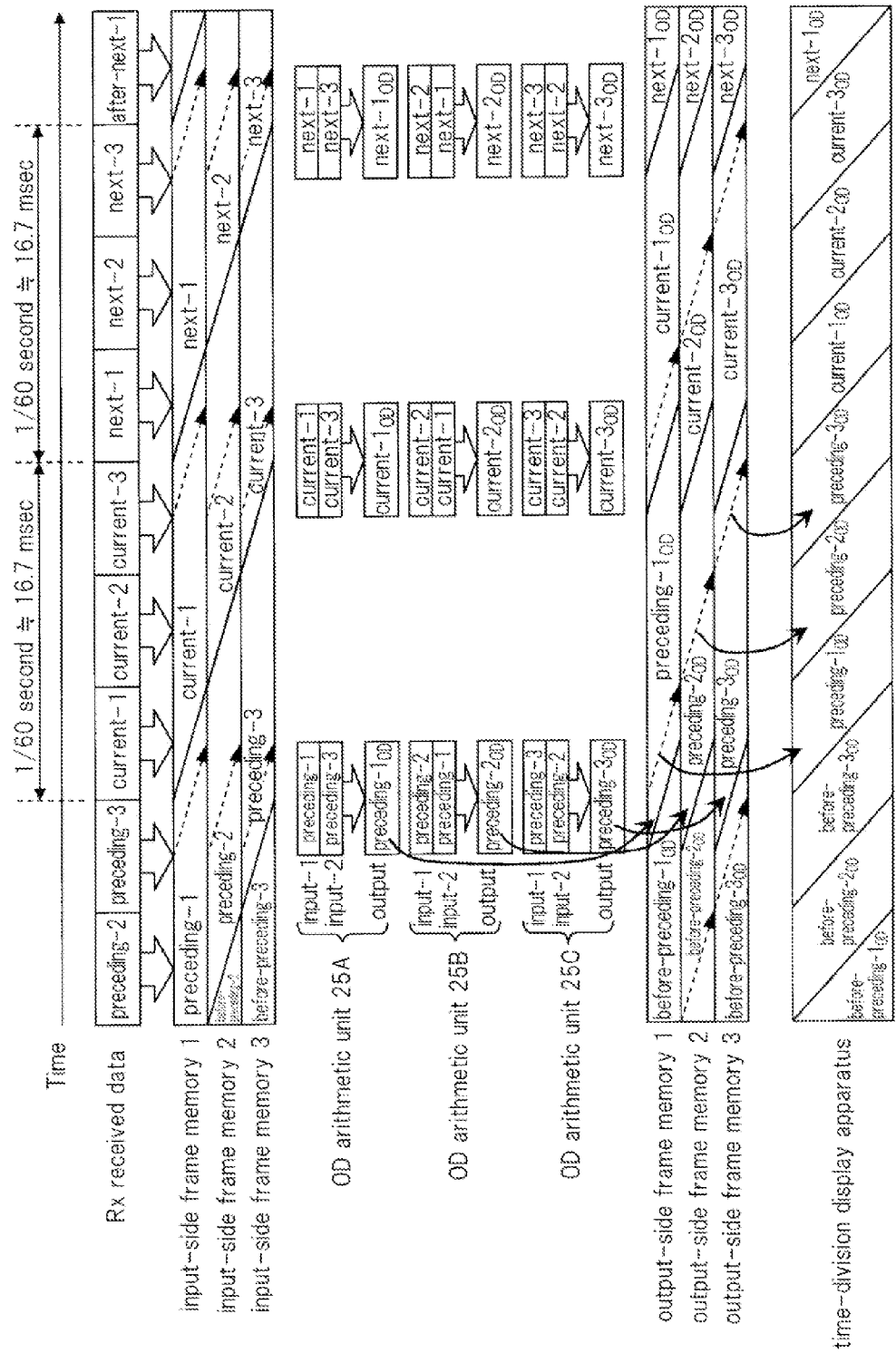
FIG. 26 is a timing chart for describing an example of the operation of the picture transmission system of the second exemplary embodiment.

FIG. 26 is a timing chart for describing an example of the operation of the picture transmission system when transmitting a multiplexed picture that has been multiplexed in the field-sequential format. The scanning interval of each OD picture is assumed to be the same as the subframe interval Ts.

Each picture in a multiplexed picture that is received by reception unit 21 is stored in frame memory 23A by a controller (not shown). Here, the controller, upon receiving subframe (hereinbelow assumed to be current-1) header data of a multiplexed picture from reception unit 21, sets the write address of frame memory 23 in the header. The controller then proceeds to sequentially write current-1 to current-3 to frame memory 23A. When the multiplexed picture switches from current-3 to next-1, the controller returns the write address to the header and sequentially writes next-1 to next-3 in frame memory 23.

The controller simultaneously reads current-1 to current-3 that are stored in frame memory 23A in the interval from the end time of writing current-2 until the start time of writing next-1. As a result, the speed of reading from frame memory 23A must be the speed for reading all of current-1 to current-3 in the one-third of a one-frame interval. This speed is hereinbelow referred to as triple speed.

The arithmetic units convert the picture element values of each of current-1 to current-3 that were read to generate three OD pictures (current-1 OD to current-3 OD) that correspond to each of current-1 to current-3, respectively. More specifically, OD arithmetic unit 25A takes current-1 as the object picture and carries out an OverDrive operation with current-3 as the reference picture to generate an OverDrive picture (current-1 OD) of current-1. OD arithmetic unit 25B takes current-2 as the object picture and carries out an OverDrive operation with current-3 as the reference picture to generate an OverDrive picture (current-2OD) of current-2. OD arithmetic unit 25C takes current-3 as the object picture and carries out an OverDrive operation with current-2 as the reference picture to generate current-3 OverDrive picture (current-3 OD).

All of current-1 OD to current-3 OD that were generated in the arithmetic units are written to frame memory 23B in an interval of one-third of a one-frame interval. As a result, the speed of writing to frame memory 23B is a speed in which all of current-1 to current-3 are written in an interval that is one third of a one-frame interval. This speed is hereinbelow referred to as triple speed.

Time-division display apparatus 3 reads and displays current-1 OD to current-3 OD from frame memory 23B in display order in field-sequential format.

Operation of the Picture Transmission System: Dot-Sequential

Figure 27:
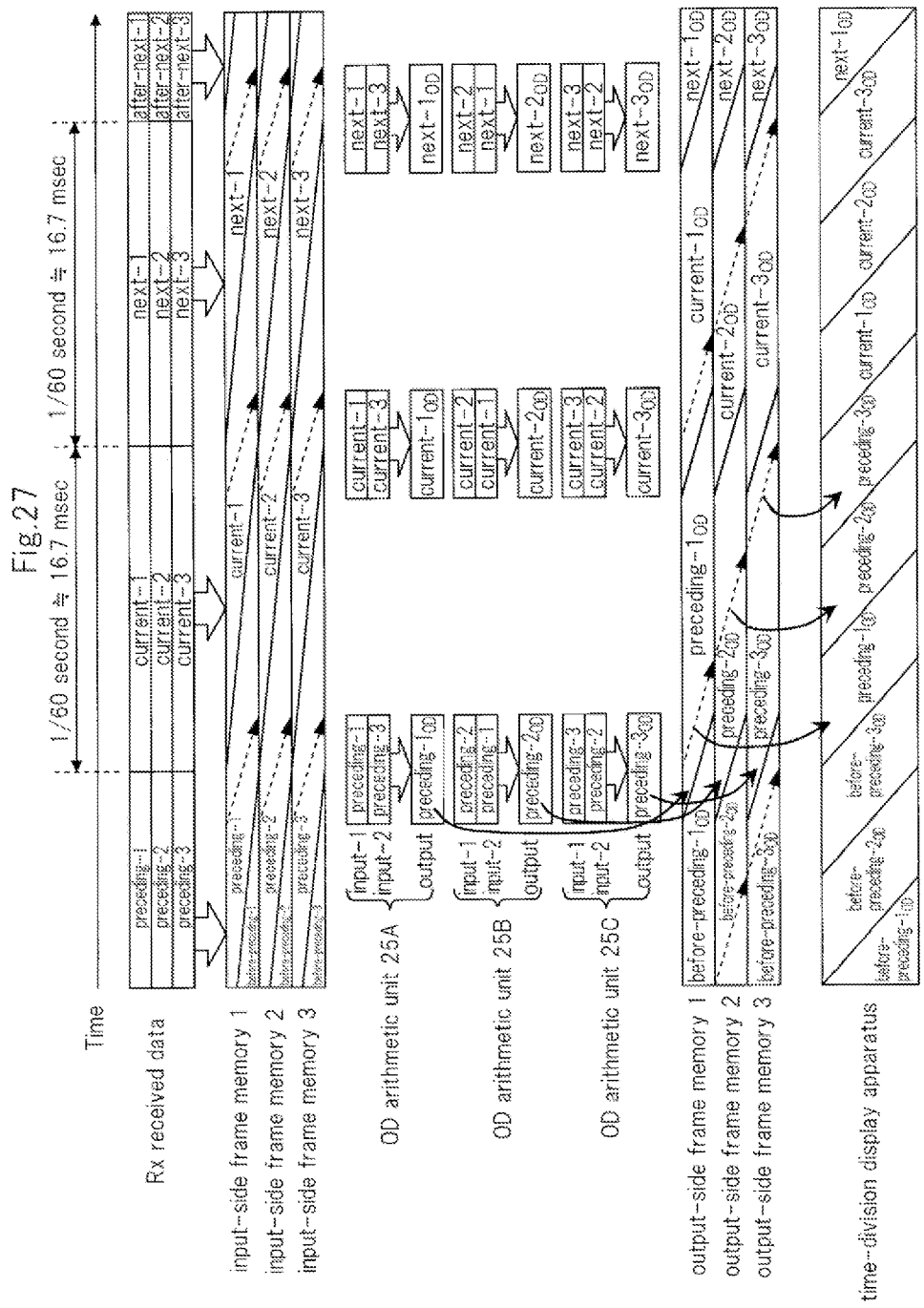
FIG. 27 is a timing chart for describing another example of the operation of the picture transmission system of the second exemplary embodiment.

FIG. 27 is a timing chart for describing an example of the operation of the picture transmission system when transmitting a multiplexed picture that has been multiplexed in dot-sequential format. In time-division display apparatus 3, it is assumed that the scanning time of each OD picture is the same as the subframe interval Ts.

Each picture in a multiplexed picture that was received by reception unit 21 is stored in frame memory 23A by a controller (not shown). Because the multiplexed picture is here multiplexed in the dot-sequential format, the controller (not shown) proceeds by writing current-1 to current-3 to frame memory 23A simultaneously. When the multiplexed picture switches to next-1 from the last picture elements of current-1 to current-3, the controller returns the write address to the header and proceeds to simultaneously write next-1 to next-3 to frame memory 23A.

The arithmetic unit that includes OD arithmetic units 25A to 25C reads current-1 to current-3 in frame memory 23A at triple speed in the interval from the time of one subframe before the time at which the storage of current-1 to current-3 is completed until the time at which the storage of current-1 to current-3 is completed.

The arithmetic unit converts the picture element values of each of current-1 to current-3 that were read to generate and supply as output three OD pictures (current-1 OD-current-3 OD) that correspond to each of current-1 to current-3. The method of generating these OD pictures is the same as for the field-sequential format (FIG. 26).

Current-1 OD to current-3 OD that were supplied from the arithmetic unit are written at triple speed to frame memory 23B. Time-division display apparatus 3 reads and displays current-1 OD to current-3 OD from frame memory 23B in display order in the field-sequential format.

A Case of Multiplexing N Pictures

When N pictures (first picture to Nth picture) are multiplexed into one multiplexed picture, time-division display apparatus 3 displays the N pictures in display order in one frame interval.

Figure 28:
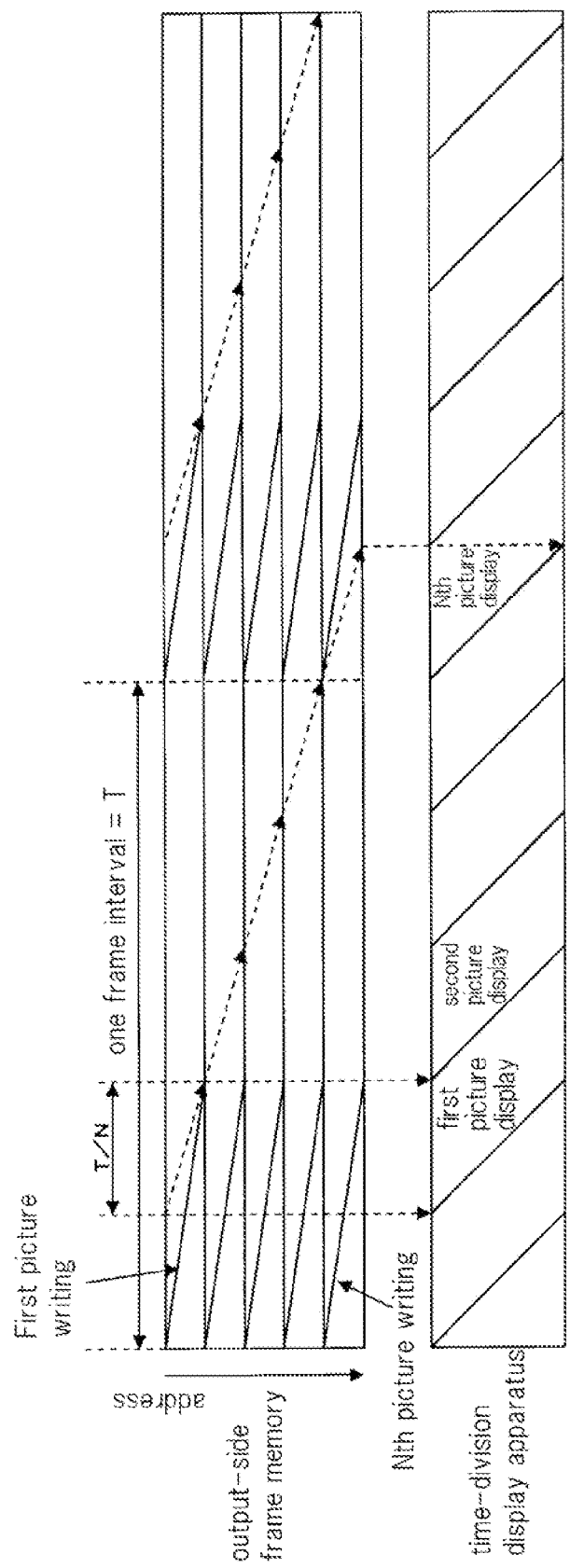
FIG. 28 is a timing chart for describing the operation of frame memory 23B in a case in which N pictures are multiplexed.

In this case, time-division display apparatus 3 must read N OD pictures from frame memory 23B in a one-frame interval and therefore reads each of the OD pictures in an interval of 1/N of a one-frame interval T (T/N) as shown in, FIG. 28. In other words, time-division display apparatus 3 reads N OD pictures at a speed that is a multiple of N.

The time of writing OD pictures to frame memory 23B is longest when the timing of starting reading of the first picture is the same as the timing of completing the writing of the first picture, and moreover, the timing of starting reading of the Nth picture is the same as the timing of starting writing of the first picture of the next frame. In other words, the speed of writing to frame memory 23B should be at least ½, i.e., N/2 the speed of reading from frame memory 23B.

Figure 29:
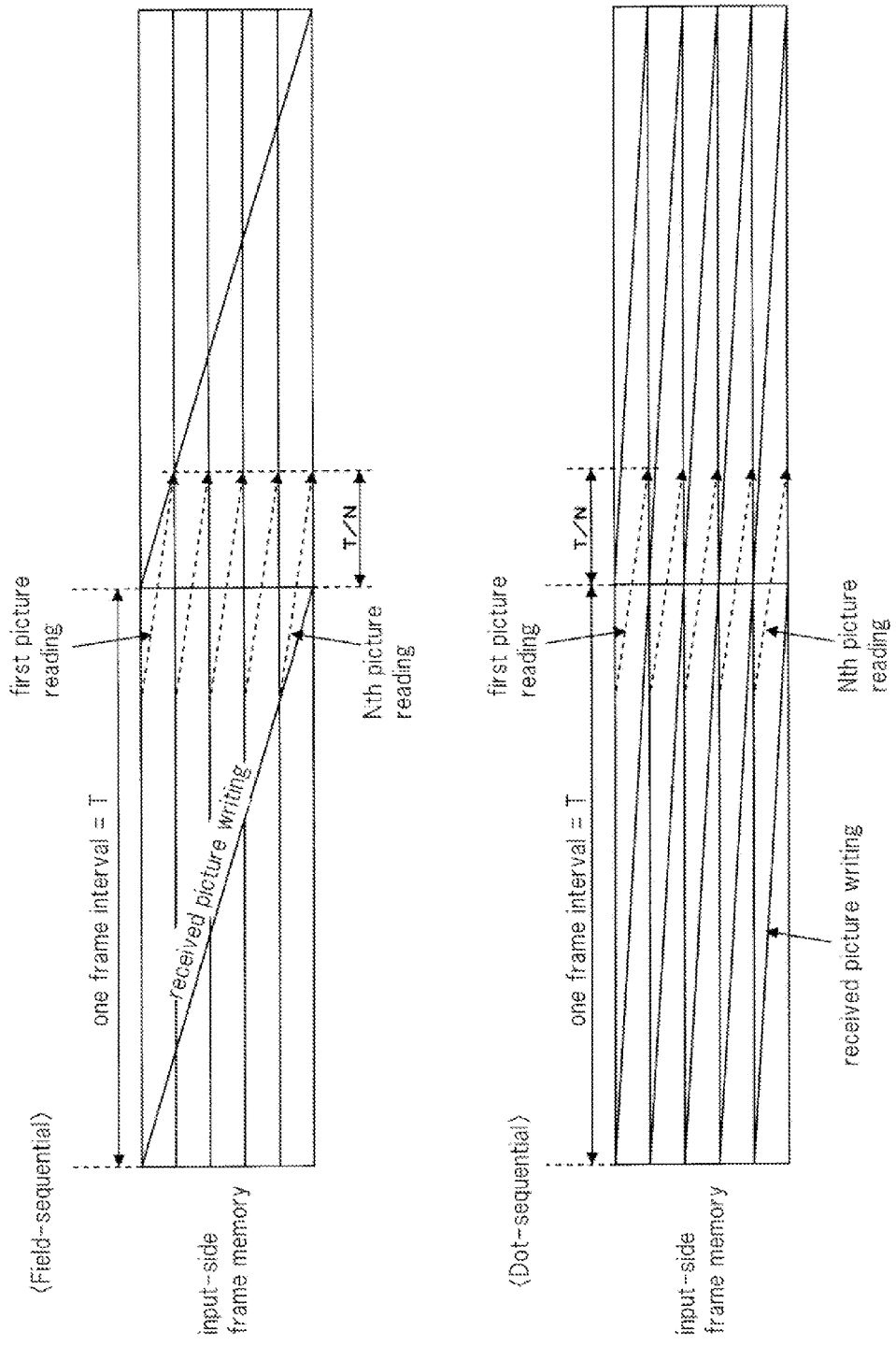
FIG. 29 shows timing charts for describing the operation of frame memory 23A in a case in which N pictures are multiplexed.

The speed of reading from frame memory 23A is also identical to this writing speed. As shown in FIG. 29, these speeds are identical whether the multiplexed picture is multiplexed by the field-sequential format or whether the multiplexed picture is multiplexed by the dot-sequential format.

For example, when N=3, the writing speed to frame memory 23B should be at least 3/2(=1.5) speed.

Figure 30:
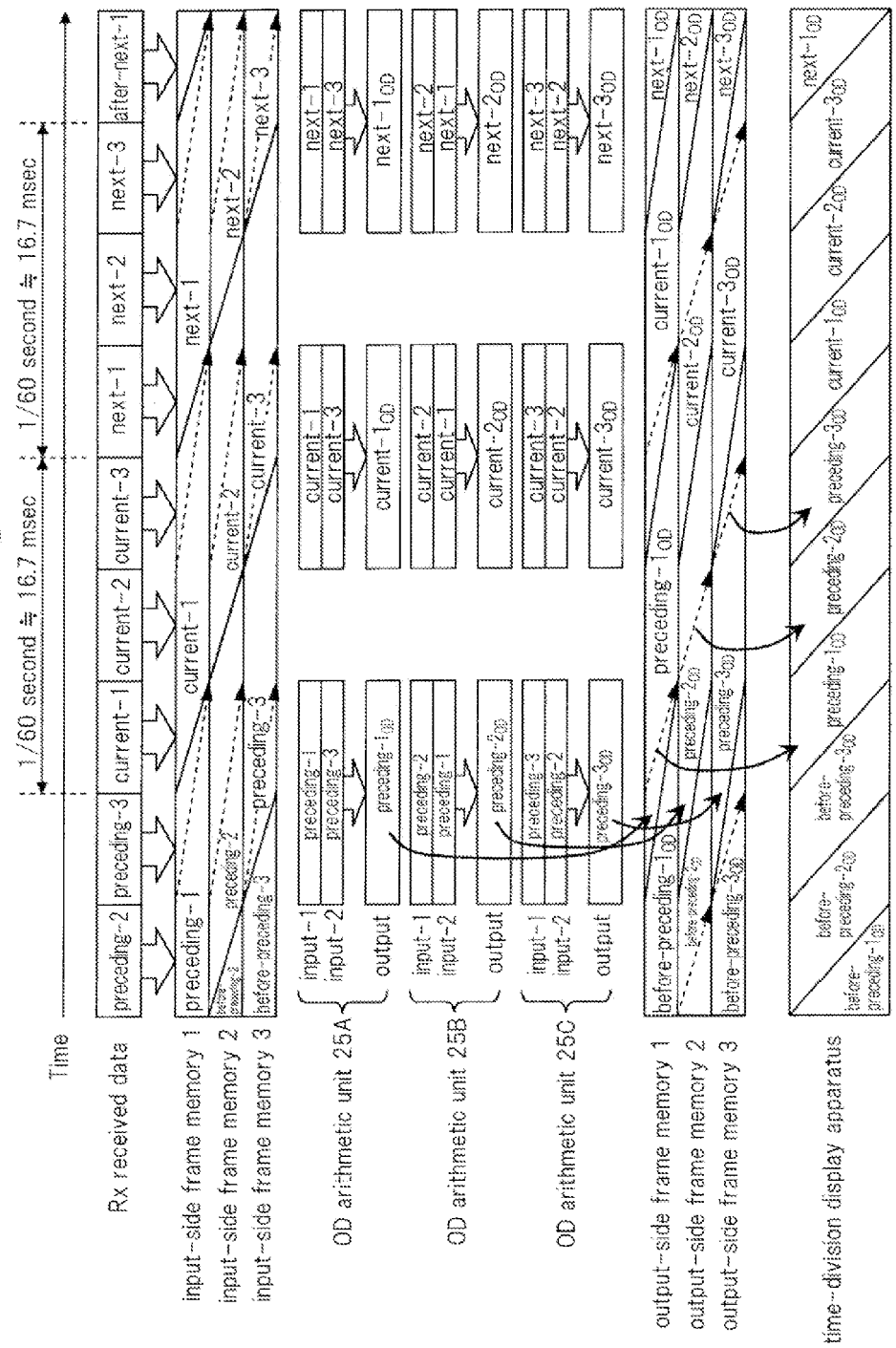
FIG. 30 is a timing chart for describing another example of the operation of the picture transmission system of the second exemplary embodiment.

FIG. 30 shows a timing chart that represents operation when the multiplexed picture is multiplexed by the field-sequential format, and moreover, the speed of writing to frame memory 23B is 1.5-speed.

In the case of FIG. 30, the reading and writing speeds need only be half what they are in FIG. 26, and as a result, when OD arithmetic units 25A-25C are constituted by LSI or FPGA, the arithmetic operations can be realized by a slower-speed semiconductor processes, and component costs can therefore be reduced.

Figure 31:
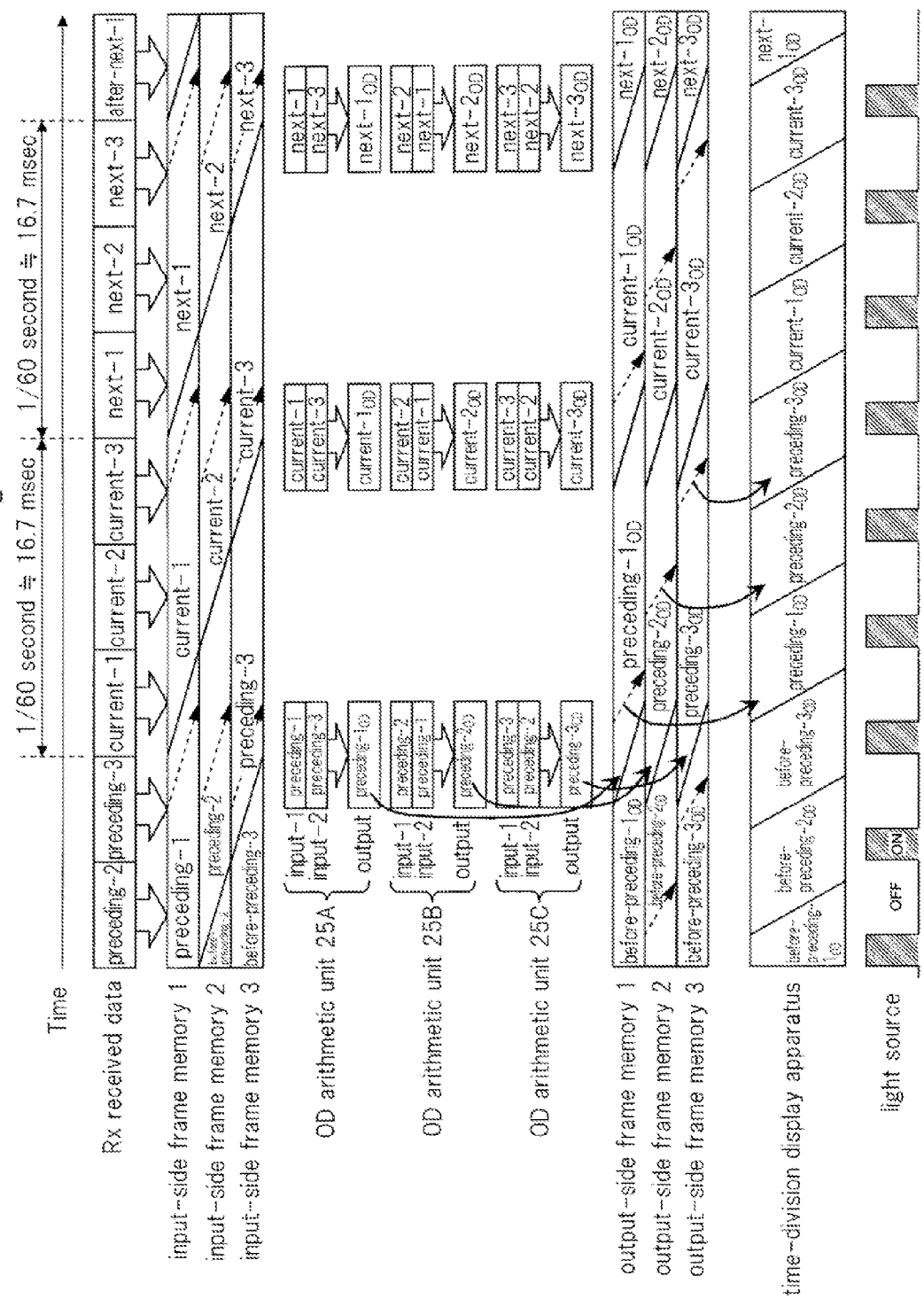
FIG. 31 is a timing chart for describing another example of the operation of the picture transmission system of the second exemplary embodiment.

Picture Transmission System Operation: Field-Sequential and Backlight Blinking Display FIG. 31 is a timing chart for describing the operation of the picture transmission system when backlight blinking drive is implemented. The multiplexed picture is multiplexed in the field-sequential format. Operations up to the writing of OD pictures to frame memory 23B are the same as the operations described in FIG. 26, and redundant explanation is therefore here omitted.

Time-division display apparatus 3 reads current-1 OD to current-3 OD from frame memory 23B in field-sequential format. At this time, time-division display apparatus 3 makes the reading speed from frame memory 23B and scanning speed faster than the case of FIG. 26 in order to implement backlight blinking. In other words, time-division display apparatus 3 implements backlight blinking drive by scanning each OD picture in a time interval (Ts/K) that is shorter than a one-subframe interval. The operations until the OD picture is written to frame memory 23B are the same as the operations described in FIG. 26, and the backlight blinking drive can be realized even when a multiplexed picture is multiplexed in the dot-sequential format.

Typical Case: Transmitting N Pictures and Scanning at K-Multiple Speed

Figure 32:
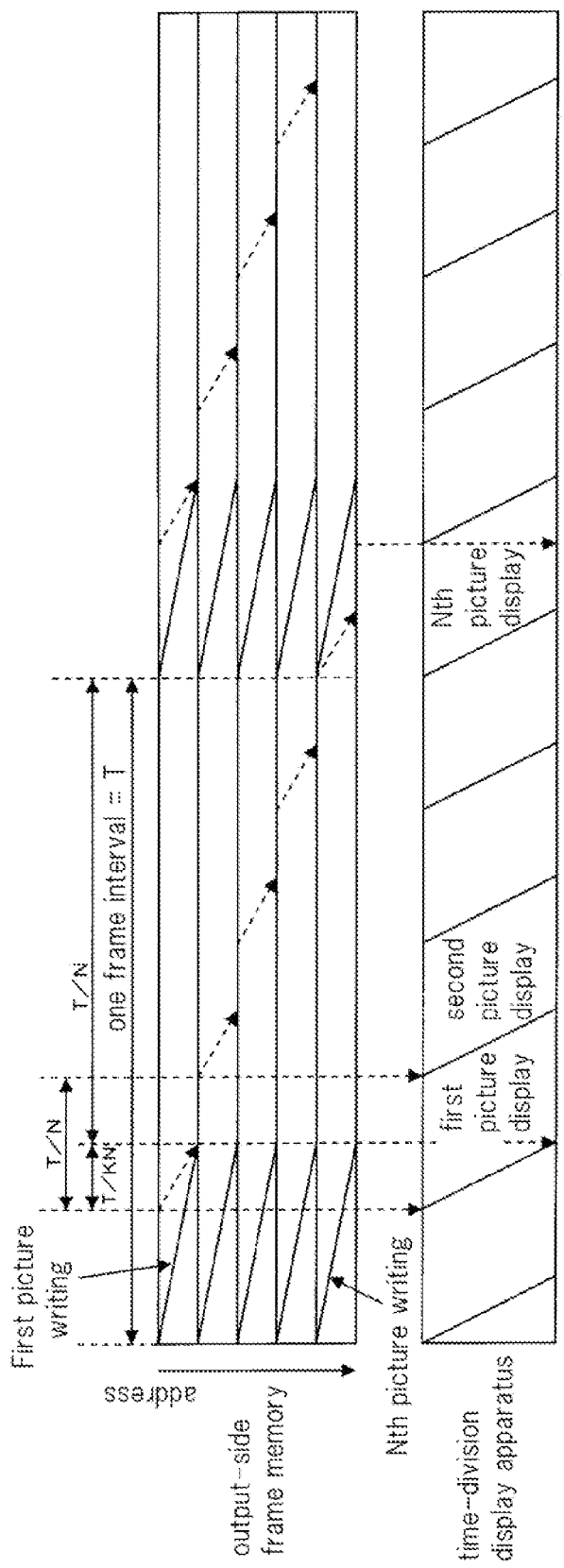
FIG. 32 is a timing chart for describing another example of the operation of the picture transmission system of the second exemplary embodiment.

FIG. 32 is a timing chart for describing the operation of a picture transmission system when N pictures are multiplexed into a multiplexed picture and backlight blinking drive is implemented. Similar to FIG. 28, it is assumed that the multiplexed picture is generated by multiplexing N pictures and that time-division display apparatus 3 sequentially displays N OD pictures in one frame interval. In addition, the scanning interval of each OD picture is assumed to be Ts/K when subframe interval Ts is used, i.e., T/(NK) when frame interval T is used.

The speed at which time-division display apparatus 3 reads each OD picture is assumed to be a multiple K of the speed for the case of FIG. 28. In the case of FIG. 32, the timing at which time-division display apparatus 3 completes the reading of current-1 is earlier than the case of FIG. 28. As a result, the interval of carrying out writing current-1 to frame memory 23B must be shorter by exactly T/(NK) than the case of FIG. 28. Accordingly, the interval of reading one picture from frame memory 23A must be a multiple of (1+K)T/(NK) of one frame interval, and a picture should be read from frame memory 23 at a speed that is a multiple of N/(1+K). When N=3 and K=2, a picture should be read from frame memory 23 at a speed of at least a multiple of 2×3/(1+2)=2. As shown in FIG. 29, the speed of reading from frame memory 23A can be made double-speed or more.

Accordingly, when an OD picture is scanned at a speed that is a multiple of K for the purpose of backlight blinking, the speed of writing to frame memory 23B (the speed of reading from frame memory 23A) should be at least a multiple of KN/(1+K).

The effect is next described.

In the present exemplary embodiment, frame memory 23A stores all of the N pictures in a multiplexed picture that is received by reception unit 21. Arithmetic units convert the picture element values of each of the pictures (object pictures)

in frame memory 23A based on reference pictures that are stored in frame memory 23A and that have a display order that precedes by one the object pictures to generate N OD pictures. Frame memory 23B stores all of the OD pictures that were generated by the arithmetic units. The time-division display apparatus displays the pictures that were stored by frame memory 23B in display order.

In this case, the picture element values of object pictures in a multiplexed picture are converted based on reference pictures having a display order that precedes the object pictures by one. Accordingly, the picture element values of the object pictures can be accurately converted, and the picture quality of the object pictures can be improved.

In the present exemplary embodiment, the multiplexing unit multiplexes pictures in display order in the field-sequential or dot-sequential format. The scanning interval of each OD picture is Ts when the subframe interval is set to Ts.

In this case, the speed of reading from frame memory 23B can be made relatively low.

In addition, when the subframe interval is set to Ts in the present exemplary embodiment, the scanning interval of each OD picture is Ts/K. In this case, the implementation of backlight blinking drive becomes possible.

In the present exemplary embodiment, the arithmetic unit converts the picture element value of the display picture that is the earliest (current-1) to be displayed in the display order among the pictures in a multiplexed picture using the display picture having the latest display order (current-3) in the multiplexed picture as a reference picture.

In this case, the picture element value of current-1 can be easily converted. In addition, if the picture of current-3 is a still picture, the picture element value of current-1 can be accurately converted.

Third Exemplary Embodiment

Figure 33:
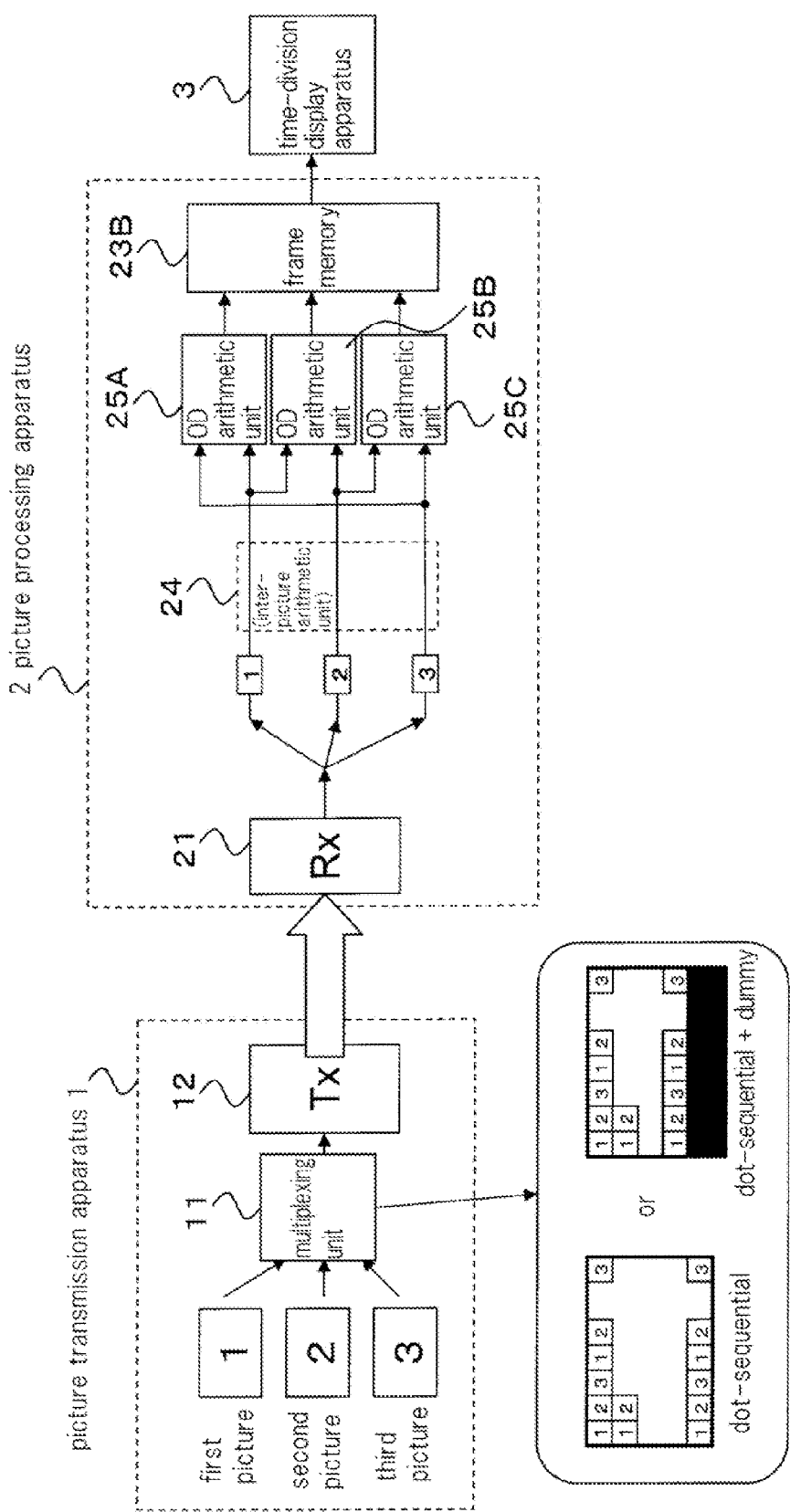
FIG. 33 is a block diagram showing the picture transmission system in the third exemplary embodiment.

FIG. 33 is a block diagram showing the picture transmission system in the third exemplary embodiment of the present invention. In FIG. 33, the picture transmission system includes picture transmission apparatus 1, picture processing apparatus 2, and time-division display apparatus 3.

Picture transmission apparatus 1 has the same configuration as in FIG. 23. In addition, although multiplexing unit 11 in picture transmission apparatus 1 multiplexed pictures of three types in the field-sequential format or dot-sequential format in the second exemplary embodiment, in the present exemplary embodiment, multiplexing unit 11 multiplexes pictures of three types in the dot-sequential format.

Picture processing apparatus 2 has a configuration in which frame memory 23A is eliminated from the configuration shown in FIG. 23.

Each time reception unit 21 receives the picture element value of a picture in a multiplexed picture, an arithmetic unit that includes OD arithmetic units 25A-25C converts the picture element value based on a reference picture having a display order that precedes that of the picture in the multiplexed picture by one to thus generate three OD pictures that correspond to each of first to third pictures.

In this case, preceding-3 that is the picture having a display order that precedes that of the first picture (here assumed to be current-1) by one is not in the multiplexed picture, and current-3 is therefore taken as the reference picture and the picture element value of current-1 is converted based on the picture element value of this reference picture. The OD arithmetic unit includes a frame memory that stores preceding-3 and may take this preceding-3 as the reference picture of current-1.

Each of OD arithmetic units 25A-25C corresponds one-to-one to one of first to third pictures in a multiplexed picture as in the second exemplary embodiment and converts the picture element value of the corresponding picture. In the following explanation, it will be assumed that OD arithmetic unit 25A corresponds to the first picture, OD arithmetic unit 25B corresponds to the second picture, and OD arithmetic unit 25C corresponds to the third picture.

Operation of the Picture Transmission System

Figure 34:
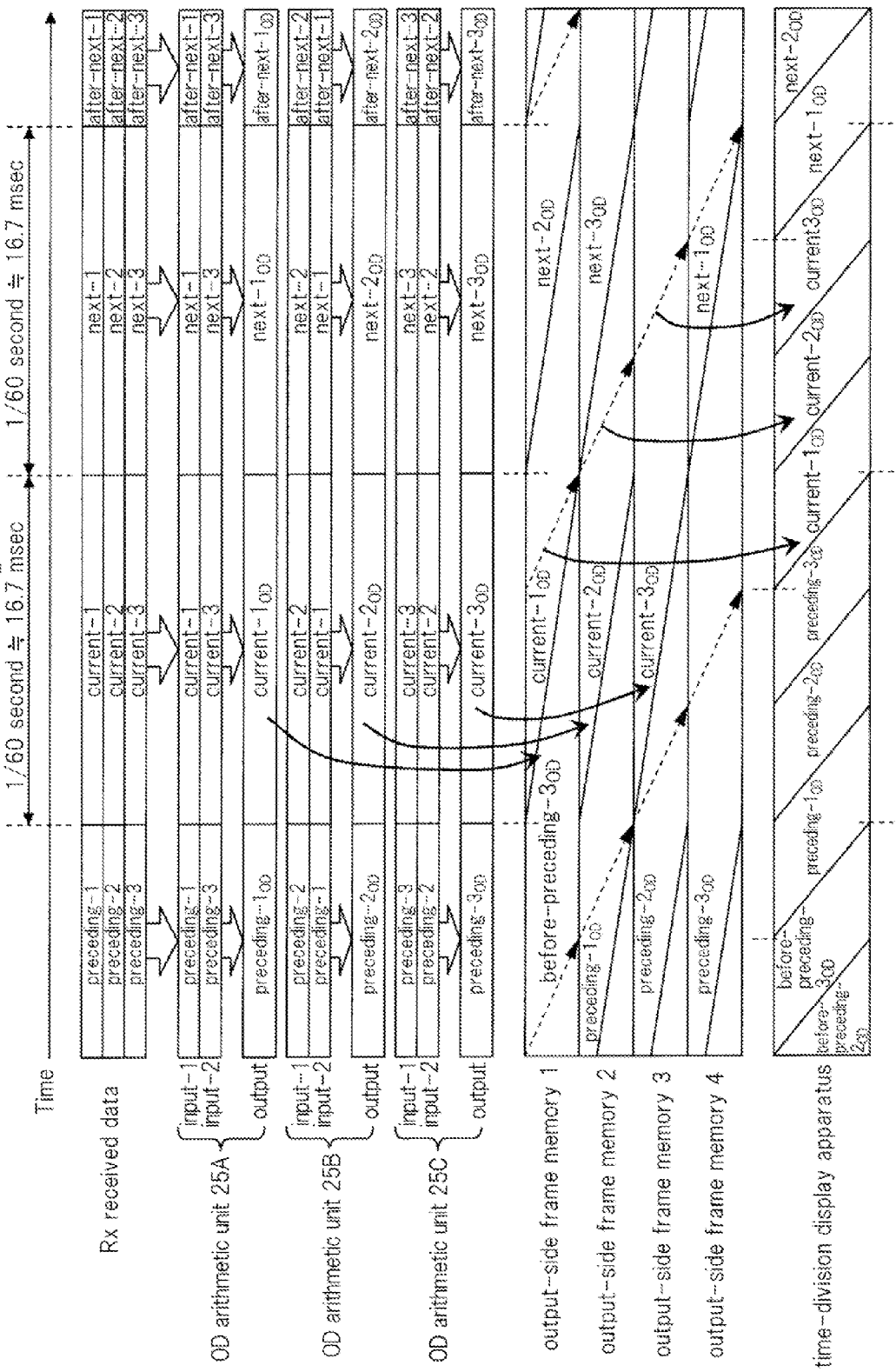
FIG. 34 is a timing chart for describing an example of the operation of the picture transmission system of the third exemplary embodiment.

FIG. 34 is a timing chart for describing the operation of the picture transmission system of the present exemplary embodiment.

First to third pictures in a multiplexed picture are multiplexed in the dot-sequential format, and reception unit 21 therefore receives picture element values of the same position of first to third pictures at substantially the same time. As a result, each of the picture element values of this same position are applied as input to arithmetic units without passing by way of frame memory 23A. These picture element values of the same position are not absolutely simultaneous, and a delay circuit for delaying these picture element values by a 1-2 picture element portion is therefore necessary, but compared to frame memory 23, this delay circuit is small enough to be negligible and is consequently here omitted.

The operation of OD arithmetic units 25A-25C is the same as in the second exemplary embodiment and detailed explanation is therefore here omitted. Current-1 OD-current-3 OD that are generated by OD arithmetic units 25A-25C, respectively, are simultaneously written to frame memory 23B at single-speed. Because time-division display apparatus 3 must read the data of current-1 OD-current-3 OD in field-sequential format at this time, frame memory 23B will be inadequate with a memory capacity that allows storage of three pictures and requires a memory capacity that allows storage of a minimum of four pictures.

The drive unit of time-division display apparatus 3 reads current-1 OD-current-3 OD from frame memory 23B in display order in field-sequential format and displays in effective display area 38.

Memory Capacity: Multiplexing Pictures of N Types

Explanation next regards the memory capacity that is required in frame memory 23B when N pictures are multiplexed.

Figure 35:
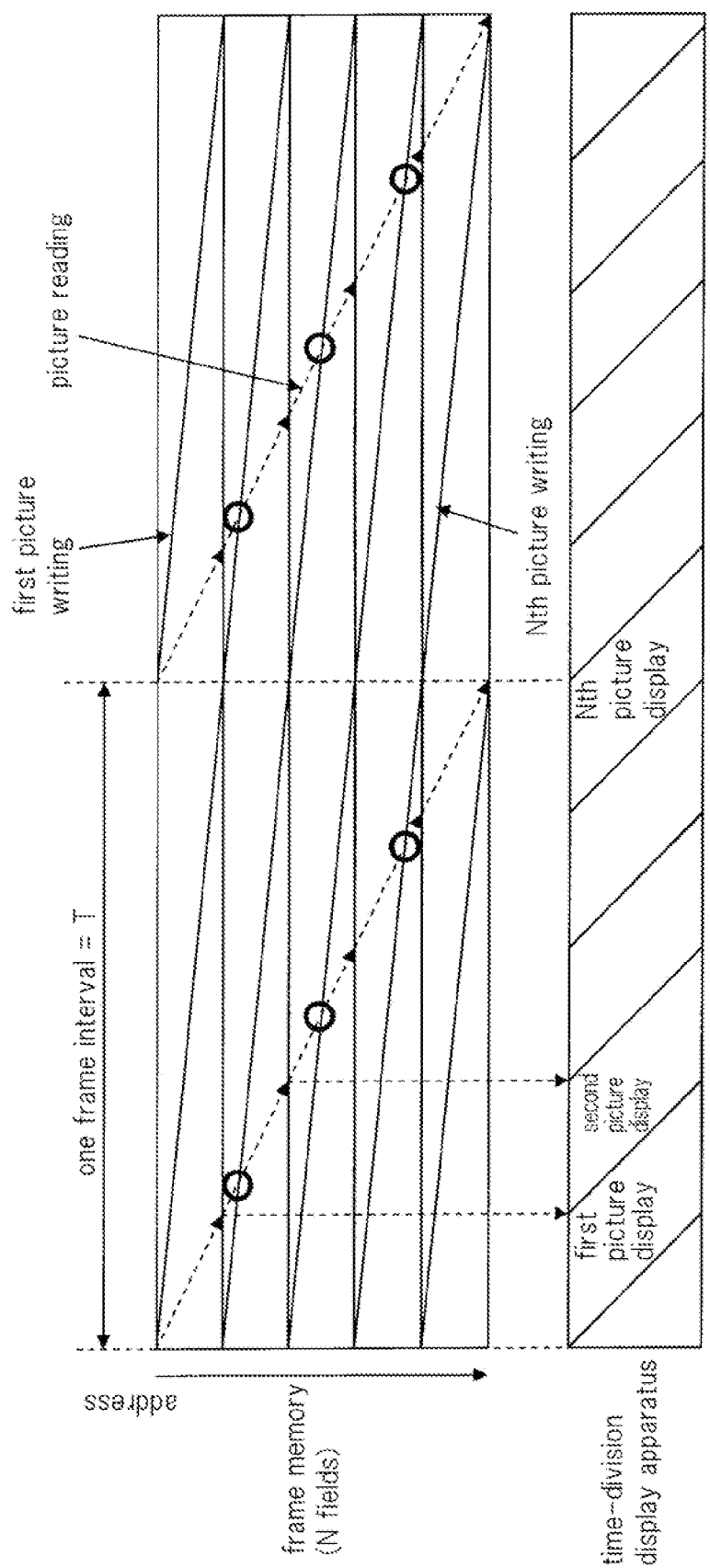
FIG. 35 is a timing chart for describing an example of the operation of the frame memory in a case in which N pictures are transmitted.

FIG. 35 is a timing chart for describing this memory capacity. FIG. 35 shows reading and writing of frame memory 23B when the memory capacity of frame memory 23B is an N-picture amount (N fields).

As shown in FIG. 35, there are sites (marked by circles in the figure) at which reading and writing occur simultaneously in the same area in frame memory 23B in read intervals other than intervals of reading the first picture and the Nth picture (reading intervals of the second picture-(N−1)th picture). Accordingly, the memory capacity of frame memory 23B further requires N−2 fields in addition to N fields, i.e., 2N−2 fields.

Regarding the order of writing the first picture to the Nth picture at this time, considering that 2N−2 fields are divided into the first field to the (2N−2)th field, writing should be carried out while circulating each field of the frame memory, the first picture being written to the first field→the second picture being written to the second field→ . . . and the Nth picture being written to the Nth field in the current frame, and in the next frame, the first picture being written to the (N+1)th field→the second picture being written to the (N+2)th field→ . . . →the (N−2)th picture being written to the (2N−2)th field, the (N−1)th picture being written to the first field, and the Nth picture being written to the second field. When writing in this order, the reading by time-division display apparatus 3 should be carried out by sequentially reading the first picture that is stored in the first field from a time that is exactly one subframe interval (T/N) before the end of writing of the current frame, and then reading the second picture that is stored in the second field, . . . , and reading the Nth picture that is stored in the Nth field.

Similar to the current frame, the reading of the next frame should be carried out by reading the first picture that is stored in the (N+1)th field from a time that is exactly one subframe interval before the completion of writing, and then reading the second picture that is stored in the (N+2)th field, . . . , reading the (N−2)th picture that is stored in the (N−2) field, reading the (N−1)th picture that is stored in the first field, and reading the Nth picture that is stored in the second field.

In other words, if reading is carried out by circulating similar to writing to frame memory 23B, writing and reading will not occur simultaneously in the identical area in frame memory 23B. As shown in FIG. 34, if the timings of writing and reading to frame memory 23B when N=3 are examined, the state of writing and reading pictures by circulating can be easily comprehended.

Figure 36:
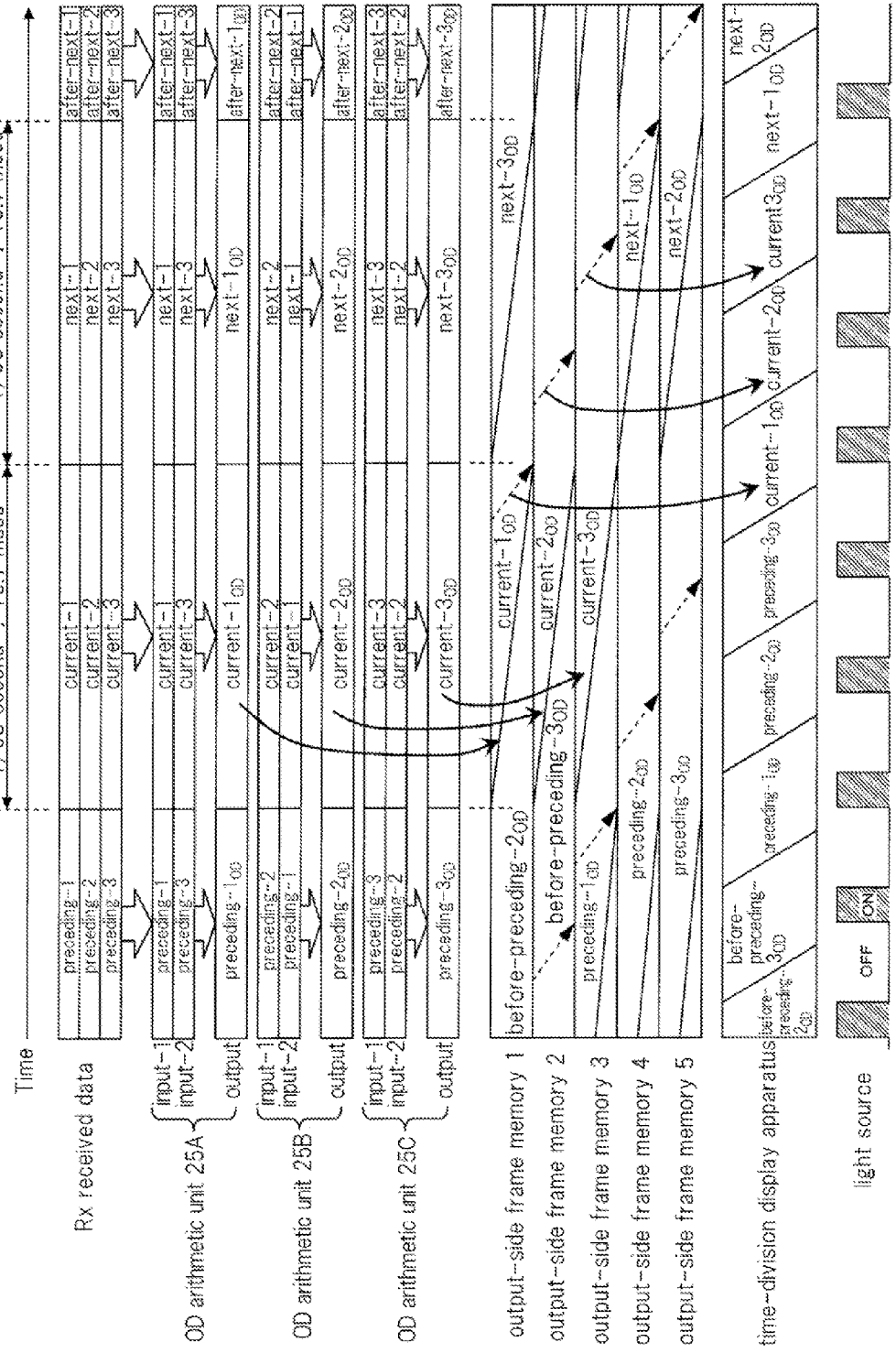
FIG. 36 is a timing chart for describing another example of the operation of the picture transmission system of the third exemplary embodiment.

Operation of the Picture Transmission System: Dot-Sequential and Backlight Blinking Drive FIG. 36 is a timing chart for describing the operation of the picture transmission system that corresponds to backlight blinking drive.

The operations from multiplexing unit 11 up to OD arithmetic units 25A-25C are identical to the operations described in FIG. 34 and redundant explanation is therefore here omitted.

Time-division display apparatus 3 reads the data of current-1 OD-current-3 OD from frame memory 23B in field-sequential format at a speed that is a multiple of K faster than the case of FIG. 34. In this case, frame memory 23B must have a memory capacity of five fields.

Memory Capacity: When Implementing Backlight Blinking Drive (Scanning at K-Multiple Speed)

The memory capacity that is required in frame memory 23B when implementing backlight blinking drive is next described.

Figure 37:
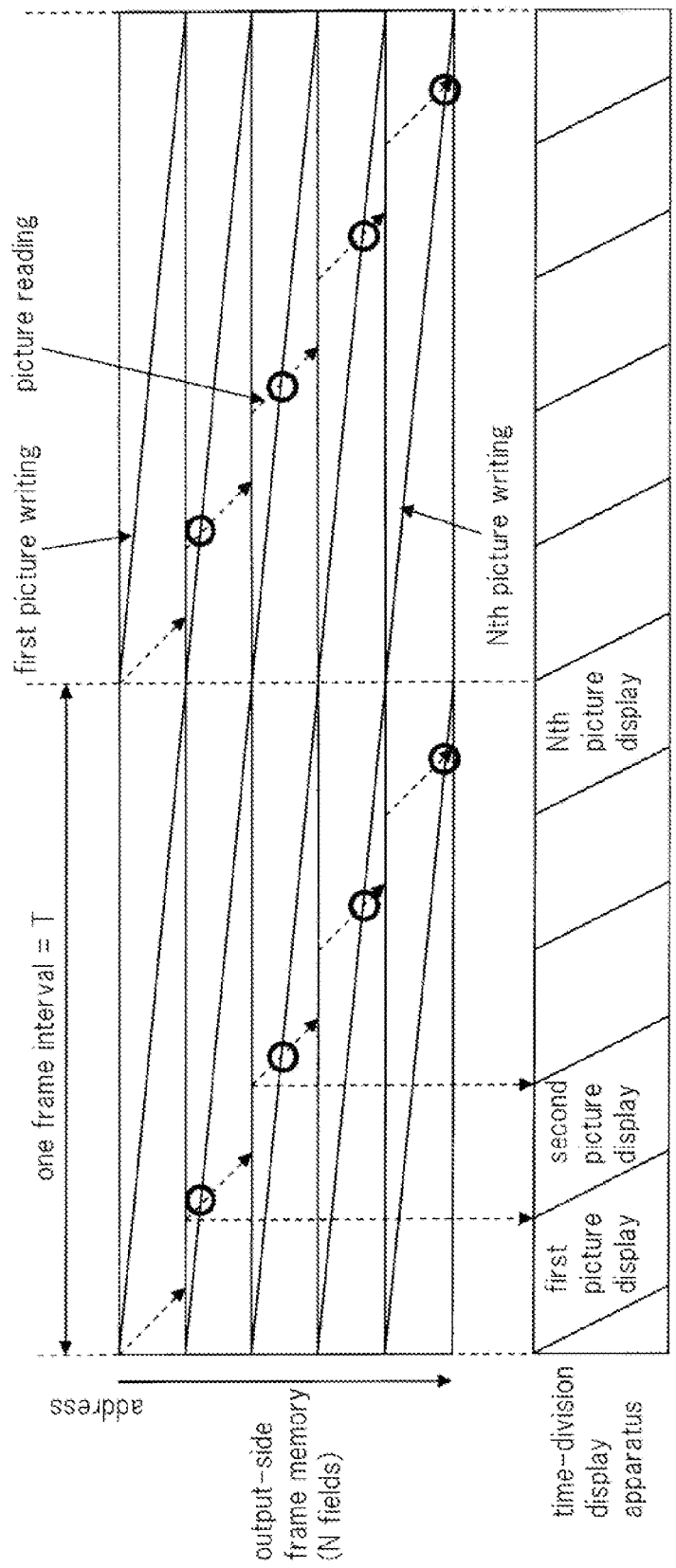
FIG. 37 is a timing chart for describing another example of the operation of the frame memory in a case of transmitting N pictures.

FIG. 37 is a timing chart for describing this memory capacity. FIG. 37 shows reading and writing of frame memory 23B when the memory capacity of frame memory 23B is for N pictures (N fields).

As shown in FIG. 37, in reading intervals other than the interval of reading the first picture (the intervals of reading the second picture to the Nth picture), there are sites at which reading and writing occur simultaneously in the same area in frame memory 23B (indicated by circles in the figure). Accordingly, the memory capacity of frame memory 23B requires N−1 fields in addition to N fields, i.e., 2N−1 fields.

At this time, considering the division of 2N−1 fields into the first field to the (2N−1)th field, the order of writing the first picture to the Nth picture should be carried out while circulating each field of the frame memory, the first picture being written to the first field→the second picture to the second field→ . . . →the Nth picture to the Nth field in the current frame, and in the next frame, the first picture being written to the (N+1)th field, the second picture to the (N+2)th field→ . . . →the (N−1)th picture to the (2N−1)th field, and the Nth picture to the first field. When writing in this order, the reading of time-division display apparatus 3 should be carried out by sequentially reading the first picture that is stored in the first field from a time that is exactly one subframe interval (T/N) before the completion of writing of the current frame and then reading the second picture that is stored in the second field, . . . , and reading the Nth picture that is stored in the Nth field.

The reading of the next frame should be carried out by reading the first picture that is stored in the (N+1)th field from a time that is exactly one subframe interval before the end of writing, similar to the current frame, and then reading the second picture that is stored in the (N+2)th field, . . . , reading the (N−1)th picture that is stored in the (2N−1)th field, and reading the Nth picture that is stored in the first field.

Essentially, writing and reading will not occur in the same area in frame memory 23B if reading is carried out with circulation of each filed the frame memory similar to writing to frame memory 23B. In the timings of writing and reading to frame memory 23B when N=3 are considered as shown in FIG. 36, the state of writing and reading while circulating pictures can be easily comprehended.

Multiplexing Method: Dot-Sequential+Dummy

A multiplexing method is next described that allows a reduction of the memory capacity of frame memory 23B compared to the method described in FIG. 34 and FIG. 36.

Figure 38:
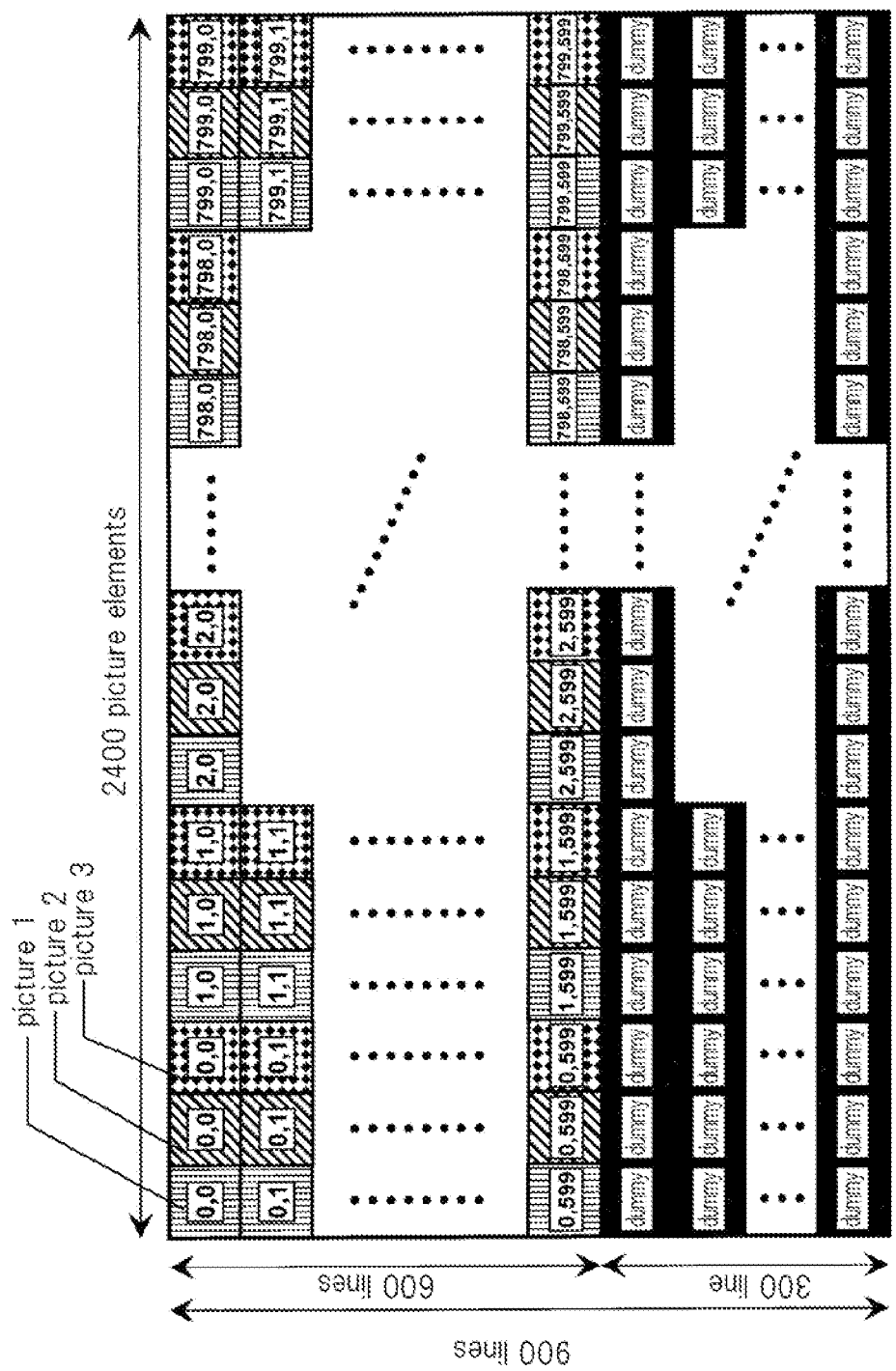
FIG. 38 is an explanatory view for describing another example of the dot-sequential multiplexing method.

As shown in FIG. 38, in this multiplexing method multiplexing unit 11 inserts dummy pictures below a multiplexed picture in which first pictures to third pictures have been multiplexed in dot-sequential format. The ratio of the number of picture elements of the multiplexed picture and the number of picture elements of the dummy pictures is 2:1. As a result, the size of a multiplexed picture in which dummy pictures have been inserted (referred to as a dummy-added multiplexed picture) is 2400 picture elements×900 lines.

Operation of a Picture Transmission System: Dot-Sequential+Dummy

Figure 39:
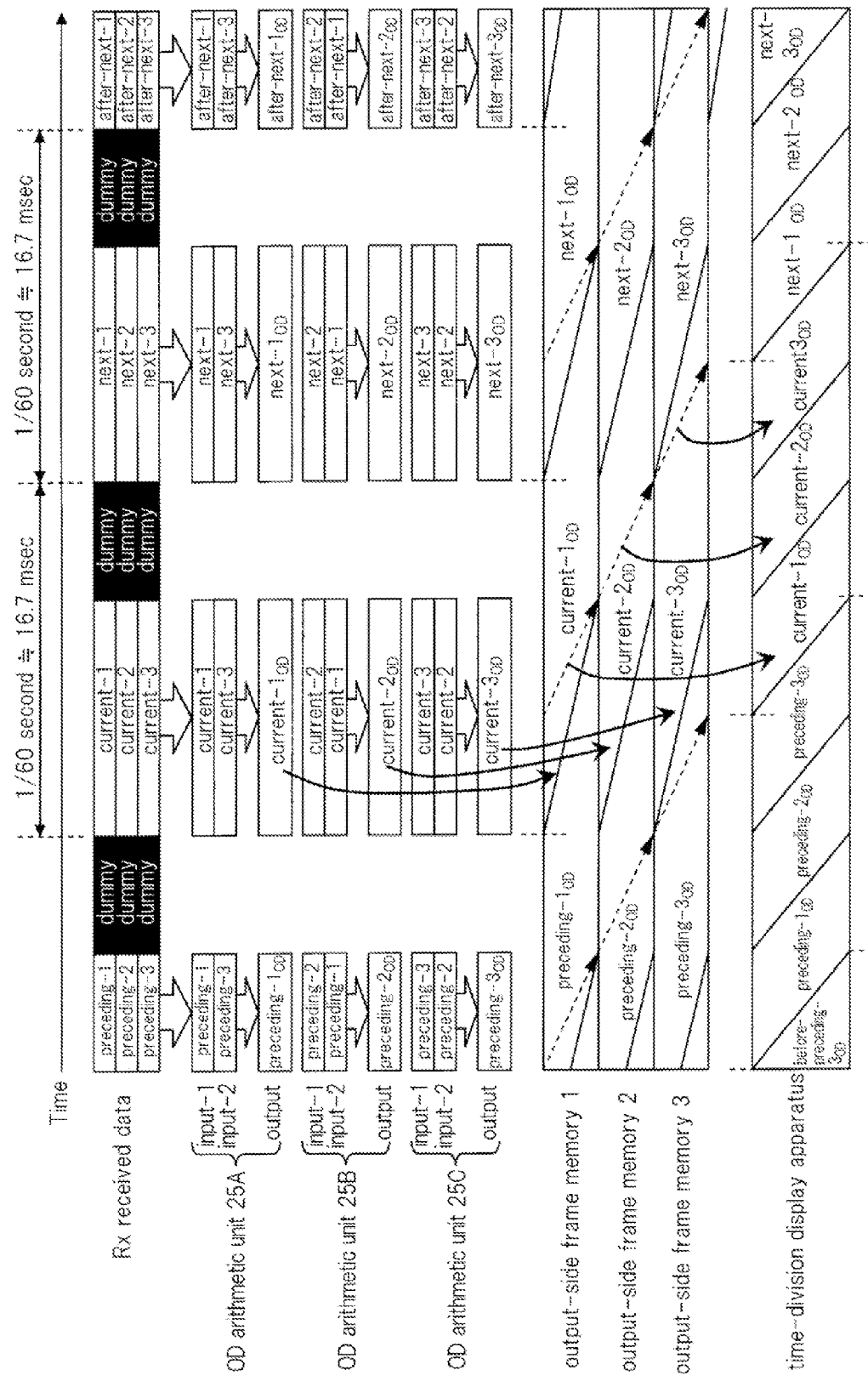
FIG. 39 is a timing chart for describing another example of the operation of the picture transmission system of the third exemplary embodiment.

FIG. 39 is a timing chart for describing the operation of a picture transmission system when dummy pictures are inserted in a multiplexed picture. The ratio of the number of picture elements of the multiplexed picture and the number of picture elements of the dummy picture is set to 2:1.

The dummy pictures in a dummy-added multiplexed picture received by reception unit 21 are discarded by a controller (not shown). The pictures in the dummy-added multiplexed picture are applied as input to OD arithmetic units 25A-25C. The operations of OD arithmetic units 25A-25C are the same as described in the second exemplary embodiment and explanation is therefore here omitted.

Current-1 OD-current-3 OD that are supplied as output from OD arithmetic units 25A-25C are simultaneously written to frame memory 23B at the same speed as the speed of reception by reception unit 21. Time-division display apparatus 3 must read the data of current-1 OD-current-3 OD in field-sequential format, but because the writing speed to frame memory 23B is faster than FIG. 34, only a three-field amount of memory capacity is required in frame memory 23B. Time-division display apparatus 3 sequentially reads and displays the first to third pictures.

Typical Case: Dummy Ratio

The ratio of the number of picture elements of dummy pictures with respect to the number of picture elements of a multiplexed picture (hereinbelow referred to as the dummy ratio) such that frame memory is kept to three fields is next described.

As shown in FIG. 28, for time-division display apparatus 3 to read N pictures in field-sequential format, the speed of writing to frame memory 23B should be at least a multiple of N/2.

Because there is no frame memory 23A in the case of the present exemplary embodiment, the transmission speed at which pictures are transmitted from picture transmission apparatus 1 to picture processing apparatus 2 is the same as the speed of writing to frame memory 23B. If one frame interval is T as described hereinabove, pictures should be transmitted in intervals no greater than 2T/N in one frame interval, and the remaining interval of (N−2)T/N is used for the transmission of dummy pictures.

As a result, the dummy ratio should be at least (N−2)/2. For example, when N=3, the dummy ratio is ½. In other words, FIG. 39 shows an example in which the dummy ratio required for keeping frame memory 23 at three fields when N=3 is a minimum (the dummy pictures are smallest).

Dummy Pictures+Backlight Blinking

Backlight blinking drive can be carried out using dummy pictures. In other words, the speed at which time-division display apparatus 3 reads OD pictures from frame memory 23B is set to a multiple K of the reading speed in the case of FIG. 39.

When there are N pictures and when the time-division display apparatus reads pictures from frame memory 23B in the K-multiple reading method as shown in FIG. 32, the speed of writing to frame memory 23B should be at least a speed that is a multiple of the KN/(1+K). Accordingly, assuming that one frame interval is T, pictures should be transmitted in an interval no greater than (1+K)T/KN within one frame interval, and the remaining interval of (KN−1−K)T/KN should be assigned to transmitting dummy pictures. The dummy ratio should be at least {KN−(1+K)}/(1+K). When N=3, and moreover, K=2, the memory capacity of frame memory 23B can be kept to a 3-field amount if the dummy ratio is at least 1.

The effect is next described.

According to the present exemplary embodiment, with each reception by reception unit 21 of a picture element value of a picture in a multiplexed picture, the arithmetic unit converts the picture element value based on the reference picture having a display order that precedes by one the picture in the multiplexed picture and thus generates OD pictures that correspond to each of the pictures in the multiplexed picture. Frame memory 23B stores all of the OD pictures that are generated by the arithmetic unit. The time-division display apparatus displays the pictures that are stored by frame memory 23B in display order.

In this case, the picture element values of the object pictures in the multiplexed picture are converted based on reference pictures having a display order that precedes by one the object pictures. Accordingly, the picture element values of the object pictures can be converted accurately, and the picture quality of the object pictures can be improved.

Alternatively, multiplexing unit 11 multiplexes dummy pictures of a number of picture elements that is a multiple of (N−2)/2 of the number of picture elements of the multiplexed picture in field-sequential format. The scanning interval of the OverDrive pictures is set to Ts.

In this case, a reduction of the memory capacity of frame memory 23B can be achieved.

Alternatively, multiplexing unit 11 multiplexes dummy pictures of a number of picture elements that is a multiple of {KN−(1+K)}/(1+K) of the number of picture elements of the multiplexed picture in field-sequential format. The scanning interval of OverDrive pictures is set to Ts/K.

In this case, a reduction of the memory capacity of frame memory 23B can be achieved even when implementing backlight blinking drive.

Fourth Exemplary Embodiment

Figure 40:
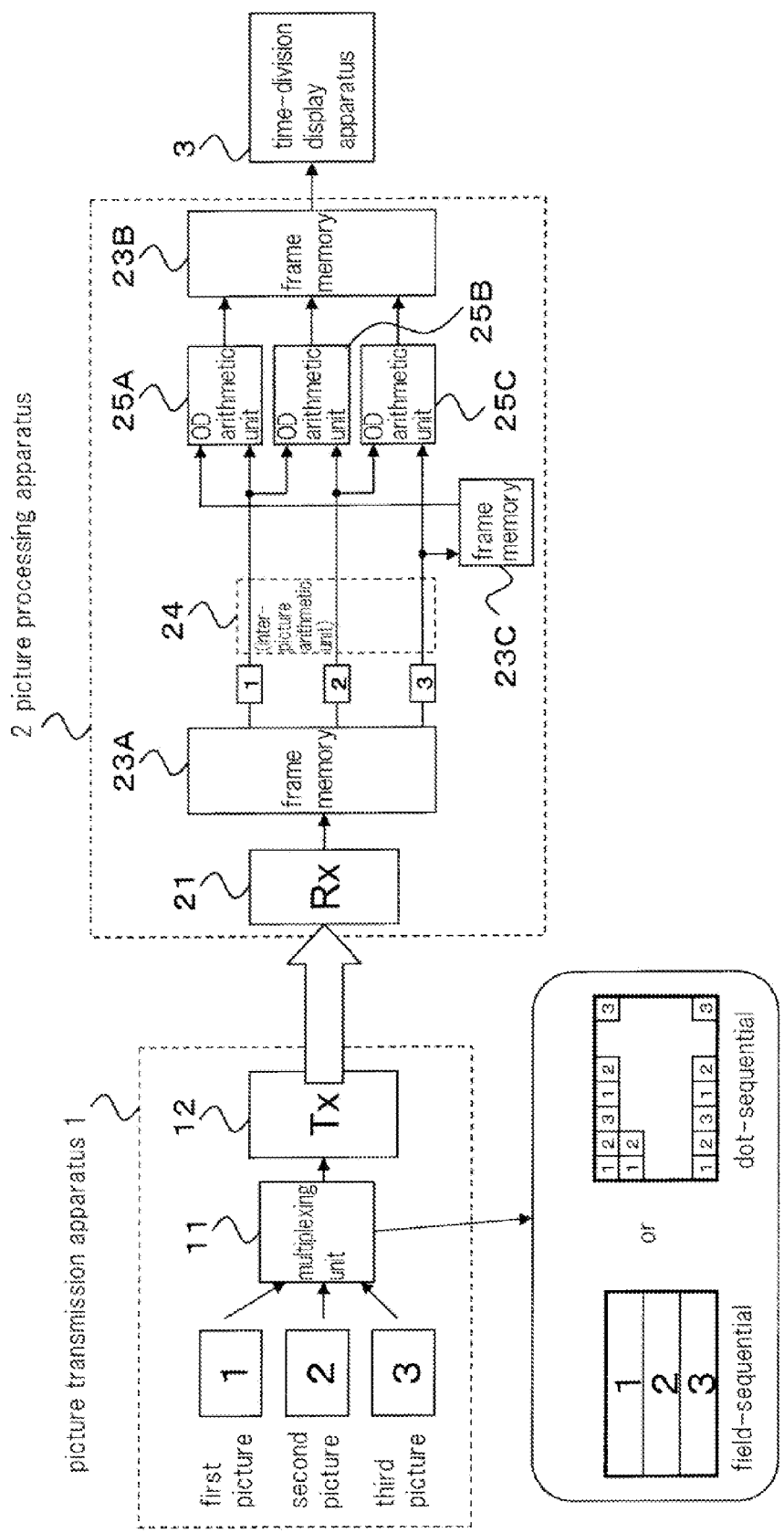
FIG. 40 is a block diagram showing the picture transmission system of the fourth exemplary embodiment.

FIG. 40 is a block diagram showing the picture transmission system of the fourth exemplary embodiment of the present invention.

In FIG. 40, the picture transmission system includes: picture transmission apparatus 1, picture processing apparatus 2, and time-division display apparatus 3. Picture transmission apparatus 1 has the same configuration as shown in FIG. 23 (second exemplary embodiment). Picture processing apparatus 2 further includes frame memory 23C in addition to the configuration shown in FIG. 23.

In the second exemplary embodiment, when generating OD picture (current-1 OD) from object picture (current-1), OD arithmetic unit 25A takes as the reference picture current-3 that is included in the same frame as this current-1. In this case, if the third picture is a still picture, preceding-3 and current-3 are the same picture, and the number of picture elements of current-1 can therefore be converted accurately. However, when the third picture is a moving picture, preceding-3 and current-3 will be different pictures, whereby the problems arise that the number of picture elements of current-1 can no longer be accurately converted and the picture quality drops. In the present exemplary embodiment, frame memory 23C is used to enable accurate conversion of the number of picture elements of current-1 even when the third picture is a moving picture.

Frame memory 23 is one example of the delay means. Frame memory 23 stores preceding-3 that is the picture having the latest display order in the frame before the object picture and supplies the picture after one frame interval. Frame memory 23 should have a memory capacity that can store one picture. In this way, frame memory 23C has the function of a FIFO that delays this last picture by exactly one frame interval.

OD arithmetic unit 25A takes current-1 as the object picture, uses the picture of preceding-3 that was delayed by frame memory 23 as the reference picture to carry out an OverDrive operation, and converts the number of picture elements of current-1 to generate current-1 OD. In this way, a greater improvement in picture quality can be achieved when current-3 is a moving picture.

Operation of the Picture Transmission System: Field-Sequential Format

Figure 41:
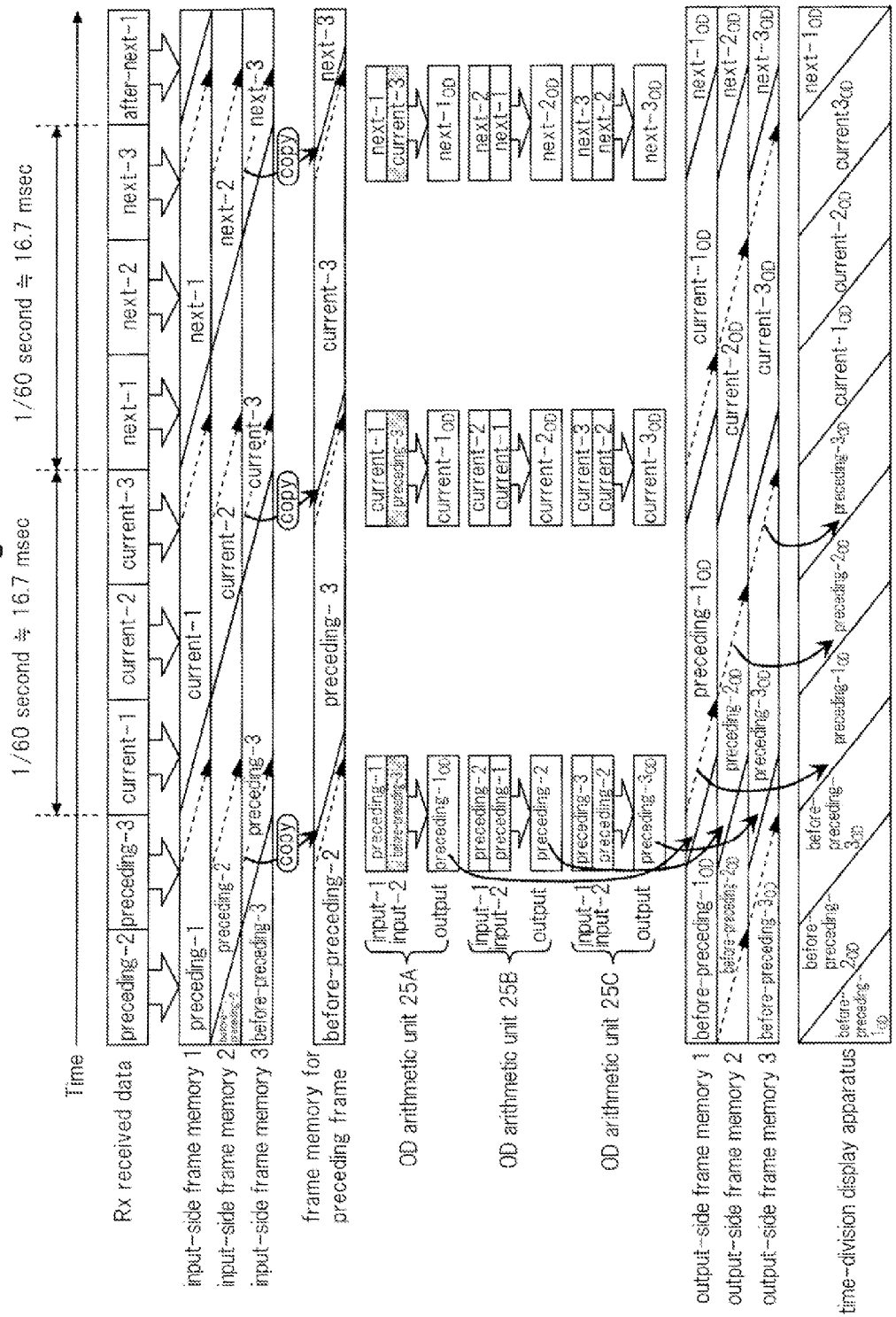
FIG. 41 is a timing chart for describing an example of the operation of the picture transmission system of the fourth exemplary embodiment.

FIG. 41 is a timing chart for describing the operation of the picture transmission system when a multiplexed picture is multiplexed in the field-sequential format.

The operations up to storing current-1 to current-3 in frame memory 23A are the same as the operations of the second exemplary embodiment.

A controller (not shown) both simultaneously reads current-1 to current-3 at triple reading mode in the interval from the time of completing writing of current-2 to frame memory 23A until the time of starting writing of next-1 and reads preceding-3 from frame memory 23. In addition, the controller stores current-3 that was read in frame memory 23C.

OD arithmetic units 25A-25C carries out OverDrive operations based on current-1 to current-3 that were read and preceding-3 that was read from frame memory 23C and generates three OD pictures.

More specifically, OD arithmetic unit 25A takes current-1 as the object picture, carries out the OverDrive operation with preceding-3 as the reference picture, and generates OD picture (current-1 OD) that corresponds to current-1; OD arithmetic unit 25B takes current-2 as the object picture, carries out the OverDrive operation with current-1 as the reference picture, and generates an OD picture (current-2 OD) that corresponds to current-2; and OD arithmetic unit 25C takes current-3 as the object picture, carries out the OverDrive operation with current-2 as the reference picture, and generates an OD picture (current-3 OD) that corresponds to current-3.

Current-1 OD to current-3 OD are written to frame memory 23B simultaneously by the triple-writing mode. Time-division display apparatus 3 reads current-1 OD-current-3 OD from frame memory 23B and displays these by field-sequential format in display order.

The present exemplary embodiment has the same configuration as the second exemplary embodiment apart from the provision of frame memory 23C for delaying the third picture such as preceding-3 or current-3 by exactly one frame interval in picture processing apparatus 2. As a result, multiplexing unit 11 may multiplex pictures in the dot-sequential format, or the picture transmission system may be configured to execute backlight blinking drive. Alternatively, the present exemplary embodiment can be realized similarly to the second exemplary embodiment when typically multiplexing N pictures.

The effect of the present exemplary embodiment is next described.

According to the present exemplary embodiment, frame memory 23C delays the picture having the latest display order in a multiplexed picture by exactly one frame interval. OD arithmetic unit 25A converts the picture element value of the picture for which the display order is earliest in the multiplexed picture with a picture that has been delayed in frame memory 23C as the reference picture.

In this case, the picture element values of the pictures can be converted accurately even when the picture having the earliest display order in the multiplexed picture is a moving picture.

Fifth Exemplary Embodiment

Figure 42:
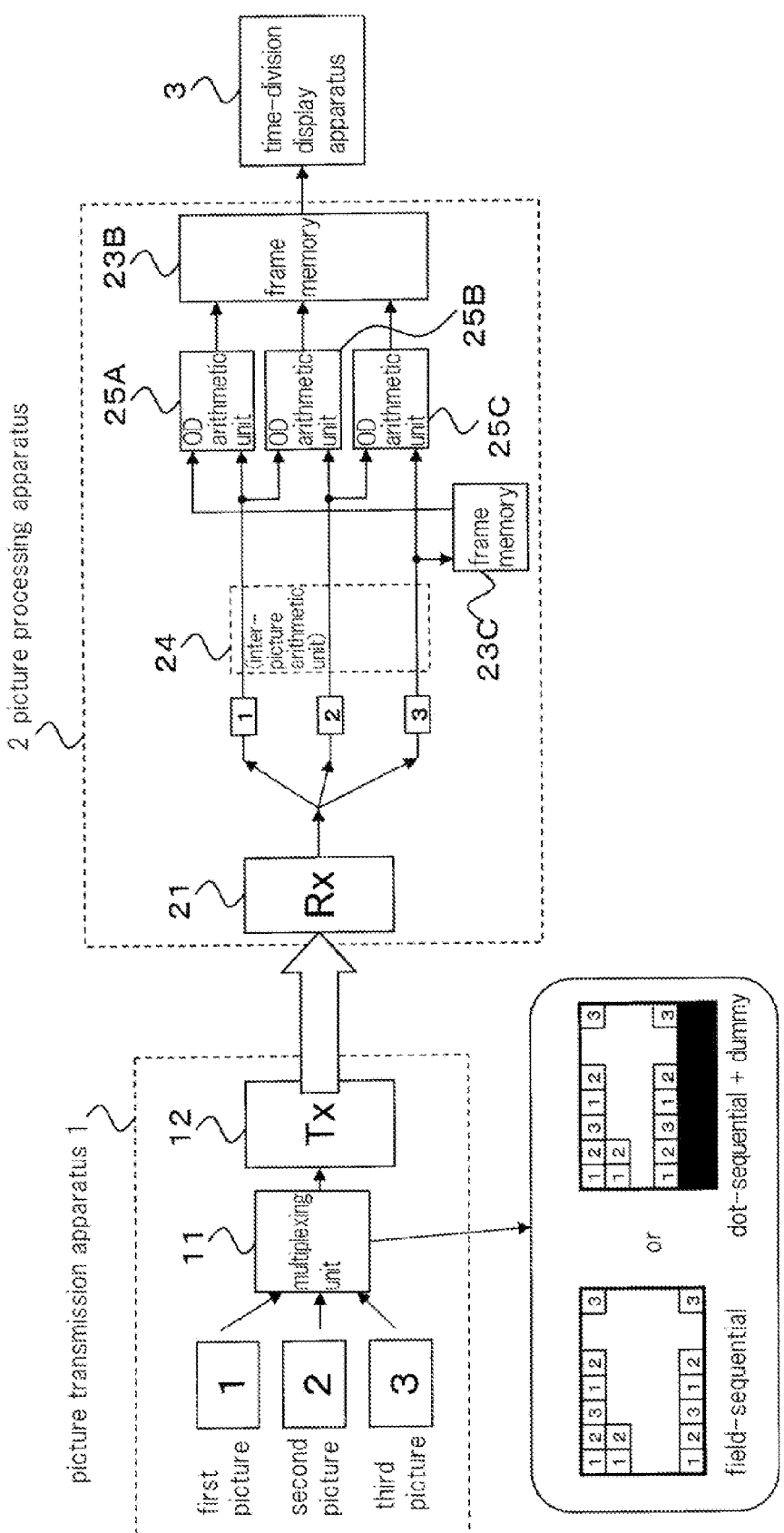
FIG. 42 is a block diagram showing the picture transmission system of the fifth exemplary embodiment.

FIG. 42 is a block diagram showing the picture transmission system of the fifth exemplary embodiment of the present invention.

Figure 43:
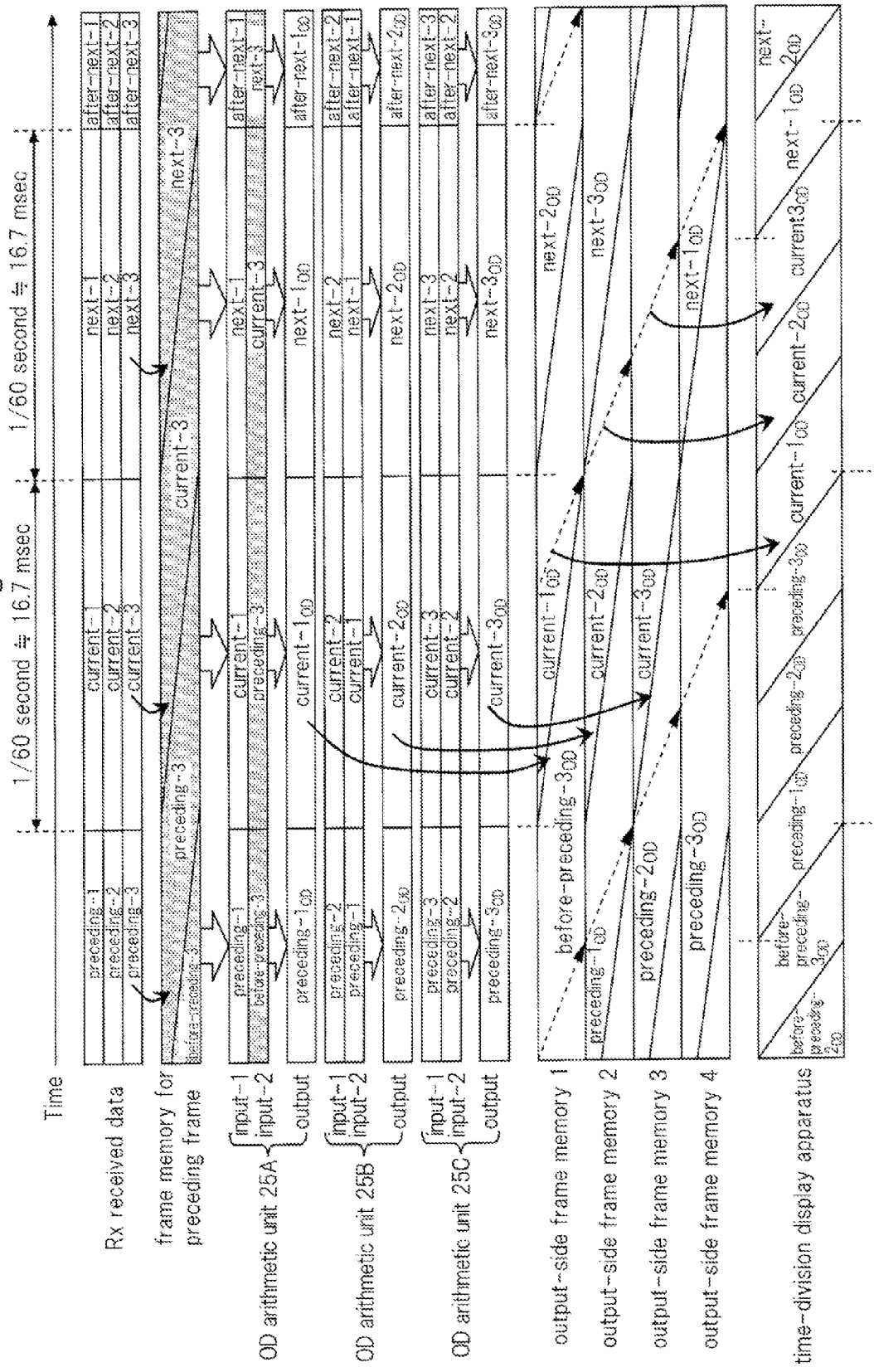
FIG. 43 is a timing chart for describing an example of the operation of the picture transmission system of the fifth exemplary embodiment.

In FIG. 42, the picture transmission system includes picture transmission apparatus 1, picture processing apparatus 2, and time-division display apparatus 3. Picture transmission apparatus 1 has the same configuration as FIG. 33 (third exemplary embodiment). Picture processing apparatus 2 further includes frame memory 23C in addition to the configuration shown in FIG. 33 whereby, similar to the fourth exemplary embodiment, frame memory 23C can be used to accurately convert the number of picture element value of current-1 even when the third picture is a moving picture.
Operation of the Picture Transmission System: Dot-Sequential Format FIG. 43 is a timing chart for describing the operation of the picture transmission system of the present exemplary embodiment when multiplexing pictures in the dot-sequential format.

Reception unit 21 applies each picture in a multiplexed picture that is received by OD arithmetic units 25A-25C and a controller (not shown) stores the third picture that is received by reception unit 21 in frame memory 23C. In addition, the controller reads preceding-3 from the frame memory and applies this preceding-3 that was read as input to OD arithmetic unit 25A.

Based on the first to third pictures and preceding-3 that were received, OD arithmetic units 25A-25C carry out OverDrive operations and generate three OD pictures. The method of generating OD pictures by OD arithmetic units 25A-25C is the same as in the fourth exemplary embodiment.

Current-1 OD-current-3 OD are simultaneously written to frame memory 23B by the triple writing mode. The time-division display apparatus reads current-1 OD-current-3 OD from frame memory 23B and displays the pictures in display order in field-sequential format.

The present exemplary embodiment has the same configuration as the third exemplary embodiment apart from the provision of frame memory 23C in picture processing apparatus 2 for delaying third pictures such as preceding-3 or current-3 by exactly one frame portion. Accordingly, multiplexing unit 11 may generate dummy-added multiplexed pictures, or the picture transmission system may be configured to execute backlight blinking drive. Alternatively, the present exemplary embodiment can be realized similar to the third exemplary embodiment when typically multiplexing N pictures.

The effect is next described.

In the present exemplary embodiment, as in the fourth exemplary embodiment, the picture element value of a picture can be converted accurately even when the picture is a moving picture even when the picture is a moving picture which is displayed earliest in the display in a multiplexed picture.

Sixth Exemplary Embodiment

Figure 44:
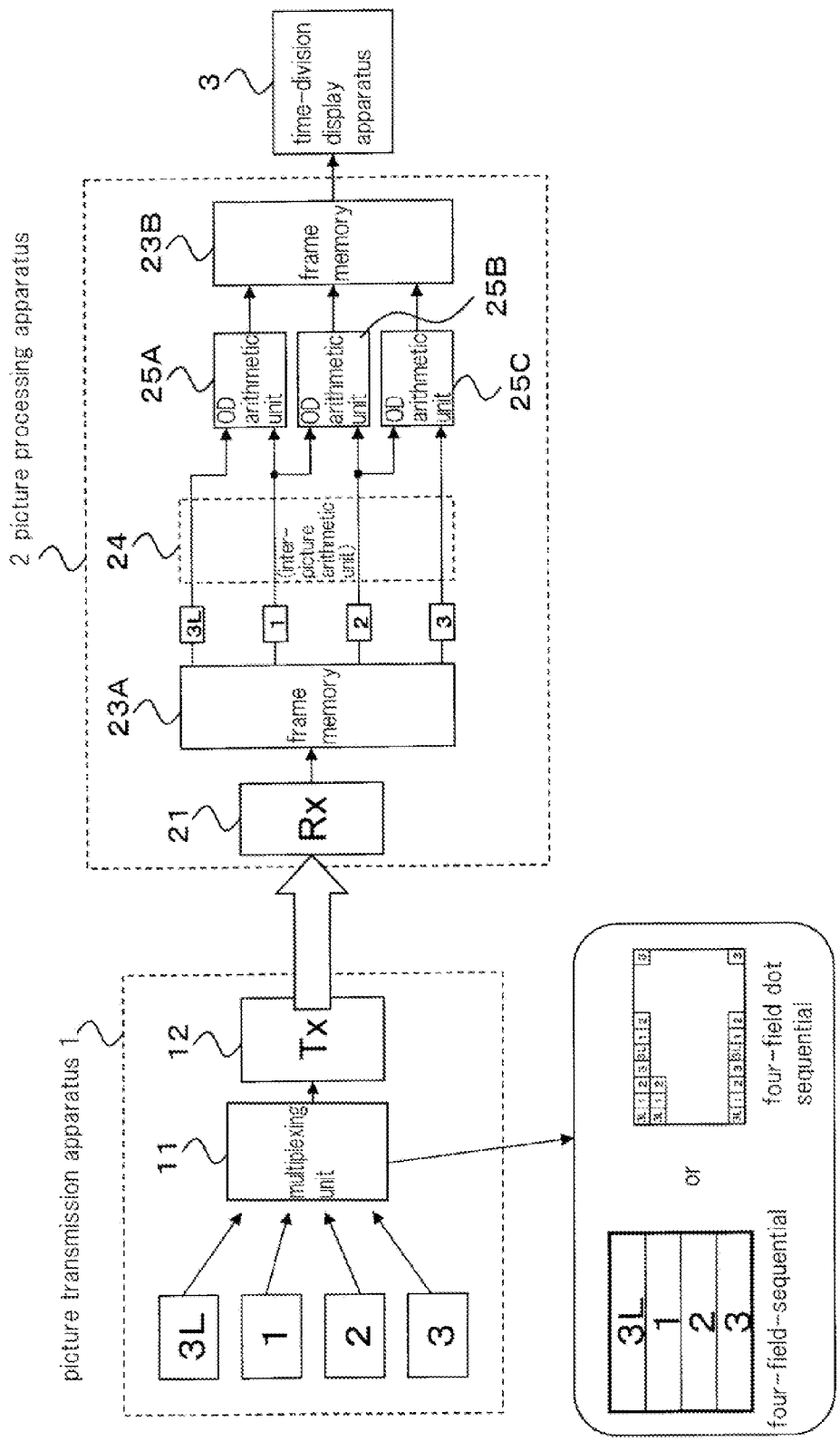
FIG. 44 is a block diagram showing the picture transmission system of the sixth exemplary embodiment.

FIG. 44 is a block diagram showing the picture transmission system in the present exemplary embodiment. In FIG. 44, the picture transmission system has the same configuration as shown in FIG. 23.

In FIG. 44, multiplexing unit 11 multiplexes first pictures to third pictures and the third picture of the frame before the frame that has these pictures (also referred to as the "third L pictures"). The third L picture is a picture for which the display order precedes by one the first picture for which the display order is earliest in the frame. Either of the field-sequential format or the dot-sequential format may be used in the multiplexing method by multiplexing unit 11.

Frame memory 23A stores all of the third L picture and the first pictures to third pictures in the multiplexed picture received by reception unit 21.

OD arithmetic units 25A-25C carry out OverDrive operations based on the first pictures to third pictures and third L picture that are stored in frame memory 23A and generate three OD pictures. More specifically, OD arithmetic unit 25A takes the first picture as the object picture and carries out an OverDrive operation with the third L picture as the reference picture to generate an OD picture of the first picture. OD arithmetic units 25B and 25C, similarly to the second exemplary embodiment, generate an OD picture of the second picture and an OD picture of the third picture.

In this way, further multiplexing the third L picture enables the accurate conversion of the picture element values of pictures even when the third picture is a moving picture, as in the fourth exemplary embodiment.
Multiplexing Method: Field-Sequential Format and Dot-Sequential Format The multiplexing method in the present exemplary embodiment is similar to a method in which, instead of three pictures, four pictures are multiplexed in the multiplexing method shown in FIGS. 11, 12, and 21 in the first exemplary embodiment and FIGS. 24 and 25 in the second exemplary embodiment.

When multiplexing pictures in the field-sequential format, each picture should be multiplexed arranged in the order: third L picture, first picture, second picture, and third picture.

On the other hand, when multiplexing pictures in the dot-sequential format, the picture element values of the same position of each of the third L picture and first to third pictures should be arranged in a series. In the present exemplary embodiment, pictures need not be multiplexed strictly in the dot-sequential format, and multiplexing should be carried out such that the picture element values of the same position of the third L picture and first to third pictures are transmitted within times that are close to a certain degree.

Whether pictures are multiplexed in the field-sequential format or multiplexed in the dot-sequential format, the size of the multiplexed picture can be altered within a range in which the transmission order does not change in DVI.

Operation of the Picture Transmission System: Field-Sequential Format

Figure 45:
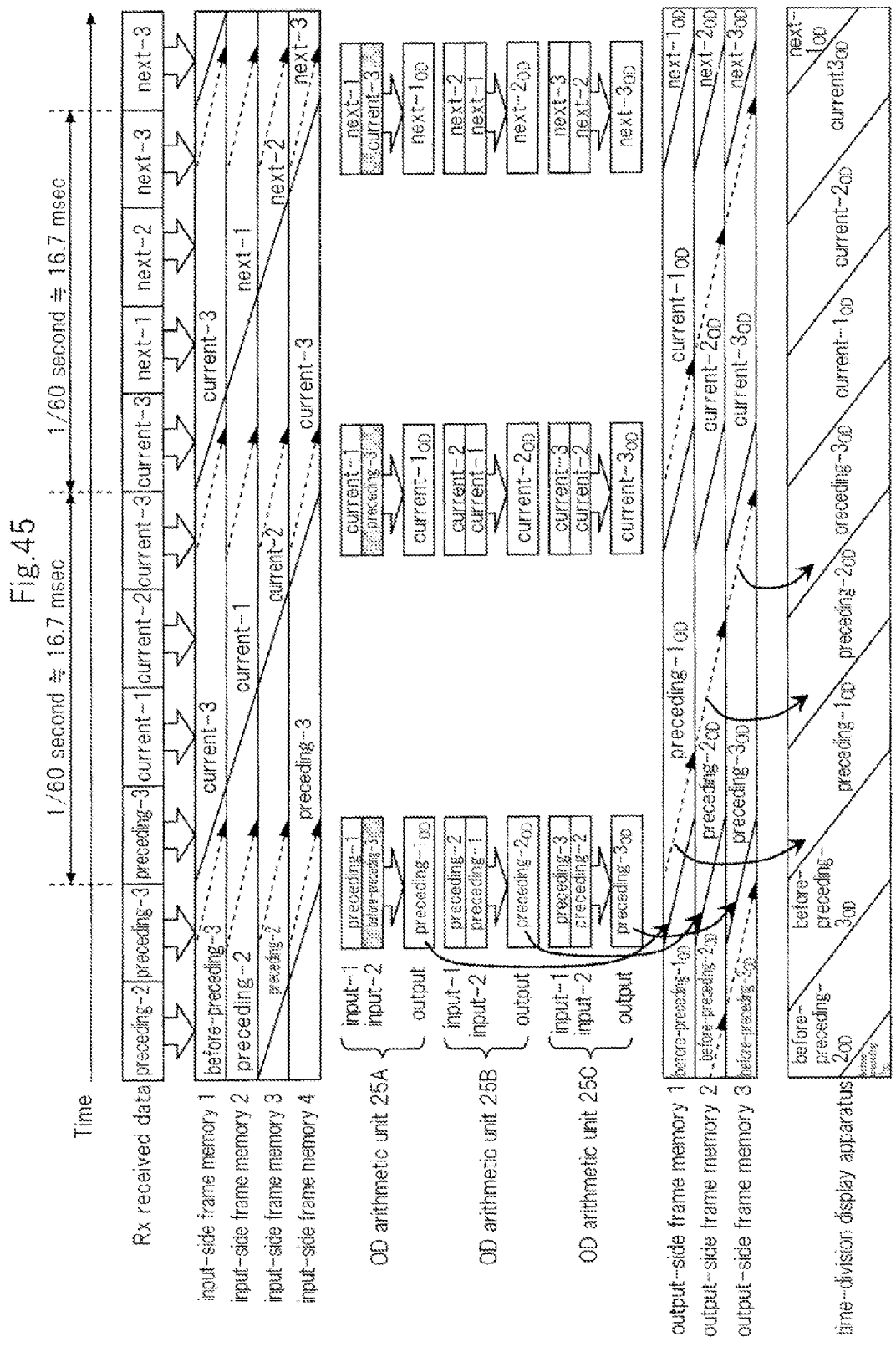
FIG. 45 is a timing chart for describing an example of the operation of the picture transmission system of the sixth exemplary embodiment.

FIG. 45 is a timing chart for describing the operation of the picture transmission system of the present exemplary embodiment when pictures are multiplexed in the field-sequential format.

Each of the pictures in a multiplexed picture that is received by reception unit 21 is stored in frame memory 23A by a controller (not shown). Frame memory 23A of the present exemplary embodiment has a memory capacity that allows storing of all of third L picture and first to third pictures.

More specifically, the controller sequentially writes preceding-3 and current-1 to current-3 to frame memory 23A. The controller simultaneously reads preceding-3 and current-1 to current-3 in frame memory 23A in the interval from the time of completing writing of current-3 until the time of starting writing of next-3. The reading speed is a multiple of ⅔ the speed of writing to frame memory 23A. In other words, the controller reads current-1 to current-3 at a speed (triple-speed) that enables reading of all of current-1 to current-3 in an interval of ⅓ of one frame interval.

OD arithmetic units 25A-25C carry out OverDrive operations based on preceding-3 and current-1 to current-3 that have been read to generate OD pictures.

More specifically, OD arithmetic unit 25A takes current-1 as the object picture, carries out an OverDrive operation taking preceding-3 as the reference picture, and generates an OD picture (current-1 OD) that corresponds to current-1; OD arithmetic unit 25B takes current-2 as the object picture, carries out an OverDrive operation that takes current-1 as the reference picture, and generates OD picture (current-2 OD) that corresponds to current-2; and OD arithmetic unit 25C takes current-3 as the object picture, carries out an OverDrive operation that takes current-2 as the reference picture, and generates an OD picture (current-3 OD) that corresponds to current-3.

Current-1 OD-current-3 OD are written simultaneously by the triple writing mode to frame memory 23B. Time-division display apparatus 3 reads and displays current-1 OD-current-3 OD that were stored in frame memory 23B in the field-sequential format in display order. Here, backlight blinking drive is possible if time-division display apparatus 3 reads current-1 OD-current-3 OD at a speed that is a multiple of K.

Operation of the Picture Transmission System: Dot-Sequential Format

Figure 46:
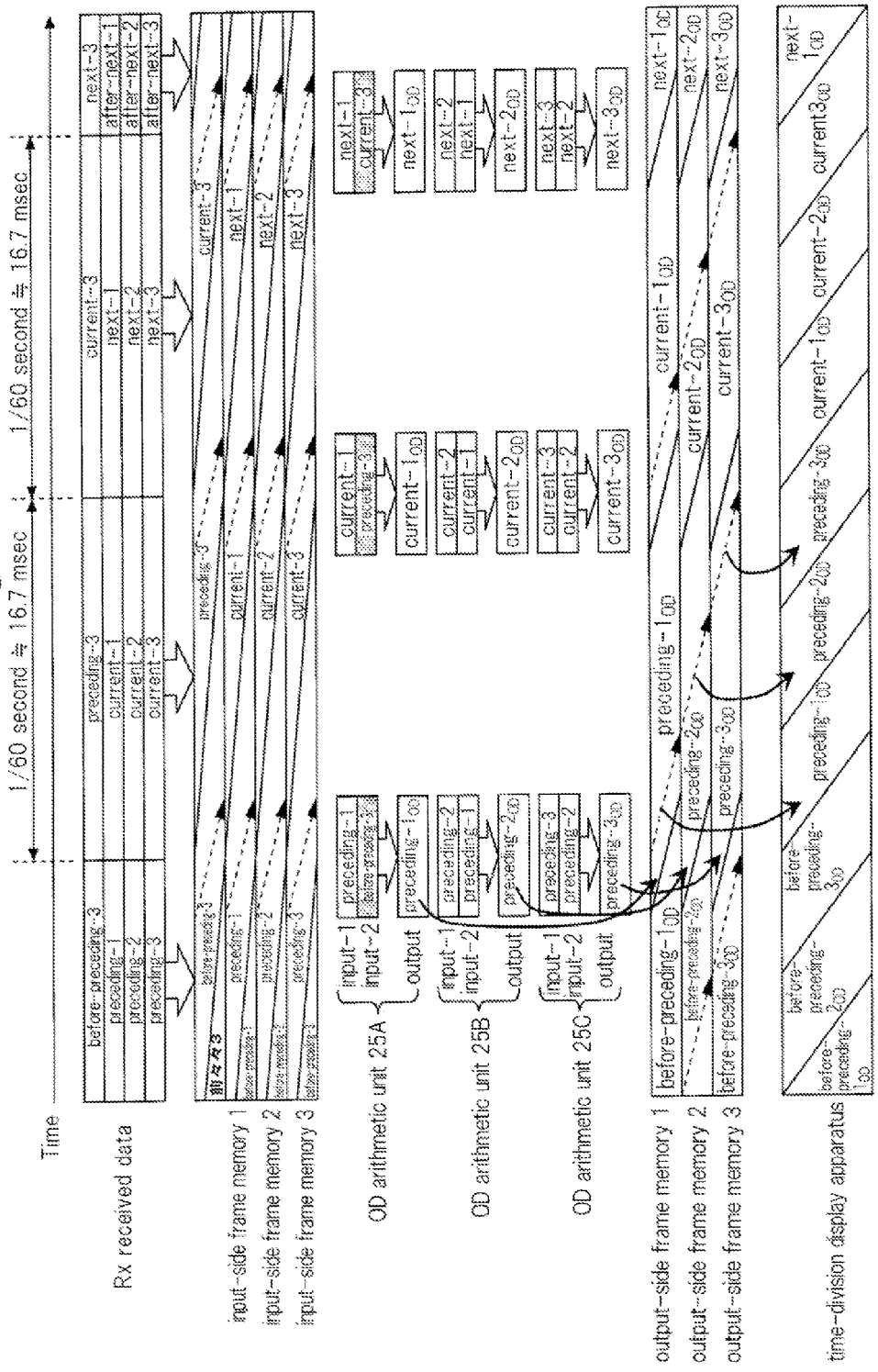
FIG. 46 is a timing chart for describing another example of the operation of the picture transmission system of the sixth exemplary embodiment.

FIG. 46 is a timing chart for describing the operation of the picture transmission system of the present exemplary embodiment when pictures are multiplexed in the dot-sequential format.

Each picture in a multiplexed picture that is received by reception unit 21 is stored in frame memory 23A by a controller (not shown). Here, each picture is multiplexed in the dot-sequential format, and the controller therefore simultaneously stores each of preceding-3 and current-1 to current-3 in frame memory 23A.

When the multiplexed picture switches to the next frame, the controller returns the writing address to the header and writes preceding-3 and next-1 to next-3 in frame memory 23A similar to preceding-3 and current-1 to current-3.

The controller simultaneously reads preceding-3 and current-1 to current-3 in frame memory 23A in the interval from one subframe interval (⅓ frame interval) before the time of completing the writing of these pictures until the timing of the completion of writing of these pictures. The reading speed of these pictures is three times the writing speed to frame memory 23A.

OD arithmetic units 25A-25C generate OD pictures based on preceding-3 and current-1 to current-3 that were read. The method of generating the OD pictures is the same as the case of multiplexing pictures in field-sequential format.

Current-1 OD-current-3 OD are simultaneously written by the triple-writing mode to frame memory 23B. Time-division display apparatus 3 reads and displays current-1 OD-current-3 OD that were stored in frame memory 23B in display order in field-sequential format. Backlight blinking drive is possible if time-division display apparatus 3 here reads current-1 OD-current-3 OD at speed that is a multiple of K.

When Multiplexing N Pictures

When time-division display apparatus 3 sequentially displays N pictures in a one-frame interval, multiplexing unit 11 multiplexes N pictures (first picture to Nth picture) and the Nth picture of the frame before the frame that includes these pictures (also referred to as the Nth L picture).

In this case, as shown in FIG. 28, the speed of writing to frame memory 23B should be at least a multiple of N/2. However, because the Nth L picture is also written in the writing to frame memory 23B, simultaneous reading from each picture in frame memory 23B at N/2 speed is not possible.

Figure 47:
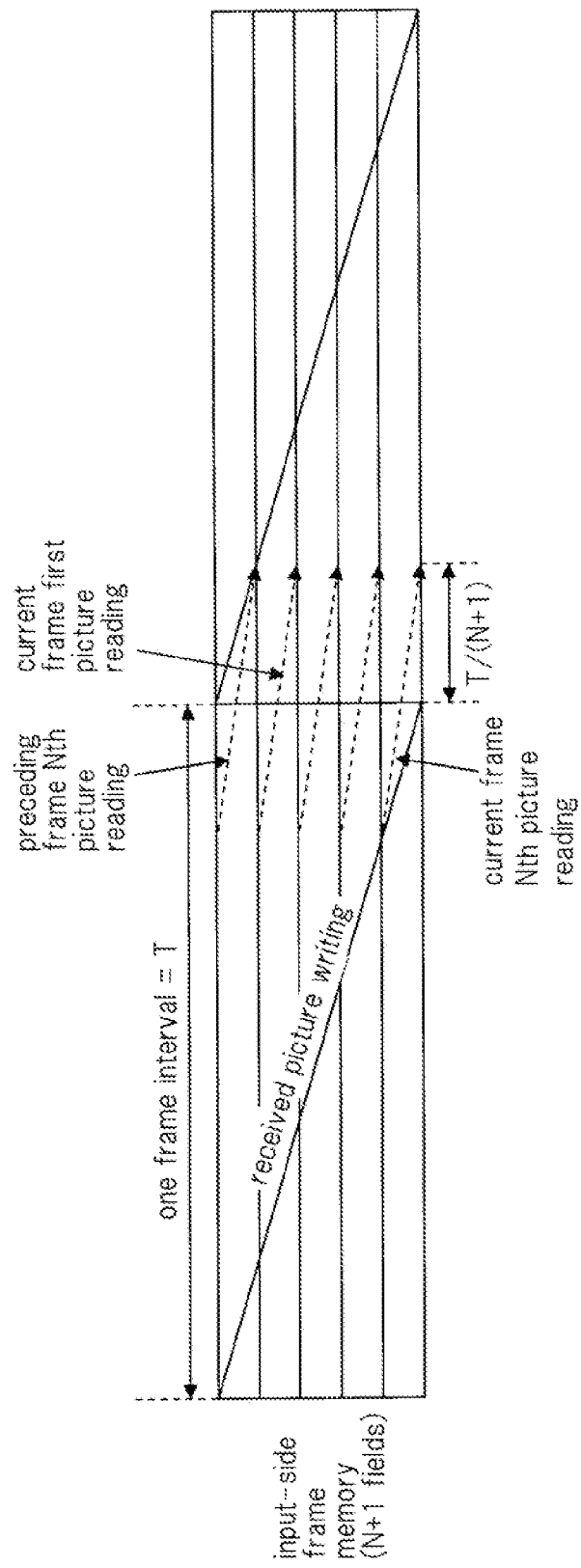
FIG. 47 is a timing chart for describing the operation of a frame memory.

FIG. 47 is a timing chart for describing the operation of reading pictures of N+1 fields from frame memory 23A.

As shown in FIG. 47, in order to simultaneously read the (N+1) pictures of the Nth L picture and the first picture to the Nth picture, these (N+1) pictures must be read in no more than an interval of 2T/(N+1) when one frame interval is set to T. Accordingly, the controller should read the (N+1) pictures at at least a speed that is a multiple of (N+1)/2. When N=3, the controller should read at a speed of at least a multiple of (3+1)/2=2.

When time-division display apparatus 3 reads pictures in frame memory 23B at a speed that is a multiple of K, as shown in FIG. 32, the speed of writing to frame memory 23B should be at least a speed that is a multiple of KN/(1+K).

The speed of reading from frame memory 23A should be reading at at least the speed that is the faster of the minimum value "(N+1)/2 speed" of the speed of reading of frame memory 23A that was found in FIG. 47 and the minimum value "KN/(1+K) speed" of the speed of writing to frame memory 23 B that was found in FIG. 47. For example, when N=4 and K=2, the minimum value of the speed of reading from frame memory 23A is a speed that is a multiple of (4+1)/2=2.5, and the minimum value of the speed of writing to frame memory 23 B is a speed that is a multiple of (2×4)/(1+2)=⅜. Because 2.5 is less than ⅜, the speed of reading from frame memory 23A must be a speed that is at least a multiple of ⅜, which is the minimum value of the speed of writing to frame memory 23B.

When four pictures are multiplexed by the dot-sequential format, the speed of reading from frame memory 23A is always at least a speed that is a multiple of 0.5, whereby the minimum value of the speed of reading from frame memory 23A is prescribed by the minimum speed of reading from frame memory 23B. More specifically, the minimum value of the speed of reading from frame memory 23A is a speed that is a multiple of N/2.

The effect is next described.

In the present exemplary embodiment, multiplexing unit 11 further multiplexes a picture (third L picture) that has a display order that precedes by one that of the first picture. OD arithmetic unit 25A converts the picture element value of the first picture in the multiplexed picture using the third L picture in the multiplexed picture.

In this case, the picture element value of the first picture can be accurately converted even when the first picture that is the picture having the earliest display order in the multiplexed picture is a moving picture.

Seventh Exemplary Embodiment

Figure 48:
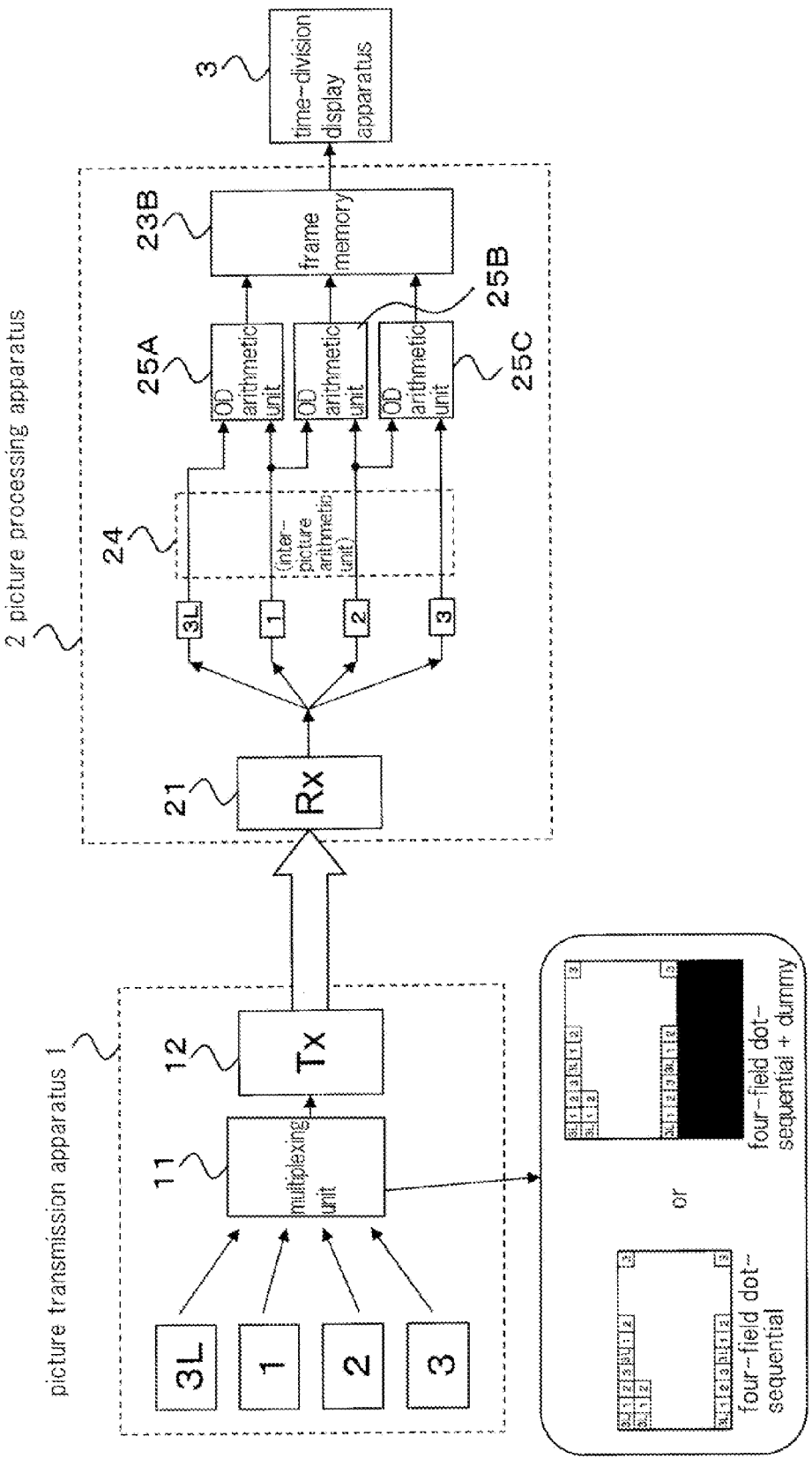
FIG. 48 is a block diagram showing the picture transmission system of the seventh exemplary embodiment.

FIG. 48 is a block diagram showing the picture transmission system of the seventh exemplary embodiment of the present invention. In FIG. 48, the picture transmission system has the same configuration as the configuration shown in FIG. 33.

In FIG. 48, multiplexing unit 11 multiplexes first picture to third picture and, as in the sixth exemplary embodiment, the third L picture. The dot-sequential format is used in the multiplexing method realized by multiplexing unit 11.

The merit of multiplexing while including the third picture of the preceding frame in this way is that, as in the fourth exemplary embodiment and the sixth embodiment, accurate OverDrive can be realized even when the third picture is a moving picture.

Operation of the Picture Transmission System: Dot-Sequential Format

Figure 49:
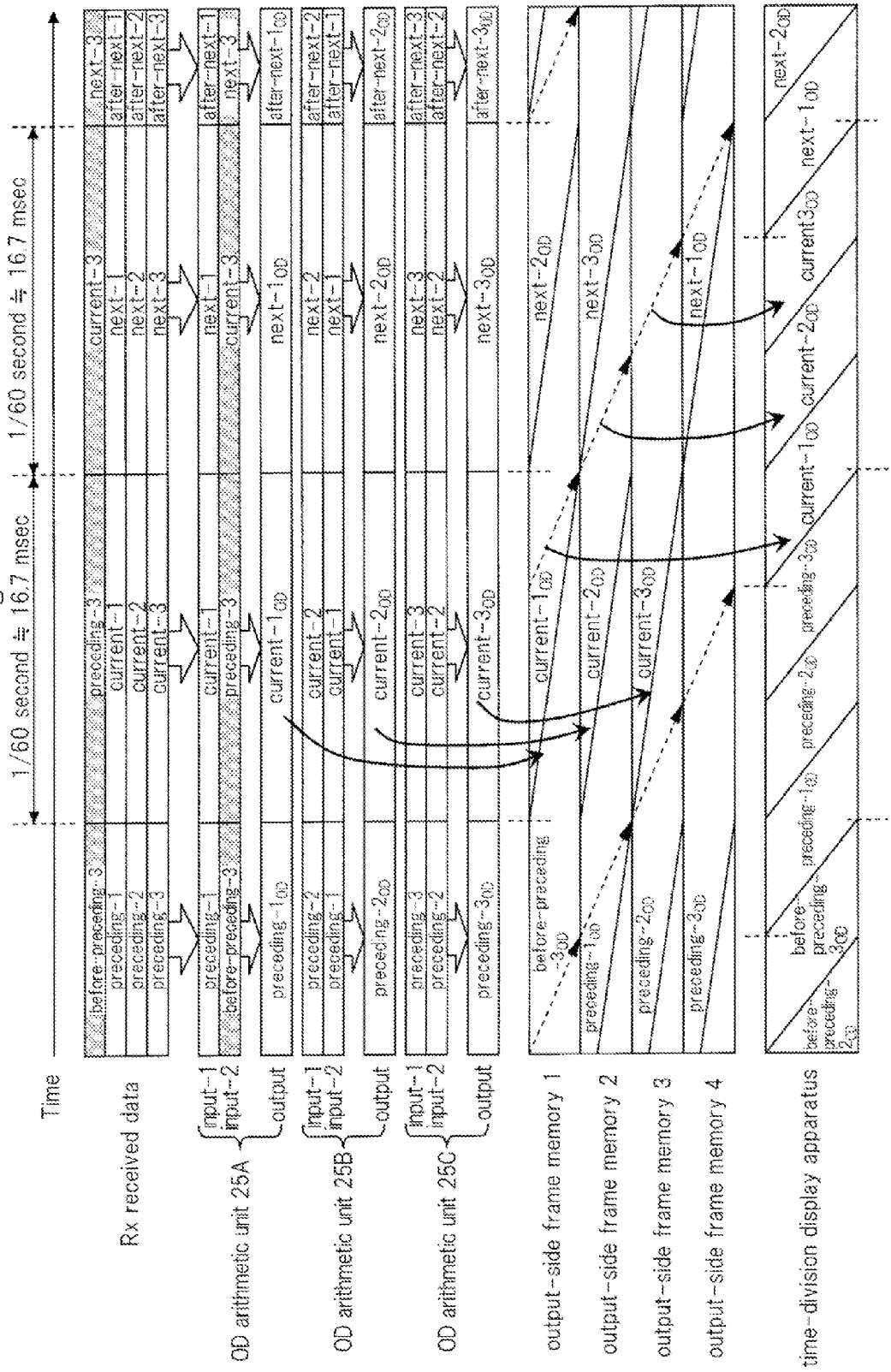
FIG. 49 is a timing chart for describing an example of the operation of the picture transmission system of the seventh exemplary embodiment.

FIG. 49 is a timing chart for describing the operation of the picture transmission system of the present exemplary embodiment.

The first to third pictures in a multiplexed picture are multiplexed in the dot-sequential format, and reception unit 21 therefore receives the picture element values of the same position at substantially the same time. As a result, each of the picture element values of the same position are applied as input to the arithmetic unit without passing by way of frame memory 23A.

The operation of OD arithmetic units 25A-25C is the same as in the sixth exemplary embodiment and redundant explanation is therefore here omitted.

Current-1 OD-current-3 OD that are generated by each of OD arithmetic units 25A-25C are written simultaneously at single speed to frame memory 23B. Because time-division display apparatus 3 must read current-1 OD-current-3 OD in the field-sequential format at this time, as in the third exemplary embodiment, the memory capacity of frame memory 23B must be at least four fields when dummy pictures are not inserted in multiplexing, and must be for at least five fields when the display speed of time-division display apparatus 3 is faster than single speed (speed that is a multiple of K).

When dummy pictures are inserted, the memory capacity of frame memory 23B should be at least three fields. In this case, the dummy ratio should be (N−2)/2 such as shown in FIG. 37 of the third exemplary embodiment. N is always the number of picture types and is not the number of pictures that are multiplexed in multiplexing unit 11. For example, when the first picture to third picture and the third L picture are multiplexed in multiplexing unit 11, N is 3.

In this way, when multiplexing unit 11 multiplexes the four pictures, i.e., the third L picture and first picture to third picture, in the dot-sequential format and transmits a picture of 3200 picture elements×600 lines, the size of the dummy pictures is (3−2)/2=½ the size of the multiplexed picture, i.e., 3200 picture elements×300 lines. Time-division display apparatus 3 displays the first picture to third picture that are read in display order. In addition, backlight blinking drive is possible if the time-division display apparatus reads these pictures at a speed that is a multiple of K.

The effects are next described.

In the present exemplary embodiment, as in the sixth exemplary embodiment, the picture element value of a first picture that is the first to be displayed in display order in a multiplexed picture can be accurately converted even when this first picture is a moving picture.

WORKING EXAMPLES

As described hereinabove, the picture transmission system is able to transmit pictures of a plurality of types or high-speed moving pictures.

First, as a working example in which pictures of a plurality of types are transmitted, a picture transmission system is described that is capable of using an optical shutter to selectively allow a user to perceive pictures of a plurality of types that are contained in a multiplexed picture.

Figure 50:
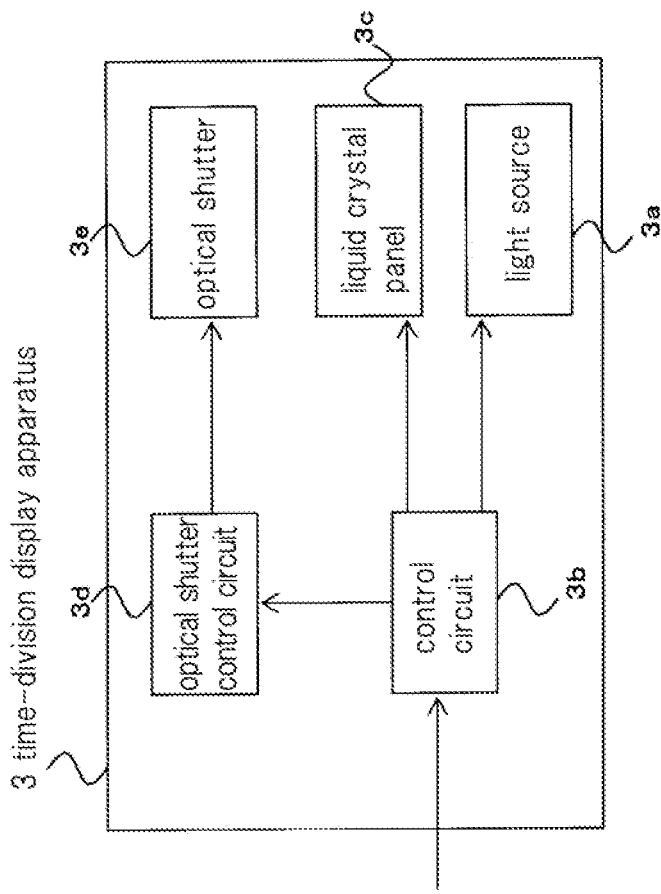
FIG. 50 is a block diagram showing another example of the configuration of a time-division display apparatus.

FIG. 50 is a block diagram showing an example of the configuration of time-division display apparatus 3 in the present working example. In FIG. 50, time-division display apparatus 3 includes, in addition to the configuration shown in FIG. 13A, optical shutter control circuit 3d and optical shutter 3e.

Optical shutter control circuit 3d receives a control signal such as a vertical synchronizing signal or a horizontal synchronizing signal of a multiplexed picture from control circuit 3b, and based on this control signal, switches between ON (a light-transmitting state) and OFF (light-blocking state) of optical shutter 3e.

Optical shutter 3e is, for example, viewing glasses that are capable of selectively transmitting or blocking light by means of liquid crystal. Optical shutter 3e (liquid crystal viewing glasses) may be one or a plurality.

A case is first described regarding pictures of a plurality of types that have no relevancy to each other. Examples of the pictures that have no relevancy to each other include the pictures of three types shown in FIG. 5 or pictures of four types shown in FIG. 51.

Figure 51:
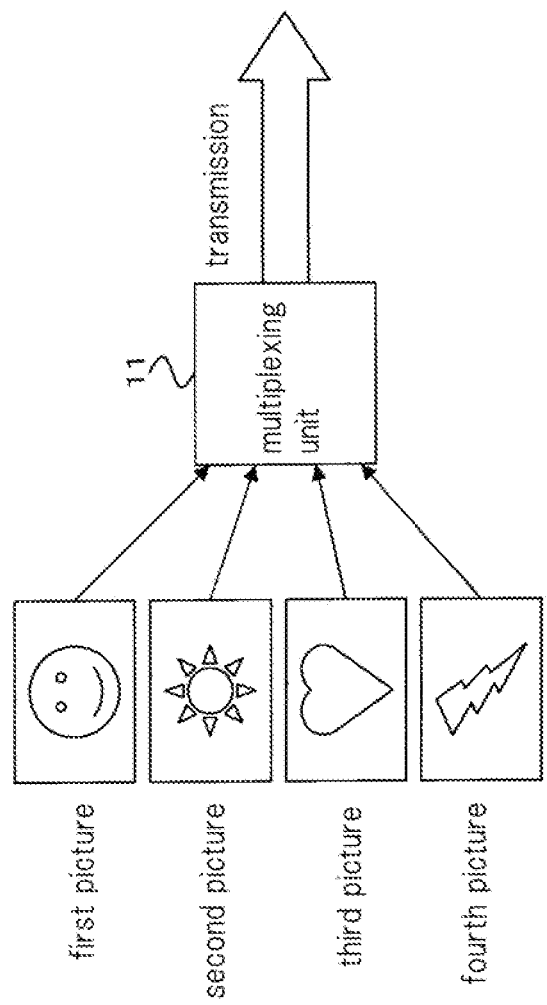
FIG. 51 is an explanatory view showing another example of pictures that are transmitted.
Figure 52:
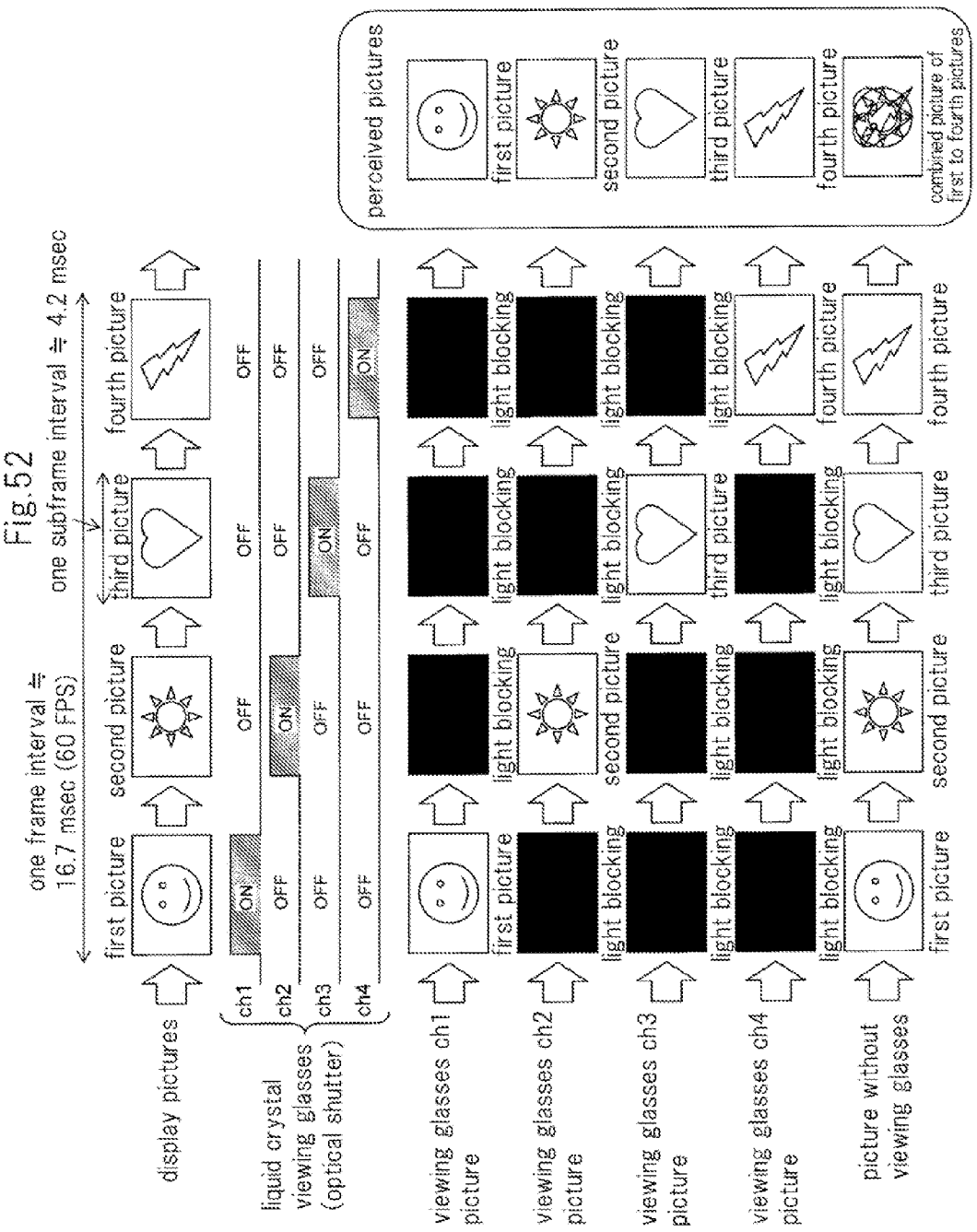
FIG. 52 is a timing chart for describing another example of the operation of a time-division display apparatus.

FIG. 52 is a timing chart for describing the operation of time-division display apparatus 3 for the case of pictures of a plurality of types having no relevancy to each other. As the pictures of a plurality of types, the pictures of four types shown in FIG. 51 (first picture to fourth picture) are used.

Time-division display apparatus 3 displays pictures of four types in one frame in the order of: first picture→second picture→third picture→fourth picture. In other words, first to fourth pictures are displayed in a one-frame interval (16.7 msec). As a result, one subframe interval is 1/60×¼≈4.2 msec.

Further, in order to have users selectively perceive any of first to fourth pictures, four types of optical shutters are used as optical shutters 3e in which the intervals of ON (a state of transmitting light) are different from each other. In the following description, each of optical shutters 3e are referred to as optical shutters 3e of ch1-ch4. In addition, optical shutters 3e of ch1-ch4 are assumed to correspond to first picture to fourth picture, respectively.

In this case, optical shutter control circuit 3d sets optical shutter 3e of ch1 in a light-transmitting state in the interval in which the first picture is displayed and in a light-blocking state in other intervals. Optical shutter control circuit 3d further places optical shutter 3e of ch2 in a light-transmitting state in the interval in which the second picture is displayed and in a light-blocking state in other intervals. Optical shutter control circuit 3d further sets optical shutter 3e of ch3 in a light-transmitting state during the interval in which the third picture is being displayed and in a light-blocking state in other intervals. Finally, optical shutter control circuit 3d sets optical shutter 3e of ch4 in a light-transmitting state during the interval in which the fourth picture is being displayed and in a light-blocking state in other intervals.

Instead of providing four types of optical shutters 3e, a device may be used as optical shutters 3e that is capable of switching the interval in which a transmitting state is assumed. This switching may be carried out at optical shutters 3e, or may be carried out in the main body of time-division display apparatus 3. If the user does not view through optical shutter 3e, the viewer perceives an image in which the first to fourth moving pictures are superposed.

Figure 53:
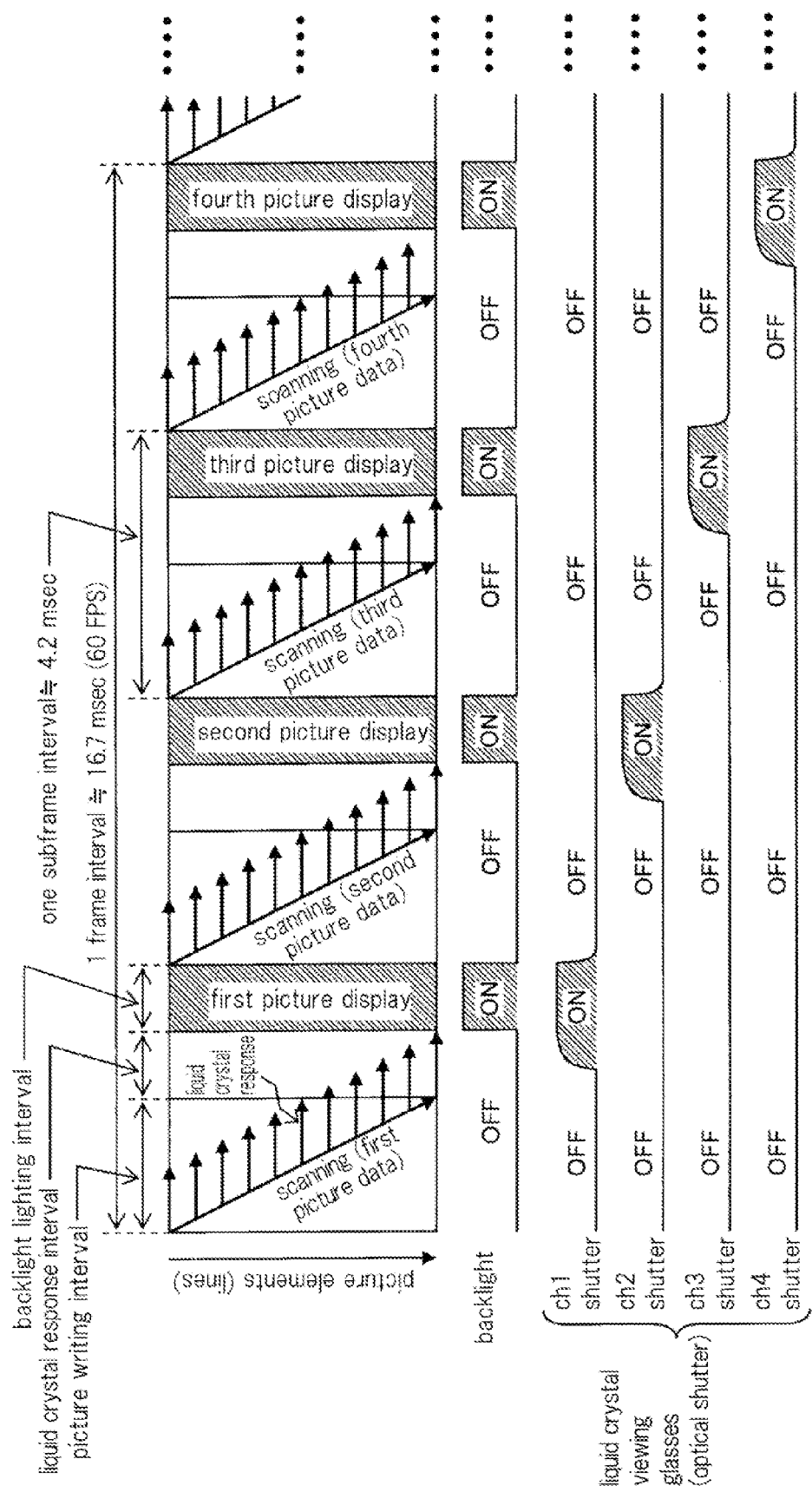
FIG. 53 is a timing chart for describing another example of the operation of a time-division display apparatus.

FIG. 53 is a timing chart for describing the scanning interval by time-division display apparatus 3. Time-division display apparatus 3 preferably implements backlight blinking drive to allow selective perception of the first to fourth pictures while simultaneously limiting crosstalk among the pictures.

As shown in FIG. 53, time-division display apparatus 3 scans in approximately one half of each one-subframe interval and then after waiting for the response of the liquid crystal, lights up the backlight. In addition, each of the optical shutters of ch1-ch4 is controlled to turn ON (light-transmitting state) in synchronization with the timing of the display of the first to fourth pictures.

The operations of the picture transmission system when transmitting the first picture to fourth picture are next described.

As shown in FIG. 51, the first picture to the fourth picture are multiplexed in the field-sequential format or the dot-sequential format in multiplexing unit 11 and transmitted to picture processing apparatus 2 by way of a predetermined image transmission channel. These pictures are subjected to OverDrive operations in OD arithmetic unit 25 or OD arithmetic units 25A-25C of picture processing apparatus 2 with pictures that precede by one subframe as the reference pictures. When the fourth picture is a moving picture, the fourth picture of the preceding frame should also be multiplexed and transmitted in addition to the first picture to the fourth picture, as described in the sixth exemplary embodiment and the seventh exemplary embodiment. In this way, the first picture is subjected to the OverDrive operation with the fourth picture of the preceding frame as the reference picture.

As described hereinabove, when optical shutter 3e is used to cause selective perception of pictures as in FIG. 51, a high-quality image that is free of crosstalk can be displayed.

A case is next described regarding pictures of a plurality of types having relevancy to each other. As an example of pictures having relevancy to each other, a stereoscopic picture is presented that has the right-eye picture and the left-eye picture shown in FIG. 54.

Figure 55:
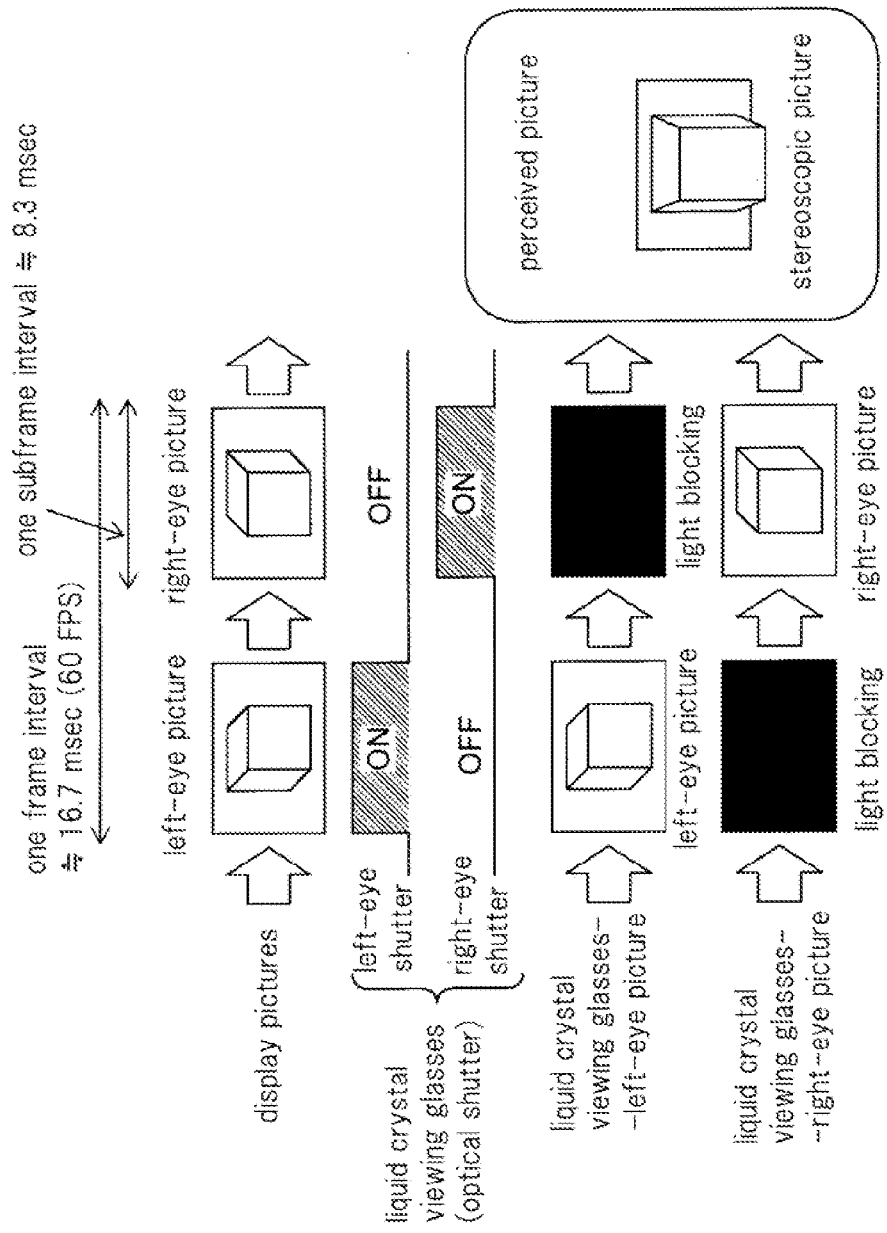
FIG. 55 is a timing chart for describing another example of the operation of a time-division display apparatus.

FIG. 55 is a timing chart for describing the operation of time-division display apparatus 3 for causing a user to perceive a stereoscopic picture. In this case, optical shutters 3e include an optical shutter for the right eye that corresponds to a right-eye picture and a left-eye optical shutter that corresponds to a left-eye picture.

In addition, time-division display apparatus 3 implements display in the order of left-eye picture→right-eye picture within one frame interval. In other words, a left-eye picture and a right-eye picture are displayed in one frame interval (16.7 msec). As a result, one subframe interval is 1/60×1/2=8.3 msec.

Optical shutter control circuit 3d sets right-eye optical shutter 3e in the transmitting state and sets the left-eye optical shutter 3e in the blocking state in the interval in which the right-eye picture is being displayed. Conversely, optical shutter control circuit 3d sets left-eye optical shutter 3e in the transmitting state and right-eye optical shutter 3e in the blocking state in the interval in which the left-eye picture is being displayed.

In this way, pictures that differ from each other are irradiated to the right eye and left eye, and the user perceives a stereoscopic picture. In the present working example, when a liquid crystal display device is used for time-division display apparatus 3 because optical shutters 3e are used, backlight blinking drive is preferably implemented.

The operations of the picture transmission system are next described for a case in which a right-eye picture and a left-eye picture are transmitted.

Figure 54:
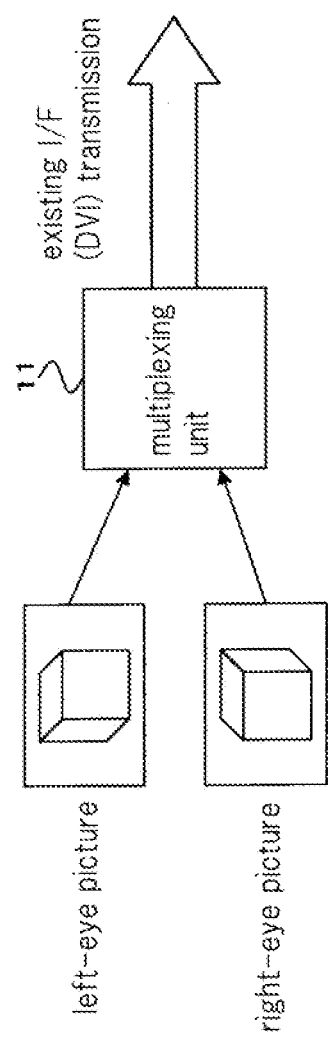
FIG. 54 is an explanatory view showing a stereoscopic picture that is another example of a picture that is transmitted.

As shown in FIG. 54, the left-eye picture and the right-eye picture are multiplexed in the field-sequential format or the dot-sequential format in multiplexing unit 11 and transmitted to picture processing apparatus 2 by way of an existing image transmission channel (such as DVI). These pictures are subjected to OverDrive operations in OD arithmetic unit 25 or OD arithmetic units 25A-25C of picture processing apparatus 2 with the picture of the preceding subframe as the reference picture. In other words, the right-eye picture is subjected to the OverDrive operation with the left-eye picture as the reference picture, and the left-eye picture is subjected to the OverDrive operation with the right-eye picture as the reference picture. When the right-eye pictures are both moving pictures, the left-eye picture of the preceding frame should also be multiplexed and transmitted in addition to the left-eye pictures and right-eye pictures as described in the sixth exemplary embodiment and the seventh exemplary embodiment.

As described hereinabove, appropriate OverDrive operations are carried out for each of the right-eye pictures and left-eye pictures, whereby the user can be caused to perceive a stereoscopic image of high picture quality.

Figure 56:
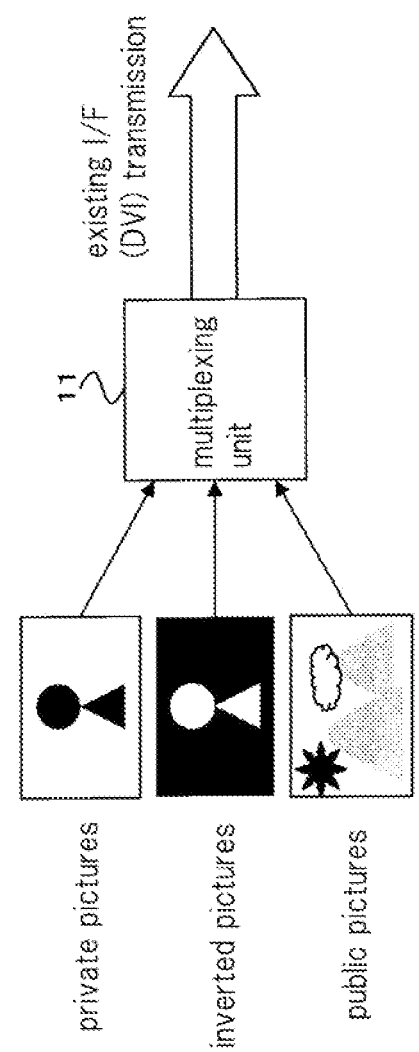
FIG. 56 is a timing chart for describing another example of the operation of a time-division display apparatus.

Another example is next described in which pictures of a plurality of types are pictures having relevancy to each other. The present pictures are secure pictures that include: private pictures that can be perceived only by persons who view the display of a time-division display apparatus through optical shutters 3e, inverted pictures that cancel the private pictures to cause perception of pictures having no relation to the private pictures, and public pictures that are perceived by persons not wearing the optical shutters, as shown in FIG. 56.

Figure 57:
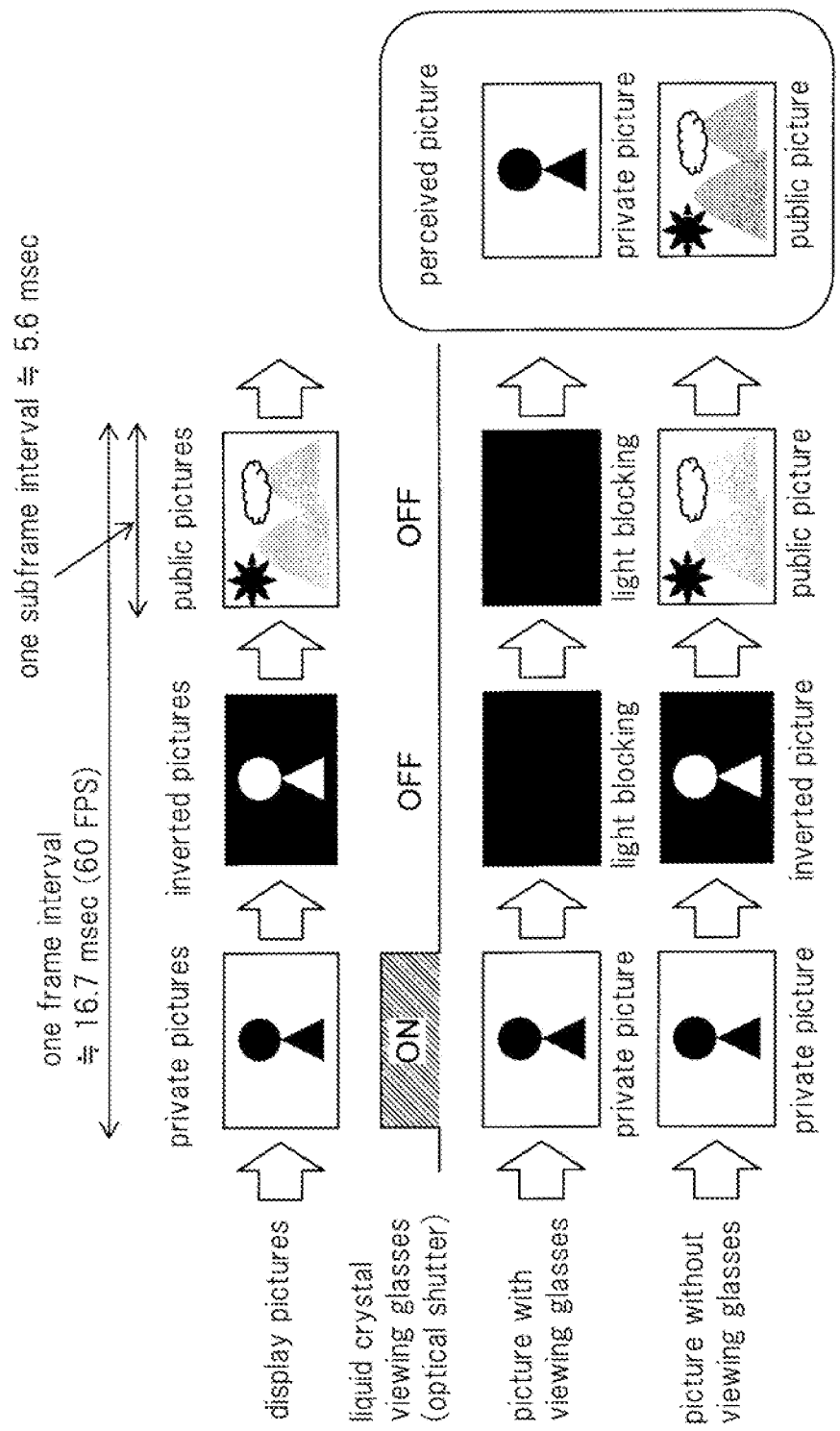
FIG. 57 is a timing chart for describing another example of the operation of a time-division display apparatus.

FIG. 57 is a timing chart for describing the operations of time-division display apparatus 3 for causing a user to perceive secure pictures. Time-division display apparatus 3 displays secure pictures in the order of private pictures→inverted pictures→public pictures in one frame interval.

Optical shutter control circuit 3d sets optical shutter 3e in the transmitting state in the interval in which private pictures are being displayed and sets optical shutter 3e in the blocking state in other intervals.

In this way, only a person who views the display of time-division display apparatus 3 through optical shutters 3e is able to perceive the private pictures. For a person who does not view the display of time-division display apparatus 3 through optical shutters 3e, the time quadrature effect of vision causes the private pictures and inverted pictures to temporally cancel each other to produce a gray picture, making only public pictures visible. Because optical shutters 3e are used in this working example as well, when a liquid crystal display device is used in time-division display apparatus 3, backlight blinking drive is preferably implemented to reduce crosstalk when the optical shutters are equipped.

The operations of the picture transmission system when transmitting secure pictures are next described.

As shown in FIG. 56, private pictures, inverted pictures, and public pictures are multiplexed in the field-sequential format or the dot-sequential format in multiplexing unit 11 and then transmitted to picture processing apparatus 2 by way of an existing image transmission channel (such as DVI). These pictures are subjected to OverDrive operation in OD arithmetic unit 25 or OD arithmetic units 25A-25C of picture processing apparatus 2 with pictures of the preceding subframe as the reference pictures. In other words, inverted pictures are subjected to the OverDrive operation with private pictures as reference pictures, public pictures are subjected to the OverDrive operation with inverted pictures as the reference pictures, and private pictures are subjected to the OverDrive operation with public pictures as the reference pictures. When the public pictures are moving pictures, public pictures of the preceding frame should be multiplexed and transmitted in addition to the private pictures, inverted pictures, and the public pictures as described in the sixth exemplary embodiment and the seventh exemplary embodiment.

In addition, various picture processing other than the OverDrive operation can also be implemented by providing inter-picture arithmetic unit 24 in picture processing apparatus 2.

More specifically, inter-picture arithmetic unit 24 subjects each object picture in a multiplexed picture to picture processing based on these object pictures and other pictures in the multiplexed picture.

For example, in the case of the first exemplary embodiment, object pictures in a multiplexed picture are subjected to picture processing based on the object pictures and reference pictures that have been delayed by frame memory 23.

In the second to seventh exemplary embodiments, each of the pictures in the same frame can be used to implement picture processing. For example, inter-picture arithmetic unit 24 can reduce the brightness of private pictures and inverted pictures by half and perform an operation (such as addition) on the inverted pictures and public pictures to mix the pictures and thus increase the contrast of the public pictures. When multiplexing unit 11 also multiplexes a picture (Nth L picture) of the preceding frame, inter-picture arithmetic unit 24 may carry out picture processing that further employs this Nth L picture.

In addition, inter-picture arithmetic unit 24 can carry out predetermined picture processing upon public pictures according to the brightness value of private pictures or inverted pictures and thus make private pictures more difficult to see.

From the foregoing explanation, appropriate OverDrive operations can be carried out upon each of private pictures, inverted pictures, and public pictures, whereby secure pictures of high picture quality can be made perceivable to the user.

In particular, in the present working example, the ability to accurately display gradations of each picture is preferable to prevent a person who does not view the display through optical shutters 3e from perceiving private pictures. In the present working example, each picture is subjected to an OverDrive operation with pictures of the preceding subframe as reference pictures, whereby the response delay of liquid crystal can be compensated and desired gradations can be accurately displayed. Accordingly, the confidentiality of private pictures can be increased.

In each of the working examples described hereinabove, the pictures that are transmitted may be still pictures or may be moving pictures. When the pictures are still pictures, 60 identical pictures are transmitted in one second, and when the pictures are moving pictures, 60 differing pictures are transmitted in one second. Because the transmission speed of a multiplexed picture is 60 FPS, the display speed of each picture in a multiplexed picture need not be 60 FPS. For example, the display speed of each picture may be 30 FPS or 15 FPS. In this case, the same multiplexed picture is transmitted over two frames or four frames of a multiplexed picture. In addition, moving pictures and still pictures may be mixed in pictures of a plurality of types that are multiplexed in a multiplexed picture.

A working example in which high-speed moving pictures are transmitted is next described.

Figure 58:
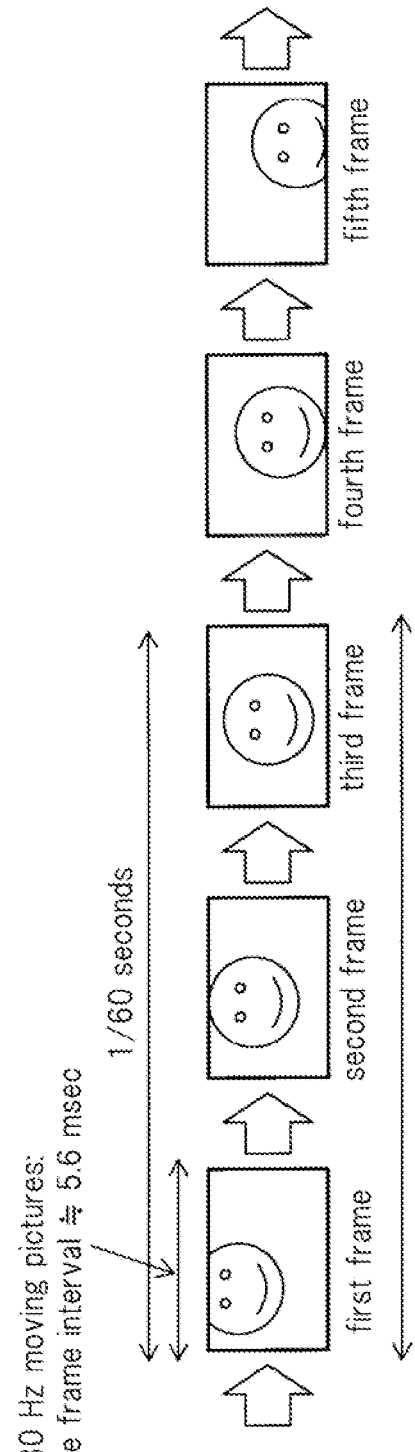
FIG. 58 is an explanatory view showing an example of a high-speed moving picture.

FIG. 58 is an explanatory view showing an example of high-speed moving pictures. The frame frequency that can be transmitted on an existing image transmission system such as DVI is 60 Hz, but the frame frequency of the high-speed moving pictures shown in FIG. 58 is, for example, 180 Hz and thus higher than 60 Hz. In such cases as well, the present picture transmission system enables both the transmission of high-speed moving pictures using an existing image transmission system and, by implementing an OverDrive operation, the display of clear pictures that are free of blurring with high picture quality.

As shown in FIG. 58, the high-speed moving pictures have a frame frequency (180 Hz in FIG. 58) that is higher than 60 Hz and therefore cannot be transmitted, as is, using an existing image transmission system.

However, if the present picture transmission system is used to multiplex and transmit each of N frames that are temporally adjacent among high-speed moving pictures in one picture in 1/60-second units, transmission becomes possible even when the transmission channel is 60 Hz.

More specifically, in the case of high-speed moving pictures having a frame frequency of 180 Hz, it can be seen that three temporally adjacent frames should be multiplexed and transmitted as shown in FIG. 59. At this time, it is important that multiplexing be carried out according to the order of display in time-division display apparatus 3. In other words, when three frames are multiplexed in the field-sequential format in FIG. 59, the order of display in time-division display apparatus 3 is first frame→second frame→third frame→..., whereby multiplexing unit 11 multiplexes in the field-sequential format in the order of the first frame, the second frame, and the third frame.

When multiplexing first frame to third frame as in FIG. 59, accurate OverDrive operations are possible for the case of the picture transmission system of the fourth exemplary embodiment or fifth exemplary embodiment, but in an OD arithmetic unit of picture processing apparatus 2 in the case of the picture transmission system of the second exemplary embodiment or third exemplary embodiment, the first frame is subjected to an OverDrive operation that takes the third frame as a reference picture, whereby the OverDrive operation is carried out based on a picture that is not a picture of the preceding frame, and the picture quality consequently suffers.

As a result, when multiplexing the fourth frame to sixth frame as shown in FIG. 60, the third frame, which is one frame before the fourth frame, is preferably further multiplexed as in the sixth exemplary embodiment or seventh exemplary embodiment. In this case, an OverDrive operation should be carried out in picture processing apparatus 2 by the method described in the sixth exemplary embodiment or the seventh exemplary embodiment.

By adopting this approach, OverDrive can always be implemented from pictures that precede by one frame in time, and high-speed moving picture display can be realized with high picture quality that is free of blurring.

As described hereinabove, clear high-speed moving pictures display that has high picture quality and that is free of blurring is possible. A case was here described for DVI, but the concepts of the present invention can obviously be applied in cases of using image interfaces that handle frame frequencies up to 120 Hz based on standards such as HDMI or DisplayPort. In the case of an interface of 120 Hz, moving pictures of 240 Hz or moving pictures of 360 Hz and more can be transmitted.

Although the present invention has been described using the exemplary embodiments and working examples described hereinabove, the present invention is not limited to only these exemplary embodiments and working examples, and the invention of the present application includes modifications or amendments within the scope of the present invention as set forth in the claims that will be clear to one of ordinary skill in the art.

This application is the National Phase of PCT/JP2010/050690, filed Jan. 21, 2010, which claims the benefits of priority based on Japanese Patent Application No. 2009-016608, Japanese Patent Application No. 2009-016609, Japanese Patent Application No. 2009-016610, and Japanese Patent Application No. 2009-016611, for which application was submitted on Jan. 28, 2009 and incorporates by citation all of the disclosures of these applications.

What is claimed is:

1. A picture transmission system that includes a picture transmission apparatus and a display apparatus, said picture transmission apparatus comprising:
a multiplexing unit that multiplexes N display pictures in display order, where N is an integer equal to or greater than 2, to generate a multiplexed picture; and
a transceiver that transmits a multiplexed picture that was generated in said multiplexing unit;
said display apparatus comprising:
a receiver that receives said multiplexed picture from said picture transmission apparatus;
a delay unit that delays, by the amount of one frame interval of the display pictures, the display pictures in said multiplexed picture that was received by said receiver to generate reference pictures;
a generator that, each time said receiver receives a display picture in said multiplexed picture, converts the picture element value of the display picture based on a reference picture that was generated by said delay unit to generate a corrected picture that corresponds to the display picture; and
a display unit that has a plurality of picture elements and that scans said plurality of picture elements based on the corrected pictures that were generated by said generator to display pictures that accord with said corrected pictures, wherein:
said multiplexing unit multiplexes said N display pictures in field-sequential format; and
when one frame interval of said display pictures is set to Ts, the scanning interval of said corrected pictures is Ts;
said multiplexing unit multiplexes in each of said N display pictures a number of dummy pictures that is a multiple of K−1 of the number of picture elements of the display picture, where K is a real number greater than 1, in field-sequential format and multiplexes display pictures in which dummy pictures were multiplexed in field-sequential format; and
when one frame interval of said display pictures is set to Ts, the scanning interval of said corrected pictures is Ts/K.

2. The picture transmission system as set forth in claim 1, wherein:
said display apparatus further includes a picture processing unit that subjects display pictures in a multiplexed picture that was received by said receiver to a picture process according to reference pictures that were generated by said delay unit; and
said generator converts picture element values of display pictures that have been subjected to a picture process by said picture processing unit.

3. A picture transmission system that includes a picture transmission apparatus and display apparatus, said picture transmission apparatus comprising: a multiplexing unit that multiplexes N display pictures, where N is an integer equal to or greater than 2, to generate a multiplexed picture; and
a transceiver that transmits the multiplexed picture that was generated in said multiplexing unit; and
said display apparatus comprising:
a receiver that receives said multiplexed picture from said picture transmission apparatus;
a memory that stores all display pictures in a multiplexed picture that was received by said receiver;
a generator that converts picture element values of each of display pictures that were stored in said memory based on reference pictures having a display order that precedes by one the display pictures that were stored in said memory to generate N corrected pictures that correspond to each of said display pictures;
a recording unit that stores all of corrected pictures that were generated by said generator;
a display unit that has a plurality of picture elements and that scans said plurality of picture elements based on the corrected pictures that were recorded in said recording unit to display pictures that accord with said corrected pictures; wherein
said multiplexing unit multiplexes said N display pictures in display order in field-sequential format; and
when K is a real number greater than 1 and one frame information of said display pictures is set to Ts, the scanning interval of said corrected pictures is Ts/K;
said multiplexing unit multiplexes said N display pictures in dot-sequential format by sequentially arranging in a series the picture element values of the same position of each display picture; and
when K is a real number greater than 1 and one frame interval of said display pictures is set to Ts, the scanning interval of said corrected pictures is Ts/K.

4. The picture transmission system as set forth in claim 3, wherein said generator converts the picture element value of the display picture that is earliest in display order among said display pictures using as said reference picture the display picture that is latest in display order among said display pictures.

5. The picture transmission system as set forth in claim 3, wherein:
said display apparatus further includes a delaying unit that delays, by a one-frame interval of said multiplexed picture, the display picture having display order that is latest among display pictures in a multiplexed picture that has been stored in said memory; and said generator uses a display picture that has been delayed by said delaying unit as said reference picture to convert the picture element value of the display picture having display order that is earliest among display pictures in said multiplexed picture.

6. The picture transmission system as set forth in claim 3, wherein:
said multiplexing unit further multiplexes, as an additional picture, the display picture for which display order precedes by one the display picture for which display order is earliest among said display pictures; and
said generator converts the picture element value of the display picture for which display is earliest among display pictures in said multiplexed picture using the additional picture in said multiplexed picture as a reference picture.

7. The picture transmission system as set forth in a claim 3, wherein:
said display apparatus further comprises picture processing unit that subjects each of display pictures that have been stored in said memory to picture processing according to display pictures that differ from these display pictures; and
said generator converts picture element values of display pictures that have been subjected to picture processing by said picture processing unit.

8. The picture transmission system as set forth in claim 6, wherein:
said display apparatus further comprises picture processing unit that subjects each of display pictures that have been stored in said memory to picture processing that accords with the display pictures and at least one of display pictures that differ from these display pictures and said additional picture; and
said generator converts picture element values of display pictures that have been subjected to picture processing by said picture processing unit.

9. A picture transmission system that includes a picture transmission apparatus and a display apparatus, said picture transmission apparatus comprising:
a multiplexing unit that multiplexes N display pictures, where N is an integer equal to or greater than 2, to generate a multiplexed picture; and
a transceiver that transmits the multiplexed picture that was generated in said multiplexing unit; and
said display apparatus comprising:
a receiver that receives said multiplexed picture from said picture transmission apparatus;
a generator that, with each reception by said receiver of a picture element value of a display picture in said multiplexed picture, sequentially converts the picture element value based on a reference picture that has a display order that precedes by one the display picture in the multiplexed picture that was received by said receiver to generate N corrected pictures that correspond to each of display pictures in the multiplexed picture;
a recording unit that stores all of the corrected pictures that were generated by said generator; and
a display unit that has a plurality of picture elements and that scans said plurality of picture elements based on corrected pictures that were stored by said recording unit to display pictures that accord with said corrected pictures.

10. A picture transmission system that includes a picture transmission apparatus and a display apparatus, said picture transmission apparatus comprising:
a multiplexing unit that multiplexes N display pictures where N is an integer equal to or greater than 2, and, of said N display pictures, one additional picture for which the display order precedes by one the first display picture for which the display order is the earliest to generate a multiplexed picture; and
a transceiver that transmits the multiplexed picture that was generated in said multiplexing unit; and
said display apparatus comprising:
a receiver that receives said multiplexed picture from said picture transmission apparatus;
a generator that both converts the picture element value of the first display picture in the multiplexed picture that was received by said receiver based on said additional picture and converts the picture element values of each of the display pictures that differ from the first display picture in said multiplexed picture based on reference pictures for which the display order precedes by one the display pictures in the multiplexed picture to generate N corrected pictures that correspond to each of the display pictures in the multiplexed picture;
a recording unit that stores all of the corrected pictures that were generated by said generator; and
a display unit that has a plurality of picture elements and that scans said plurality of picture elements based on the corrected pictures that were stored by said recording unit to display pictures that accord with said corrected pictures.

11. The picture transmission system as set forth in claim 1, wherein said generation unit comprises:
a storage unit that stores a look-up table that indicates the correspondence relation between combinations of picture element values of said display pictures and picture element values of said reference pictures and picture element values of said corrected pictures; and
an execution unit that refers to the look-up table stored in said storage unit to convert picture element values of said display pictures.

12. The picture transmission system as set forth in claim 1, wherein:
said plurality of picture elements are provided at each intersection of a plurality of signal lines and a plurality of scan lines; and
said display unit includes:
a scan line driver that sequentially applies a scanning voltage to said scan lines to scan said plurality of picture elements;
a signal line driver that applies gradation voltages that accord with said corrected pictures to said signal lines;
a light source that irradiates light to said plurality of picture elements, and
a controller that extinguishes said light source in a predetermined interval in one frame interval of said corrected pictures, and lights up said light source in an interval other than said predetermined interval.

13. A picture transmission method that is realized by a picture transmission system that includes a picture transmission apparatus and a display apparatus that has a plurality of picture elements; said picture transmission method comprising:
said picture transmission apparatus multiplexing N display pictures where N is an integer equal to or greater than 2 to generate a multiplexed picture;
said picture transmission apparatus transmitting said multiplexed picture that was generated;
said display apparatus receiving said multiplexed picture from said picture transmission apparatus;

said display apparatus storing all of the display pictures in said multiplexed picture that was received;

said display apparatus converting picture element values of each of said display pictures that were stored based on reference pictures for which the display order precedes by one said display pictures that were stored to generate N corrected pictures that correspond to each of said display pictures that were stored;

said display apparatus storing all of said corrected pictures that were generated; and said display apparatus scanning said plurality of picture elements based on said corrected pictures that were stored to display pictures that accord with said corrected pictures.

14. A picture transmission method that is realized by a picture transmission system that includes a picture transmission apparatus and a display apparatus that has a plurality of picture elements; comprising:

said picture transmission apparatus multiplexing N display pictures where N is an integer equal to or greater than 2 to generate a multiplexed picture;

said picture transmission apparatus transmitting said multiplexed picture that was generated;

said display apparatus receiving said multiplexed picture from said picture transmission apparatus;

said display apparatus, with each reception of picture element values of display pictures in said multiplexed picture, converting the picture element values based on reference pictures for which the display order precedes by one the display pictures in said multiplexed picture that was received to generate N corrected pictures that correspond to each of display pictures in said multiplexed picture;

said display apparatus storing all of said corrected pictures that were generated; and said display apparatus scanning said plurality of picture elements based on said corrected pictures that were stored to display pictures that accord with said corrected pictures.

15. A picture transmission method that is realized by a picture transmission system that includes a picture transmission apparatus and a display apparatus that has a plurality of picture elements; comprising:

said picture transmission apparatus multiplexing N display pictures where N is an integer equal to or greater than 2 and, of said N display pictures, an additional picture for which the display order precedes by one the first display picture for which the display order is earliest to generate a multiplexed picture;

said picture transmission apparatus transmitting said multiplexed picture that was generated;

said display apparatus receiving said multiplexed picture from said picture transmission apparatus;

said display apparatus both converting the picture element value of the first display picture in said multiplexed picture that was received based on said additional picture and converting the picture element values of each of the display pictures that differ from the first display picture in said multiplexed picture based on reference pictures for which the display order precedes by one the display pictures in said multiplexed picture to generate N corrected pictures that correspond to each of display pictures in said multiplexed picture;

said display apparatus storing all of said corrected pictures that were generated; and said display apparatus scanning said plurality of picture elements based on said corrected pictures that were stored to display pictures that accord with said corrected pictures.

* * * * *